US011720012B2

(12) United States Patent
Yasui

(10) Patent No.: US 11,720,012 B2
(45) Date of Patent: Aug. 8, 2023

(54) OPTICAL SYSTEM

(71) Applicant: SONY GROUP CORPORATION, Tokyo (JP)

(72) Inventor: Toshifumi Yasui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/426,700

(22) PCT Filed: Jan. 22, 2020

(86) PCT No.: PCT/JP2020/002135
§ 371 (c)(1),
(2) Date: Jul. 29, 2021

(87) PCT Pub. No.: WO2020/162179
PCT Pub. Date: Aug. 13, 2020

(65) Prior Publication Data
US 2022/0100074 A1 Mar. 31, 2022

(30) Foreign Application Priority Data

Feb. 7, 2019 (JP) .............................. JP2019-020864

(51) Int. Cl.
*G03B 33/12* (2006.01)
*G03B 21/20* (2006.01)
(52) U.S. Cl.
CPC ............ *G03B 33/12* (2013.01); *G03B 21/204* (2013.01)
(58) Field of Classification Search
CPC ............................... G03B 33/12; G03B 21/204
(Continued)

(56) References Cited

U.S. PATENT DOCUMENTS 6,781,640 B1 8/2004 Huang
2004/0070736 A1 4/2004 Roddy et al.
(Continued)

FOREIGN PATENT DOCUMENTS

CN 101937133 A 1/2011
EP 1549056 A2 6/2005
(Continued)

OTHER PUBLICATIONS

International Search Report prepared by the Japan Patent Office dated Mar. 19, 2020, for International Application No. PCT/JP2020/002135.

*Primary Examiner* — Jerry L Brooks
(74) *Attorney, Agent, or Firm* — Sheridan Ross P.C.

(57) ABSTRACT

An optical system of the present disclosure includes: a first optical system that includes a first optical element having a plurality of divided regions having mutually different polarization actions, the first optical element being disposed at a first pupil position in the optical system, and that generates illumination light including a plurality of color light beams in mutually different wavelength bands; a plurality of light valves that each modulates at least one color light beam of the plurality of color light beams included in the illumination light; and a second optical system that includes a second optical element having a plurality of divided regions having mutually different polarization actions, the second optical element being disposed at a second pupil position conjugate to the first pupil position, and on which the plurality of color light beams modulated by the plurality of light valves is incident.

20 Claims, 36 Drawing Sheets

(58) Field of Classification Search
USPC .......................................................... 353/20
See application file for complete search history.

(56) References Cited

U.S. PATENT DOCUMENTS

| | | |
|---|---|---|
| 2004/0207820 A1 | 10/2004 | Roddy et al. |
| 2004/0207821 A1 | 10/2004 | Roddy et al. |
| 2006/0023165 A1 | 2/2006 | Ishihara et al. |
| 2010/0225885 A1* | 9/2010 | Miyazawa ............. G03B 33/12 353/20 |
| 2010/0328560 A1 | 12/2010 | Tanaka |
| 2013/0057788 A1 | 3/2013 | Hsiung et al. |

FOREIGN PATENT DOCUMENTS

| | | |
|---|---|---|
| JP | H1138528 A | 2/1999 |
| JP | H11-231260 | 8/1999 |
| JP | H11-231261 | 8/1999 |
| JP | 2001174755 A | 6/2001 |
| JP | 2001-215461 | 8/2001 |
| JP | 2001-290216 | 10/2001 |
| JP | 2001-324762 | 11/2001 |
| JP | 2004-309668 | 11/2004 |
| JP | 2006-047421 | 2/2006 |
| JP | 2006-343721 | 12/2006 |
| JP | 2008-165058 | 7/2008 |
| JP | 2010020194 A | 1/2010 |
| JP | 2012-141574 | 7/2012 |
| JP | 2013-057942 | 3/2013 |
| JP | 2018-013655 | 1/2018 |

* cited by examiner

OPTICAL SYSTEM

CROSS REFERENCE TO RELATED APPLICATIONS

This application is a national stage application under 35 U.S.C. 371 and claims the benefit of PCT Application No. PCT/JP2020/002135 having an international filing date of 22 Jan. 2020, which designated the United States, which PCT application claimed the benefit of Japanese Patent Application No. 2019-020864 filed 07 Feb. 2019, the entire disclosures of each of which are incorporated herein by reference.

TECHNICAL FIELD

The present disclosure relates to an optical system suitable for a projector and the like.

BACKGROUND ART

Examples of types of projectors performing full-color display include a single-plate type using one common light valve for respective color light beams of R (red), G (green), and B (blue), a three-plate type using different light valves for three color light beams, and the like (see PTLs 1 to 4). Meanwhile, in a case where one light valve continuously receives blue light having a short wavelength, the light valve is deteriorated. PTL 1 proposes using two light valves for blue light to extend the lives of the light valves.

CITATION LIST

Patent Literature

[PTL 1] Japanese Unexamined Patent Application Publication No. 2018-13655
[PTL 2] Japanese Unexamined Patent Application Publication No. 2001-324762
[PTL 3] Japanese Unexamined Patent Application Publication No. 2008-165058
[PTL 4] Japanese Unexamined Patent Application Publication No. 2006-343721

SUMMARY OF THE INVENTION

For example, in a case where two light valves for blue light are used to extend the lives of the light valves, it is difficult to increase contrast in a configuration in which a blue light beam is simply split into two.

It is desirable to provide an optical system that makes it possible to achieve an improvement in contrast.

An optical system according to an embodiment of the present disclosure includes: a first optical system that includes a first optical element having a plurality of divided regions having mutually different polarization actions, the first optical element being disposed at a first pupil position in the optical system, and that generates illumination light including a plurality of color light beams in mutually different wavelength bands; a plurality of light valves that each modulates at least one color light beam of the plurality of color light beams included in the illumination light; and a second optical system that includes a second optical element having a plurality of divided regions having mutually different polarization actions, the second optical element being disposed at a second pupil position conjugate to the first pupil position, and on which the plurality of color light beams modulated by the plurality of light valves is incident.

In the optical system according to the embodiment of the present disclosure, in the first optical system, the first optical element that has the plurality of divided regions having mutually different polarization actions is disposed at the first pupil position. In the second optical system, the second optical element that has the plurality of divided regions having mutually different polarization actions is disposed at the second pupil position conjugate to the first pupil position.

MODES FOR CARRYING OUT THE INVENTION

Figure 1:
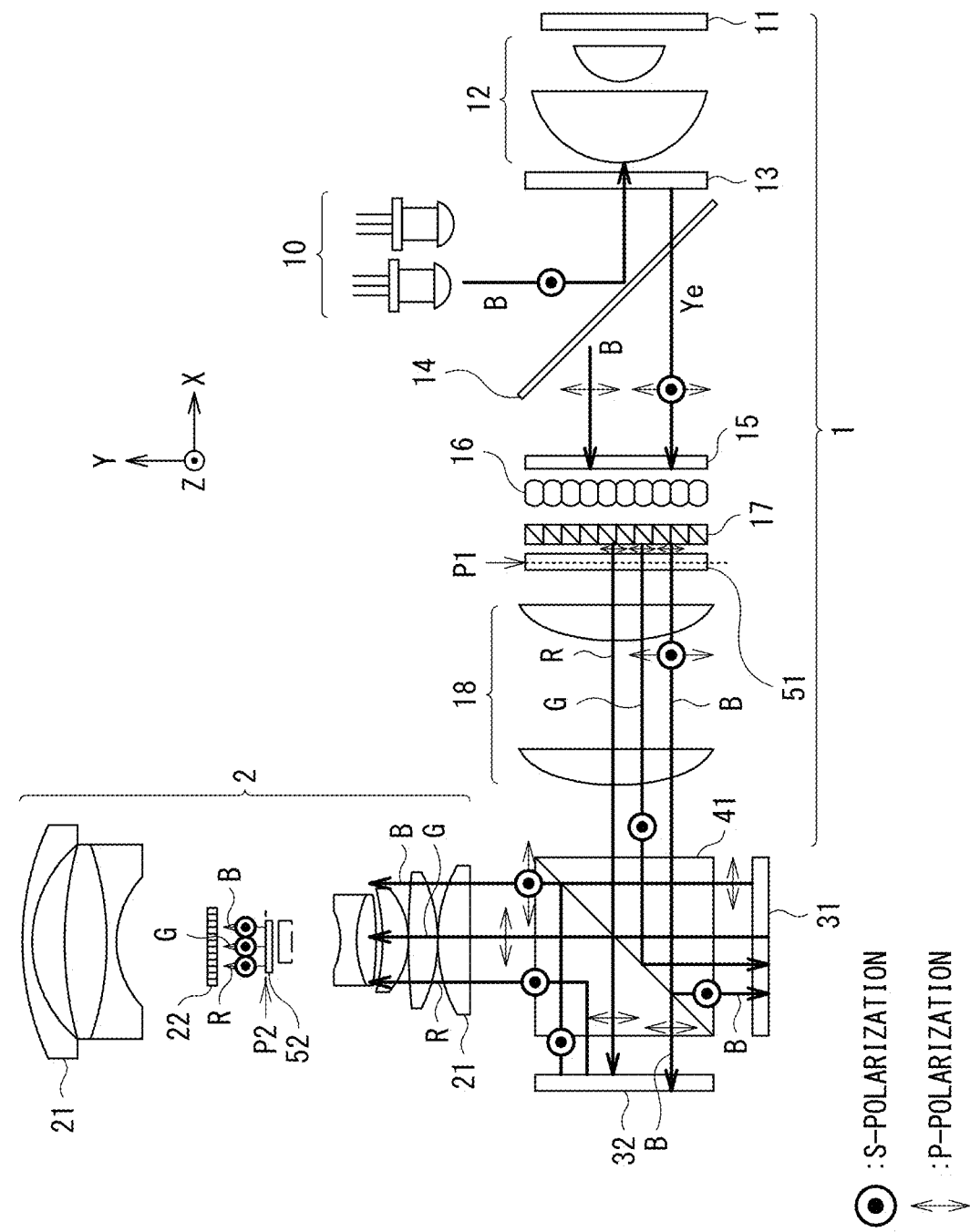
FIG. 1 is a configuration diagram schematically illustrating an entire configuration example of an optical system according to a first embodiment of the present disclosure.

Hereinafter, some embodiments of the present disclosure are described in detail with reference to the drawings. It is to be noted that the description is given in the following order.

0. Comparative Example
1. First Embodiment (FIGS. 1 to 4)
   1.1 Configuration and Action of Optical System
   1.2 Effects
2. Second Embodiment (FIGS. 5 to 14)
3. Third Embodiment (FIGS. 15 to 17)
4. Fourth Embodiment (FIGS. 18 and 19)
5. Fifth Embodiment (FIGS. 20 to 22)
6. Sixth Embodiment (FIGS. 23 to 25)
7. Seventh Embodiment (FIG. 26)
8. Eighth Embodiment (FIGS. 27 to 30)
9. Ninth Embodiment (FIGS. 31 and 32)
10. Tenth Embodiment (FIGS. 33 to 38)
11. Eleventh Embodiment (FIG. 39)
12. Twelfth Embodiment (FIGS. 40 to 42)
13. Thirteenth Embodiment (FIG. 43)
14. Other Embodiments 0. Comparative Example (Overview and Issues of Optical System According to Comparative Example)

In an optical system used for a projector and the like, a configuration including a plurality of light valves is known.

In such an optical system, in a case where illumination light is split for the plurality of light valves, an action of either wavelength or polarization is typically used. For example, PTL 1 (Japanese Unexamined Patent Application Publication No. 2018-13655) discloses a configuration example in which a wavelength selective wave plate is used to split light in a blue band for two light valves. This reduces, by half, blue-band light that easily contributes to a deterioration in the light valves, thereby extending the life of the entire optical system.

However, in the configuration example disclosed in PTL 1, it is possible to split light in the blue band for two light valves, but polarizations of light beams outputted from the respective light valves are orthogonal to each other. This means that it is not possible to increase contrast with use of a post polarizer in a subsequent projection optical system, which causes an issue in achieving high contrast. Meanwhile, it is possible to provide a similar configuration by using a dichroic mirror or a dichroic prism in place of the wavelength selective wave plate. However, wavelength separation (color separation) using a dichroic mirror needs abrupt separation characteristics in proximity to a separated wavelength region, and the level of difficulty in manufacturing is extremely high.

In addition, like a technology proposed by PTL 2 (Japanese Unexamined Patent Application Publication No. 2001-324762), a method is known of achieving high wavelength separation efficiency by using a pupil distribution. However, in this method, a single plate (a single light valve) is field-sequentially driven through filters of respective colors, which causes a decrease in light use efficiency as a whole even though wavelength separation efficiency is favorable.

In view of the foregoing, the present disclosure proposes a novel technology of light separation using pupil conjugate and light combination as a light splitting method. Various methods of using the present technology are considered, and the present technology has the following advantages.

1. It is possible to eliminate orthogonal states of light beams outputted from respective light valves, and align polarization directions. Accordingly, providing a post polarizer or a post quarter-wave plate makes it possible to improve contrast.

2. It is possible to significantly increase efficiency. In particular, wavelength separation efficiency is kept higher than a wavelength selective wave plate, which makes it possible to increase light use efficiency as a whole. Further, it is possible to selectively provide a post polarizer action to light beams outputted from respective light valves in that state, and it is possible to increase contrast.

In the following respective embodiments, description is given of a configuration example in which an optical system according to the technology of the present disclosure is applied to a projector. However, the technology of the present disclosure is applicable not only to a projector but also to an exposure apparatus and the like.

1. First Embodiment

[1.1 Configuration and Action of Optical System]
(Overview of Optical System)

FIG. 1 schematically illustrates an entire configuration example of an optical system according to a first embodiment of the present disclosure.

The first embodiment presents a configuration example in which two light valves are used. In the first embodiment, to suppress a deterioration in the light valves caused by a blue light beam, the blue light beam is split for the two light valves to reduce the amount of the blue light beam by half, thereby achieving an increase in longevity. In addition to this, a purpose is to increase contrast.

As illustrated in FIG. 1, the optical system according to the first embodiment includes an illumination optical system 1 and a projection optical system 2. In addition, the optical system according to the first embodiment includes a first light valve 31 and a second light valve 32, and a PBS (polarization beam splitter) 41 in an optical path between the illumination optical system 1 and the projection optical system 2.

The illumination optical system 1 includes a blue light source 10, a phosphor wheel 11, a light-condensing lens 12, a QWP (quarter-wave plate) 13, a wavelength selective PBS 14, a notch filter 15, a lens array 16, a PS converter 17, a first region-division wavelength selective wave plate 51, and a relay lens 18.

The projection optical system 2 includes a plurality of lenses 21, a second region-division wavelength selective wave plate 52, and a post polarizer 22.

It is to be noted that in FIG. 1, a direction that is orthogonal to a paper surface is S polarization for the PBS 41, and a direction that is orthogonal to an optical axis and parallel to the paper surface is P polarization for the PBS 41. In addition, a direction corresponding to the S polarization for the PBS 41 is referred to as a Z direction, and a direction corresponding to the P polarization for the PBS 41 is referred to as a Y direction, as appropriate. The same applies to the following other diagrams. In addition, the same also applies to the following other embodiments.

The illumination optical system 1 corresponds to a specific example of a "first optical system" in the technology of the present disclosure. The projection optical system 2 corresponds to a specific example of a "second optical system" in the technology of the present disclosure. The first region-division wavelength selective wave plate 51 corresponds to a specific example of a "first optical element" in the technology of the present disclosure. The second region-division wavelength selective wave plate 52 corresponds to a specific example of a "second optical element" in the technology of the present disclosure.

The illumination optical system 1 generates illumination light including a plurality of color light beams in mutually different wavelength bands. The illumination optical system 1 has a The illumination optical system 1 generates color light beams of R, G, and B as the plurality of color light beams, and outputs the color light beams toward the PBS 41.

The first region-division wavelength selective wave plate 51 is disposed at a pupil position P1 of the illumination optical system 1. The first region-division wavelength selective wave plate 51 has a plurality of divided regions having mutually different polarization actions. The plurality of divided regions in the first region-division wavelength selective wave plate 51 is, for example, an A region and a B region illustrated in FIG. 3 to be described later.

The PBS 41 causes each color light beam from the illumination optical system 1 to be incident on at least one of the first light valve 31 or the second light valve 32. The PBS 41 causes a blue light beam to be incident on the first light valve 31 and the second light valve 32 by splitting the blue light beam by a difference in polarization. In addition, the PBS 41 causes, for example, a green light beam to be incident on one light valve (the first light valve 31) of the first light valve 31 and the second light valve 32. In addition, the PBS 41 causes, for example, a red light beam to be incident on the other light valve (the second light valve 32) of the first light valve 31 and the second light valve 32. In addition, the PBS 41 outputs each of color light beams modulated by the first light valve 31 and the second light valve 32 toward the projection optical system 2 in accordance with a polarization direction.

The first light valve 31 and the second light valve 32 each modulate at least one color light beam of the plurality of color light beams in accordance with an image signal, for example.

Each of the color light beams that have been modulated by the first light valve 31 and the second light valve 32 is incident on the projection optical system 2 via the PBS 41. The projection optical system 2 projects an image generated by the first light valve 31 and the second light valve 32 onto a projection plane such as an unillustrated screen.

The second region-division wavelength selective wave plate 52 is disposed at a pupil position P2 of the projection optical system 2. The second region-division wavelength selective wave plate 52 has a plurality of divided regions having mutually different polarization actions. The plurality of divided regions in the second region-division wavelength selective wave plate 52 is, for example, an A' region and a B' region illustrated in FIG. 4 to be described later.

The pupil position P1 of the illumination optical system 1 and the pupil position P2 of the projection optical system 2 are conjugate to each other. Each of the plurality of divided regions in the first region-division wavelength selective wave plate 51 and each of the plurality of divided regions in the second region-division wavelength selective wave plate 52 are conjugate to each other.

The pupil position P1 of the illumination optical system 1 corresponds to a specific example of a "first pupil position" in the technology of the present disclosure. The pupil position P2 of the projection optical system 2 corresponds to a specific example of a "second pupil position" in the technology of the present disclosure.

The post polarizer 22 is disposed in an output optical path of the second region-division wavelength selective wave plate 52.

(Detailed Configuration and Action of Each Component)

Figure 2:
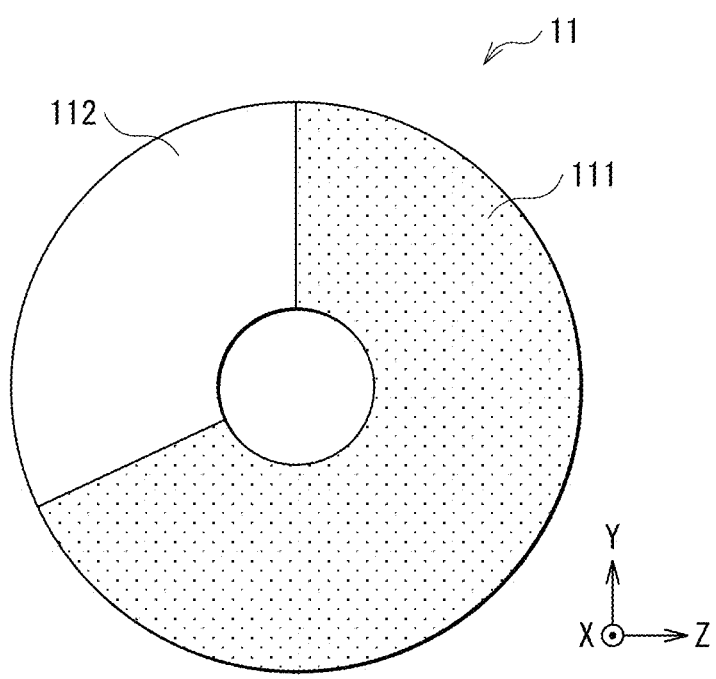
FIG. 2 is a configuration diagram schematically illustrating an example of a phosphor wheel in the optical system according to the first embodiment.
Figure 3:
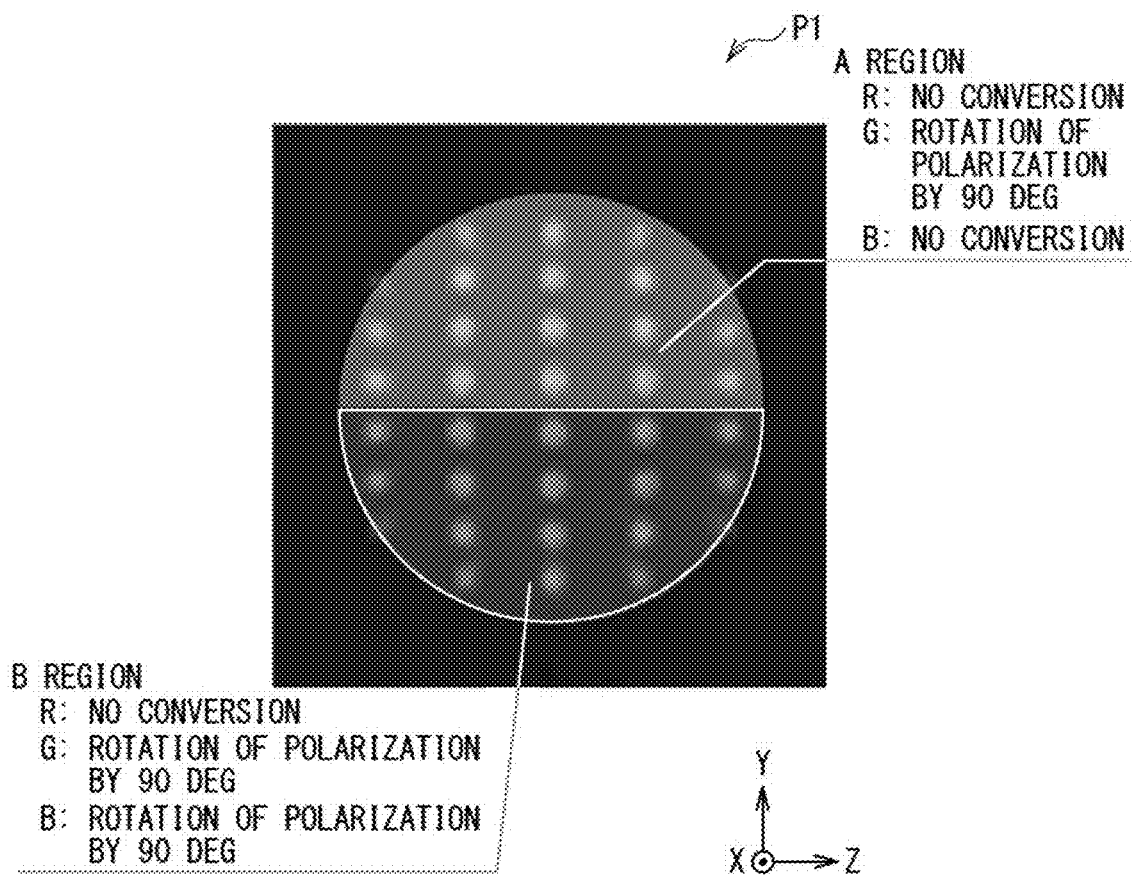
FIG. 3 is an explanatory diagram illustrating an example of a configuration and an action of a first region-division wavelength selective wave plate in the optical system according to the first embodiment.
Figure 4:
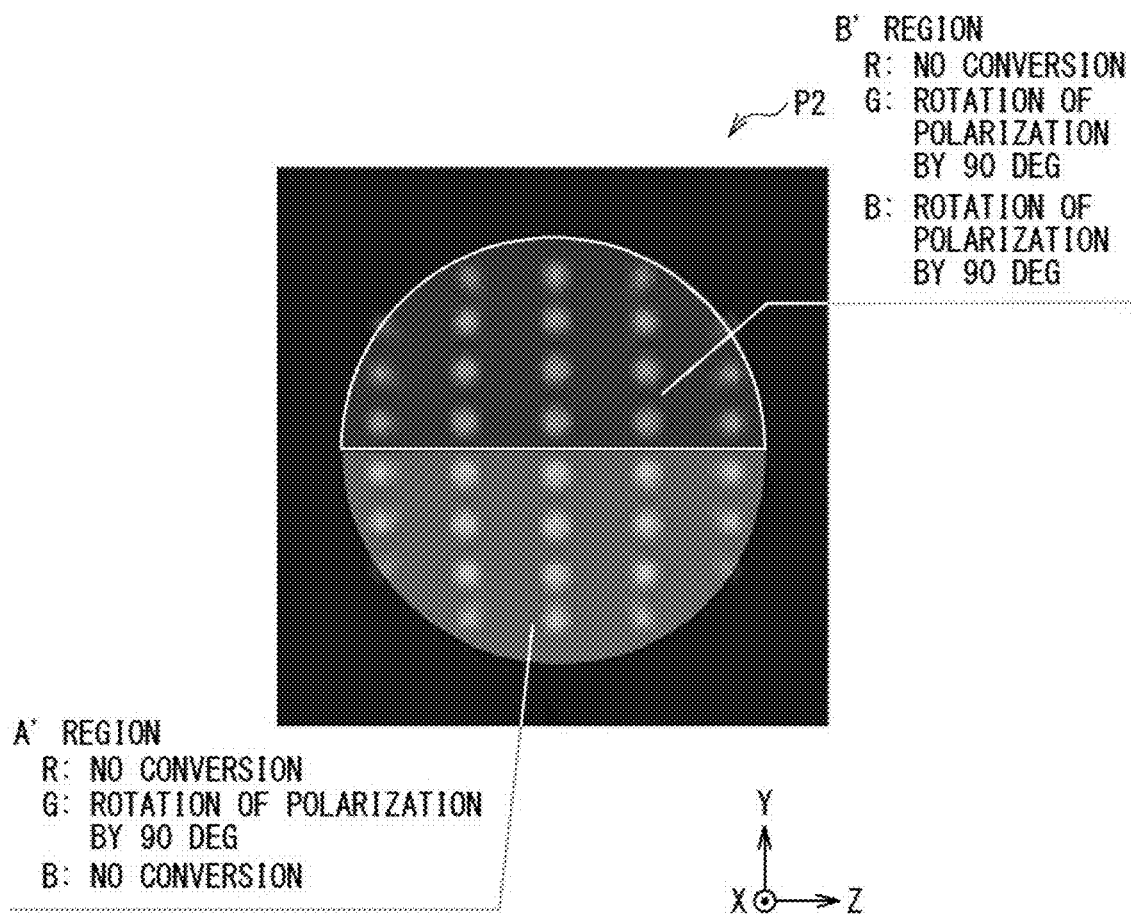
FIG. 4 is an explanatory diagram illustrating an example of a configuration and an action of a second region-division wavelength selective wave plate in the optical system according to the first embodiment.

FIG. 2 schematically illustrates a configuration example of the phosphor wheel 11. FIG. 3 illustrates an example of a configuration and an action of the first region-division wavelength selective wave plate 51. FIG. 4 illustrates an example of a configuration and an action of the second region-division wavelength selective wave plate 52.

The blue light source 10 is, for example, a blue laser. The phosphor wheel 11 has a phosphor region 111 and a polarization maintaining diffuser region 112 as illustrated in FIG. 2. A yellow (Ye) light beam is obtained by irradiating the phosphor region 111 with a blue light beam as excitation light. The polarization maintaining diffuser region 112 does not have a polarization action, but has a reflection action with respect to the blue light beam. Accordingly, a time-average white light beam obtained by temporally repeating yellow, blue, yellow, blue . . . is outputted from the phosphor wheel 11.

A blue light beam outputted from the blue light source 10 is reflected by the wavelength selective PBS 14 and then passes through the quarter-wave plate 13 to be converted into a circularly polarized light beam, and the circularly polarized light beam is incident on the phosphor wheel 11 via the light-condensing lens 12. An outputted light beam from the phosphor wheel 11 passes through the quarter-wave plate 13 again to be converted into a P-polarized light beam for the wavelength selective PBS 14. Thereafter, the P-polarized light beam is outputted by the wavelength selective PBS 14 to a transmission side. In addition, a yellow light beam extracted from the phosphor wheel 11 is similarly reflected, and then is outputted by the wavelength selective PBS 14 to the transmission side. The yellow light beam generated by the phosphor wheel 11 is in a non-polarization state, and the wavelength selective PBS 14 has an action of allowing the entire yellow light beam to pass therethrough.

The blue light beam and the yellow light beam outputted from the wavelength selective PBS 14 pass through the notch filter 15 and the lens array 16, and then pass through the PS converter 17 to align polarization states thereof to one direction (herein, for example, Y-direction polarization (P-polarization)). The first region-division wavelength selective wave plate 51 having characteristics illustrated in FIG. 3 is disposed in a portion where an immediately subsequent pupil (a first pupil) of the illumination optical system 1 is formed. In the first region-division wavelength selective wave plate 51, for example, an upper half (the A region) is a half-wave plate that is inclined at 45 deg. and acts on only green, and a lower half (the B region) is a half-wave plate that is inclined at 45 deg. and acts on green and blue. It is to be noted that in FIG. 3, a white small circular portion is a illumination distribution in this pupil. The same applies to diagrams related to other pupil portions. In the first region-division wavelength selective wave plate 51, in a case where a wave plate action is exerted on illumination light, polarization of a red light beam is not rotated in any region to become Y-direction polarization (P-polarization). In addition, polarization of a green light beam is rotated by 90 deg. in any region to become Z-direction polarization (S-polarization). In addition, polarization of a blue light beam is in a mixed state of non-rotated polarization (Y-direction polarization (P-polarization)) and rotated polarization (Z-direction polarization (S-polarization)).

In a case where a light flux of each color reaches the PBS 41 via the relay lens 18 after passing through the first region-division wavelength selective wave plate 51, each color light beam is selectively guided to the first light valve 31 and the second light valve 32 in accordance with each polarization state. The red light beam is in P-polarization, and reaches to the second light valve 32. The green light beam is in S-polarization, and reaches the first light valve 31. The blue light beam is in the mixed state of P-polarization and S-polarization, and a half of the blue light beam reaches each of the first light valve 31 and the second light valve 32. In a case where a reflective liquid crystal is used for the first light valve 31 and the second light valve 32, performing white display on each light valve causes rotation of each polarization, which changes each incident polarization into output polarization in an orthogonal state. Accordingly, in the first light valve 31, the red light beam and the blue light beam are outputted as S-polarization, and in the second light valve 32, the blue light beam and the red light beam are outputted as P-polarization. Accordingly, performing white display causes all light beams having passed through the PBS 41 to be outputted toward the projection optical system 2.

Typically, the PBS 41 has a tendency that Rp (a reflected P-polarized component) is slightly larger than Ts (a transmitted S-polarized component) because of characteristics of a polarization film. Accordingly, there is a tendency that contrast is made lower on the second light valve 32 side than on the first light valve 31 side. The reason for this is that P-polarized light generated by the second light valve 32 is leaked more into the projection optical system 2 side than S-polarized light generated by the first light valve 31 during black display. In a case of a one-plate configuration using only one light valve, a configuration is made by using only the first light valve 31 side on which contrast is increased; however, a case of a two-plate configuration using two light valves is a factor for significantly impairing contrast. Accordingly, to achieve contrast of about 1000:1 in a case where the F-number of the illumination optical system 1 is about F/2.5 to 3 (and in a case where the notch filter 15 is included), it is necessary to align the polarization directions by the post polarizer 22 (an analyzer subsequent to output of the PBS 41) and improve contrast.

In the optical system according to the first embodiment, if the post polarizer 22 is disposed immediately subsequent to the PBS 41 without contrivance, a light amount is reduced by half because the polarization states of the blue light beam are orthogonal. This is solved by using a conjugate action of the pupil, which is a greatest feature of the optical system according to the first embodiment.

That is, in the optical system according to the first embodiment, the second region-division wavelength selective wave plate 52 is disposed at the pupil (second pupil) position P2 subsequent to output of the PBS 41 of the projection optical system 2. A division method in this case is illustrated in FIG. 4. The pupil of the projection optical system 2 is conjugate to the pupil of the illumination optical system 1, and regional vertical inversion is provided for each conjugate portion because light valve reflection has been undergone. Accordingly, as illustrated in FIG. 4, a region conjugate to the A region of the first region-division wavelength selective wave plate 51 is the A' region in a lower portion of the second region-division wavelength selective wave plate 52, and a region conjugate to the B region of the first region-division wavelength selective wave plate 51 is the B' region in an upper portion of the second region-division wavelength selective wave plate 52. Conjugate means that light having passed through the A region of the first region-division wavelength selective wave plate 51 passes through the A' region of the second region-division wavelength selective wave plate 52 without fail, and light having passed through the B region of the first region-division wavelength selective wave plate 51 passes through the B' region of the second region-division wavelength selective wave plate 52 without fail. Accordingly, P-polarization and S-polarization of the blue light beam in the mixed state selectively are incident on the B' region and the A' region, respectively. Thereafter, the polarization of the blue light beam is not converted in the A' region, and polarization of the blue light beam is rotated by 90 deg. in the B' region. In addition, in any of the regions, polarization of the red light beam is not rotated, and polarization of the green light beam is rotated by 90 deg., which consequently aligns polarizations of the respective color light beams after passing through the second region-division wavelength selective wave plate 52 to S-polarization.

The post polarizer 22 is disposed to cut P-polarization after passing through the second region-division wavelength selective wave plate 52, which makes it possible to improve contrast. In an experiment system imitating the optical system according to the first embodiment, about 1000:1 at F/2.5 as white contrast was obtained as an experiment result, and the light amount of a blue light beam was able to be split by about half for the first light valve 31 and the second light valve 32. Thus, it was confirmed that an assumed action was exhibited.

In the optical system according to the first embodiment, at the time of emission of a yellow light beam in the phosphor wheel 11, a green light beam is selectively guided to the first light valve 31, and a red light beam is selectively guided to the second light valve 32. In addition, at a timing of outputting a blue light beam from the phosphor wheel 11, a half of the blue light beam is guided to each of the first light valve 31 and the second light valve 32. In each light valve, output of gradation for each color light beam is performed during a time corresponding to each color light beam. That is, to enhance contrast while splitting a blue light beam into two, pupil conjugate is used. As described above, the main purpose is to significantly expand the life of the entire optical system by splitting a blue light beam, which is a cause of shortening the life of the light valve, into two to reduce an amount of incident light by half. Light to be split into two in this sense is desirably at 500 nm or less.

It is to be noted that a comparative example with respect to the configuration of the optical system according to the first embodiment is a projector described in PTL 3 (Japanese Unexamined Patent Application Publication No. 2008-165058). In the projector described in PTL 3, a region-divided retardation plate is disposed in proximity to a pupil in a projection optical system, and splits light into two by polarization in the projection optical system. However, there is a difference in quality between simply splitting light by polarization in the projection optical system and exerting a region-division polarization action on a portion conjugate to a region divided in the pupil of the illumination optical system 1 as with the optical system according to the first embodiment. That is, in the former, an equal polarization action is exerted on light generated by any light valve. In contrast, the latter has characteristics that use of a conjugate relationship makes it possible to exert a specific polarization action only on light having reached a specific light valve.

[1.2 Effects]

As described above, according to the optical system according to the first embodiment, the first region-division wavelength selective wave plate 51 that has a plurality of divided regions having mutually different polarization actions is disposed at the pupil position P1 of the illumination optical system 1, and the second region-division wavelength selective wave plate 52 that has a plurality of divided regions having mutually different polarization actions is disposed at the pupil position P2 conjugate to the first pupil position of the projection optical system 2, which makes it possible to achieve an improvement in contrast.

According to the optical system according to the first embodiment, in addition to expectation of an increase in contrast, it is possible to prevent color unevenness on a projection surface by aligning polarization of final outputted light in the projection optical system 2 to one direction. In addition, contrast is enhanced in a state in which two light valves are used with respect to one PBS 41, which consequently makes it possible to downsize the entire optical system.

It is to be noted that the effects described herein are merely exemplary and not limiting, and there may be other effects as well. The same applies to effects of the following other embodiments.

2. Second Embodiment

Next, description is given of an optical system according to a second embodiment of the present disclosure. It is to be noted that in the following description, components that are substantially the same as those of the optical system according to the first embodiment described above are indicated by the same reference signs, and description thereof is omitted as appropriate.

The optical system according to the first embodiment has a configuration in which the notch filter 15 is essential in the illumination optical system 1. The role of the notch filter 15 is described with use of FIGS. 5 to 9.

Figure 5:
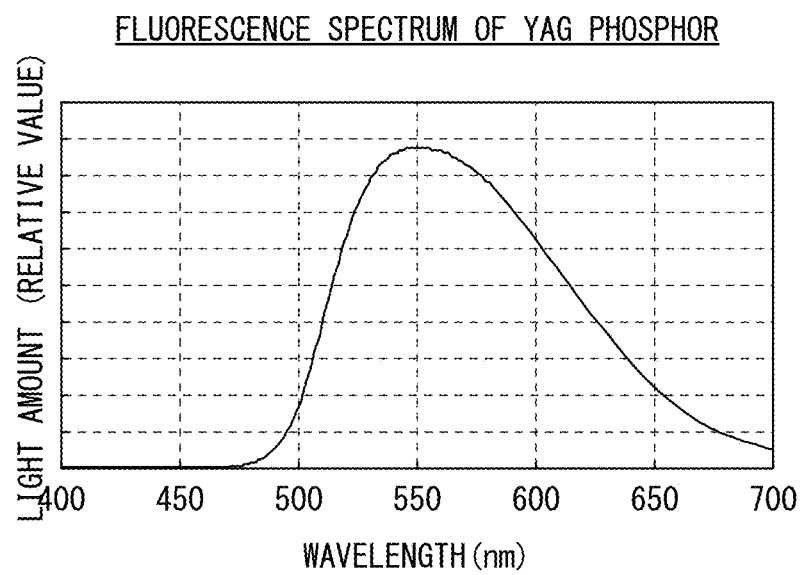
FIG. 5 is an explanatory diagram illustrating an example of a fluorescence spectrum of a YAG phosphor used for a phosphor wheel in the optical system according to the first embodiment.
Figure 6:
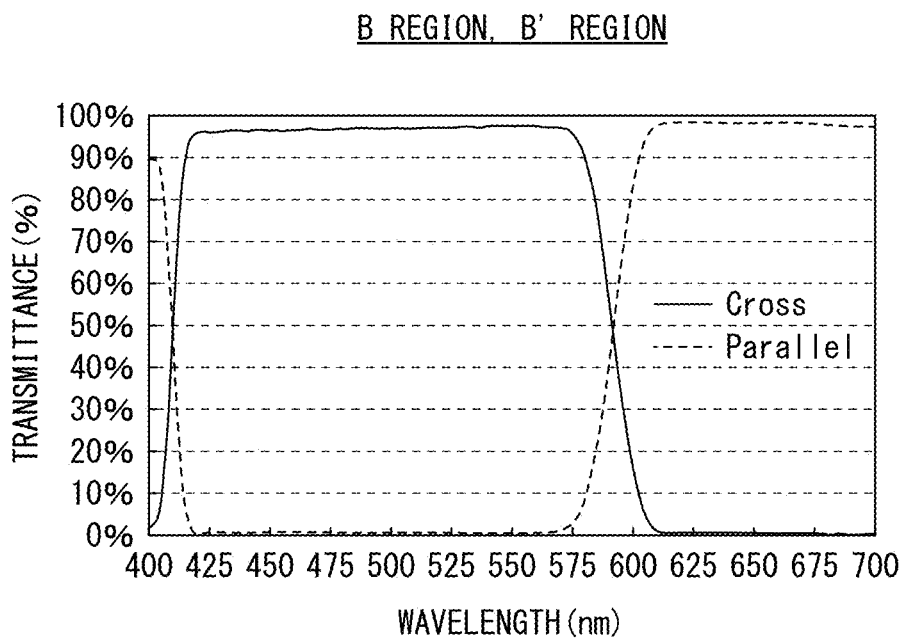
FIG. 6 is an explanatory diagram illustrating an example of wavelength selectivity of a B region of the first region-division wavelength selective wave plate and a B' region of the second region-division wavelength selective wave plate in the optical system according to the first embodiment.
Figure 7:
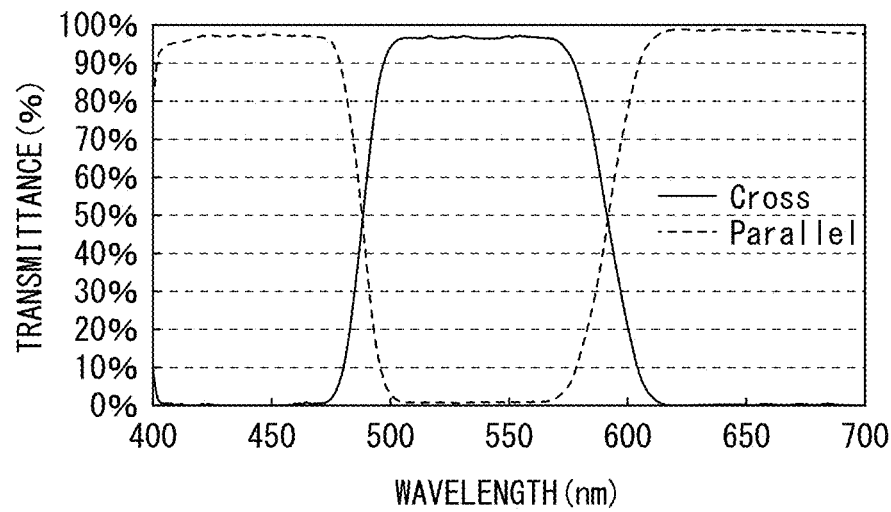
FIG. 7 is an explanatory diagram illustrating an example of wavelength selectivity of an A region of the first region-division wavelength selective wave plate and an A' region of the second region-division wavelength selective wave plate in the optical system according to the first embodiment.
Figure 8:
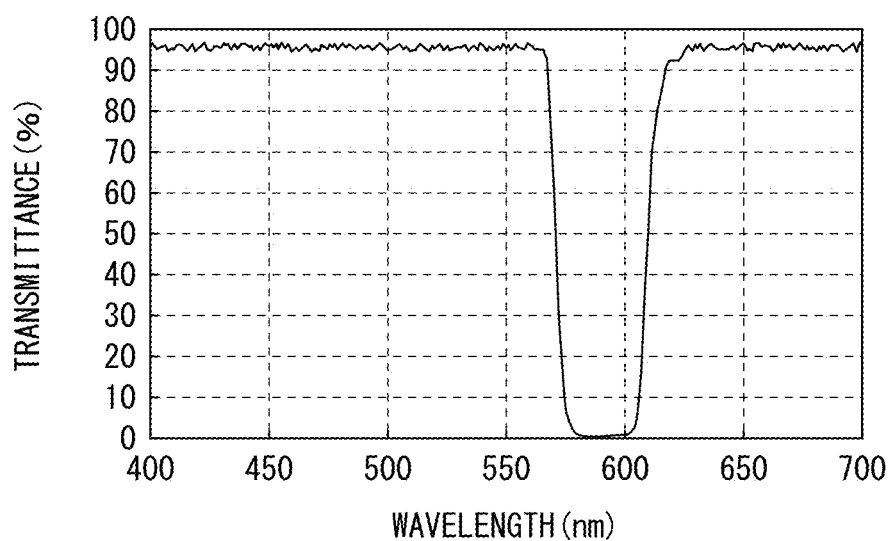
FIG. 8 is an explanatory diagram illustrating an example of characteristics of a notch filter in the optical system according to the first embodiment.

FIG. 5 illustrates an example of a fluorescence spectrum of a YAG phosphor used for the phosphor wheel 11 in the optical system according to the first embodiment. FIG. 6 illustrates an example of wavelength selectivity characteristics of the B region of the first region-division wavelength selective wave plate 51 and the B' region of the second region-division wavelength selective wave plate 52 in the optical system according to the first embodiment. FIG. 7 illustrates an example of wavelength selectivity characteristics of the A region of the first region-division wavelength selective wave plate 51 and the A' region of the second region-division wavelength selective wave plate 52 in the optical system according to the first embodiment. FIG. 8 illustrates an example of characteristics of the notch filter 15 in the optical system according to the first embodiment.

Figure 9:
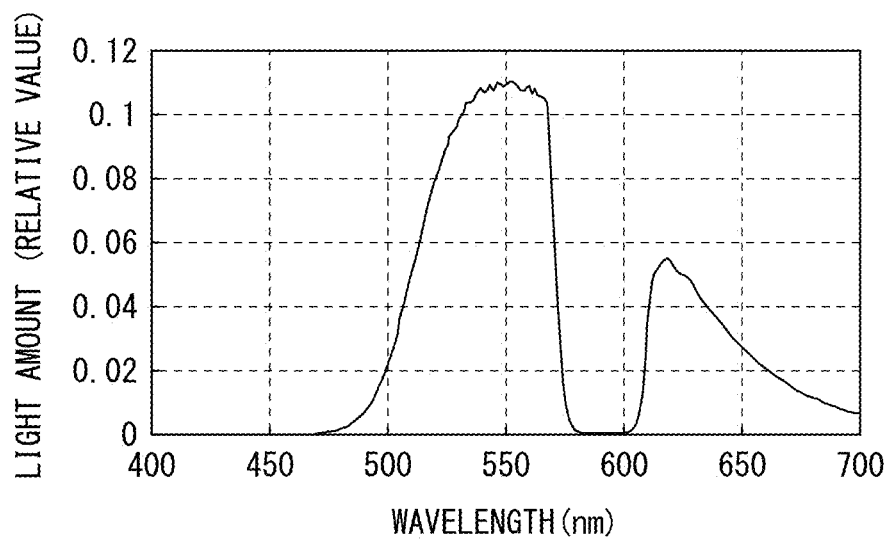
FIG. 9 is an explanatory diagram illustrating an example of a fluorescence spectrum after a notch filter action in the optical system according to the first embodiment.

In the optical system according to the first embodiment, polarization of each color is selectively rotated by actions of the wavelength selectivity characteristics of the first region-division wavelength selective wave plate 51 and the second region-division wavelength selective wave plate 52 illustrated in FIGS. 6 and 7. An issue in the B region and the B' region illustrated in FIG. 6 is a red-green switching region of 575 nm to 610 nm. Conversion efficiency in this portion is not 100% with respect to any polarization, which therefore leads to appearance of an unintended polarized component. The unintended polarized component is polarization that is not blocked by the post polarizer 22, and causes an abrupt deterioration in contrast. For example, in a case where the notch filter 15 having characteristics illustrated in FIG. 8 is not included, contrast is significantly decreased from about 1000:1 to less than 100:1. Accordingly, to achieve high contrast, the notch filter 15 is configured to be essential. However, there is a large disadvantage, and light acted on by the notch filter 15 with respect to the fluorescence spectrum illustrated in FIG. 5 is forced to be discarded, which results in alight amount loss of a little less than 30%. FIG. 9 illustrates an example of a fluorescence spectrum after the action of the notch filter 15. As compared with FIG. 5, it can be seen that there is a significant spectrum loss. In addition, even in the A region and the A' region illustrated in FIG. 7, switching between red and green occurs in a region of about 575 nm to about 610 nm, and it is important to block this part.

Accordingly, as the optical system according to the second embodiment, a system is provided in which light use efficiency is improved as compared with the optical system according to the first embodiment.

(Overview of Optical System According to Second Embodiment)

Figure 10:
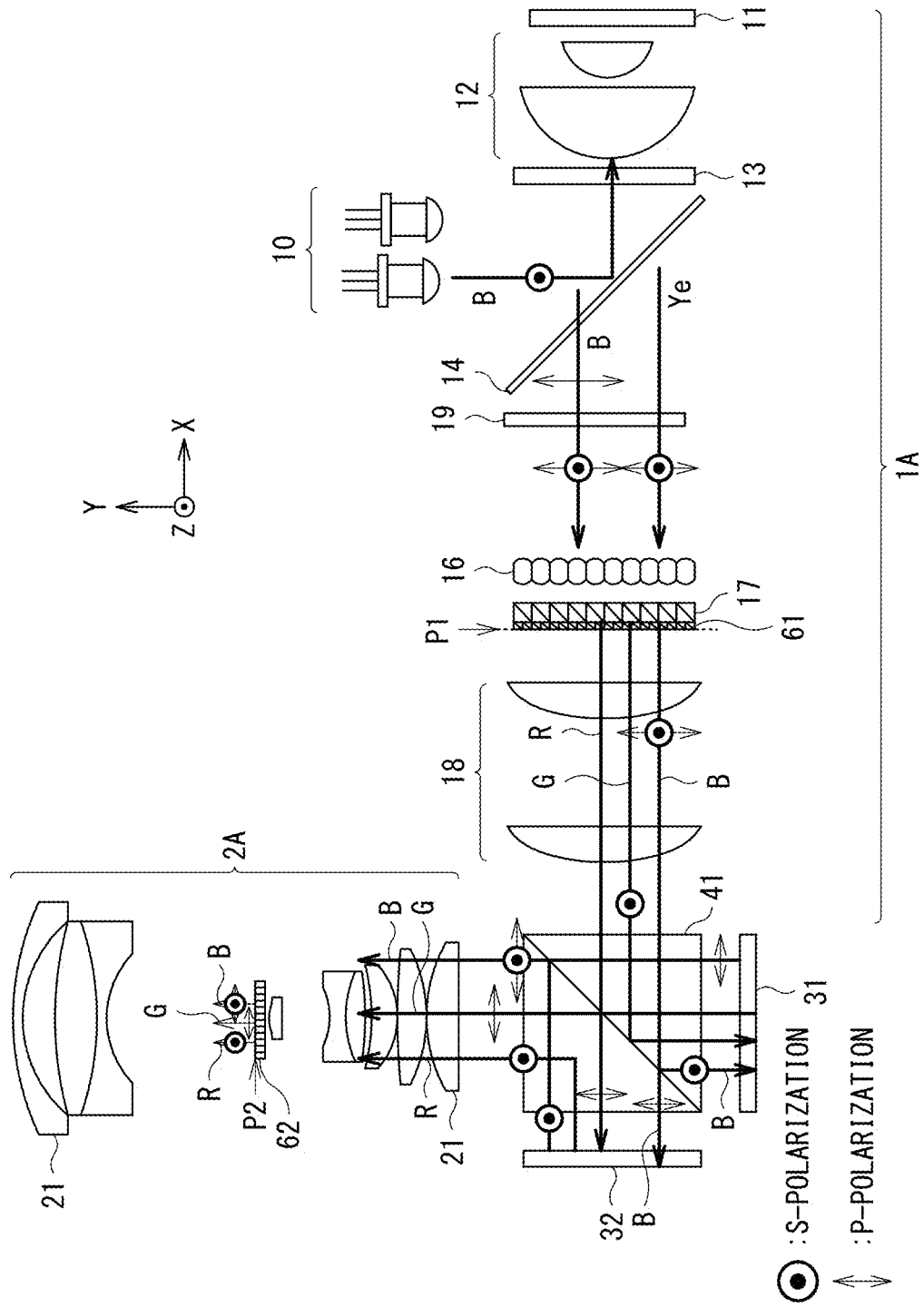
FIG. 10 is a configuration diagram schematically illustrating an entire configuration example of an optical system according to a second embodiment.

FIG. 10 schematically illustrates an entire configuration example of the optical system according to the second embodiment.

As illustrated in FIG. 10, the optical system according to the first embodiment includes an illumination optical system 1A and a projection optical system 2A.

The illumination optical system 1A has a configuration different from the configuration of the illumination optical system 1 (FIG. 1) in the first embodiment in that a dichroic converter 61 is disposed at the pupil position P1 of the illumination optical system 1A in place of the first region-division wavelength selective wave plate 51. In addition, the illumination optical system 1A has a configuration different from the configuration of the illumination optical system 1 in the first embodiment in that the notch filter 15 is omitted and a half-wave plate 19 is disposed subsequent to the wavelength selective PSB 14. The dichroic converter 61 has a plurality of divided regions having mutually different polarization actions. Wavelength distributions in the plurality of divided regions at the pupil position P1 of the illumination optical system 1A are different from each other. The plurality of divided regions in the dichroic converter 61 is, for example, a C region and a D region illustrated in FIG. 12 to be described later.

The projection optical system 2A has a configuration different from the configuration of the projection optical system 2 (FIG. 1) in the first embodiment in that the post polarizer 22 is omitted and a region-division polarizer 62 is disposed at the pupil position P2 of the projection optical system 2A in place of the second region-division wavelength selective wave plate 52. The region-division polarizer 62 has a plurality of divided regions having mutually different polarization actions. In the region-division polarizer 62, the plurality of divided regions each has an action of allowing light beams in mutually different polarization directions to pass therethrough. The plurality of divided regions in the region-division polarizer 62 is, for example, a C' region and a D' region illustrated in FIG. 13 to be described later. The region-division polarizer 62 has an action as a region-divided post polarizer.

The illumination optical system 1A corresponds to a specific example of a "first optical system" in the technology of the present disclosure. The projection optical system 2A corresponds to a specific example of a "second optical system" in the technology of the present disclosure. The dichroic converter 61 corresponds to a specific example of a "first optical element" in the technology of the present disclosure. The region-division polarizer 62 corresponds to a specific example of a "second optical element" in the technology of the present disclosure.

(Detailed Configuration and Action of Each Component)

The half-wave plate 19 converts Y-direction polarization (P-polarization) of an incident blue light beam into a polarization state in a direction in which Y=Z is established. Accordingly, the half-wave plate 19 is able to convert the polarization state of the blue light beam into a state in which Y-direction polarization (P-polarization) and Z-direction polarization (S-polarization) are equal to each other. Thus, each color light beam incident on the PS converter 17 is converted into a polarization state in which P-polarization and S-polarization are equal to each other.

Figure 11:
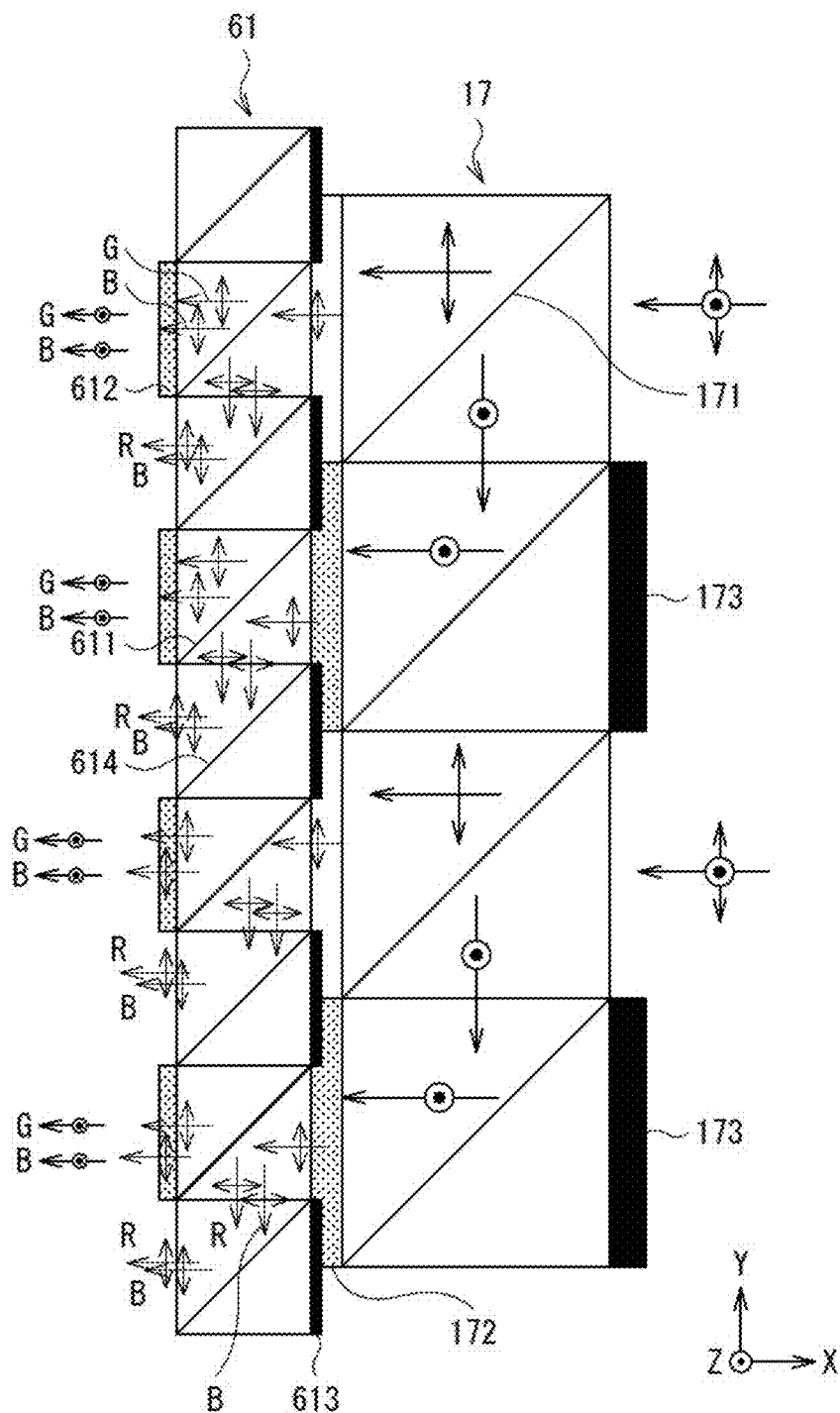
FIG. 11 is a schematic cross-sectional view of configuration examples of a PS converter and a dichroic converter in the optical system according to the second embodiment.

FIG. 11 schematically illustrates configuration examples of the PS converter 17 and the dichroic converter 61 in the optical system according to the second embodiment.

The PS converter 17 includes a plurality of prism blocks in which a polarization film 171 is formed. On alight incident surface along an X direction of the PS converter 17, a shielding region 173 is formed in the Y direction in every other prism block of the plurality of prism blocks. In addition, on a light output surface along the X direction of the PS converter 17, a half-wave plate 172 is formed in the Y direction in every other prism block of the plurality of prism blocks. The shielding region 173 and the half-wave plate 172 are formed in the same prism blocks of the plurality of prism blocks.

The dichroic converter 61 includes a plurality of prism blocks. The plurality of prism blocks includes first prism blocks in which a dichroic film 611 is formed and second prism blocks in which a total reflection film 614 is formed, and the first prism blocks and the second prism blocks are configured to be alternately disposed in the Y direction. On a light output surface along the X direction of the first prism block in which the dichroic film 611 is formed, a half-wave plate 612 is formed. On a light incident surface along the X direction of the second prism block in which the total reflection film 614 is formed, a shielding region 613 is formed.

The dichroic converter 61 is disposed adjacent to the PS converter 17. The PS converter 17 receives a non-polarized light beam, and allows a P-polarized component of the non-polarized light beam to pass therethrough, and reflects an S-polarized component of the non-polarized light beam. The prism block in the PS converter 17 is a polarization prism; therefore, an S-polarized component reflected by the polarization film 171 in a certain prism block is further reflected by the polarization film 171 in another prism block and passes through the half-wave plate 172, thereby being converted into a P-polarized component again. Consequently, the PS converter 17 is able to convert polarization. The PS converter 17 is disposed on an output side of the lens array 16, and the shielding region 173 is provided between formed point images, thereby achieving polarization conversion while reducing a light amount loss. Further, the dichroic converter 61 exerts a color conversion action on a light beam having passed through the PS converter 17. In the prism blocks in which the dichroic converter 61 is formed, the dichroic films 611 and the total reflection films 614 are alternately formed. The dichroic film 611 is configured to reflect a red light beam and 50% of a blue light beam, and to allow a green light beam and 50% of the blue light beam to pass therethrough. The total reflection film 614 has an action of reflecting all light beams. The dichroic converter 61 allows alight beam reflected by the dichroic film 611 and further reflected by the total reflection film 614 to pass through the half-wave plate 612 that rotates a polarization direction by 90 deg., which makes it possible to convert a green-blue light beam and a red-blue light beam into polarizations orthogonal to each other.

Figure 12:
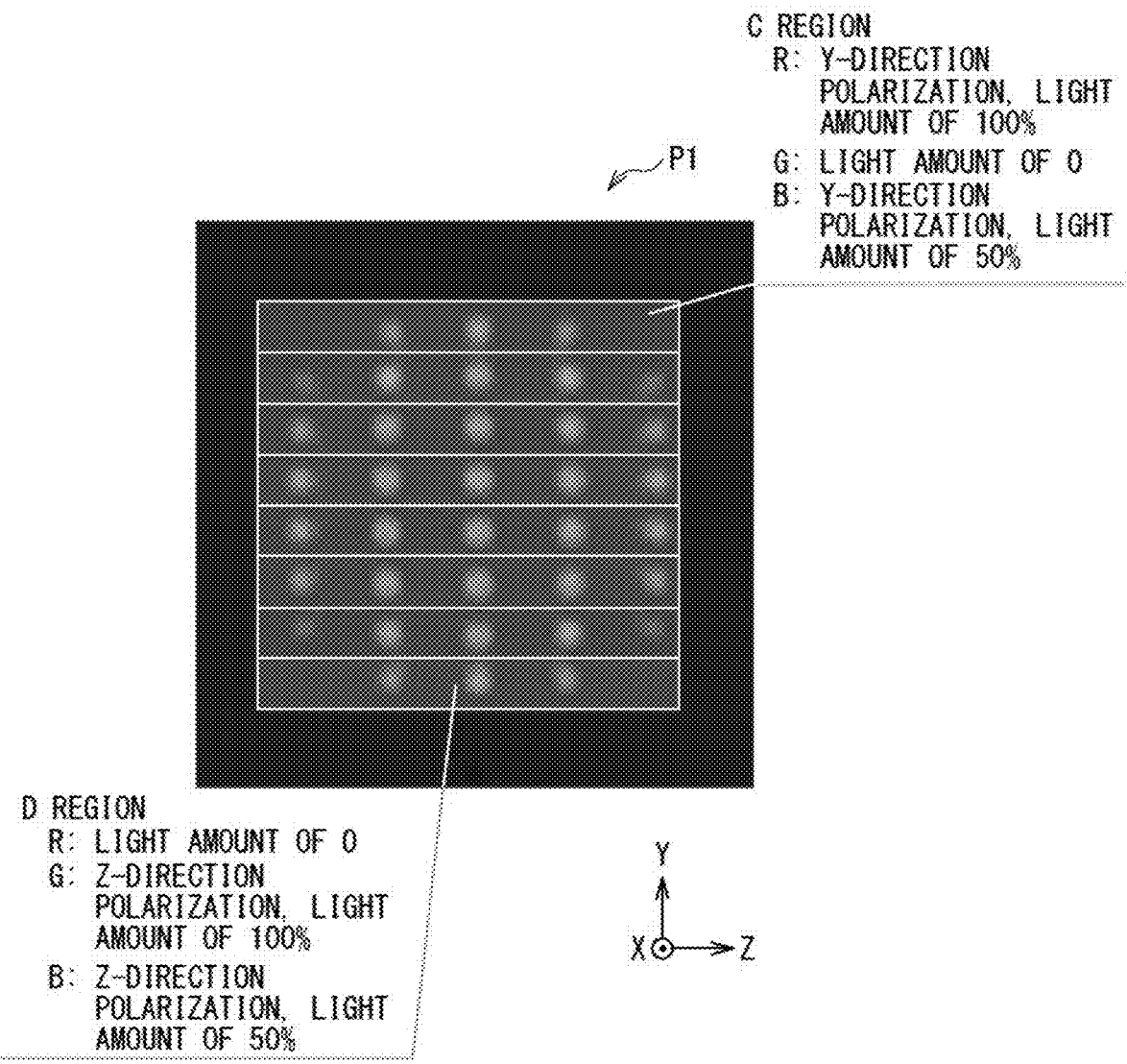
FIG. 12 is an explanatory diagram illustrating an example of a polarization state in a pupil of an illumination optical system of the optical system according to the second embodiment.

FIG. 12 illustrates an example of a polarization state in a pupil of the illumination optical system 1A of the optical system according to the second embodiment.

As illustrated in FIG. 12, the divided C regions and the divided D regions are alternately arranged in a vertical direction at the pupil position P1 of the illumination optical system 1A. The C region corresponds to a region in which the half-wave plate 612 in the dichroic converter 61 illustrated in FIG. 11 is formed. The D region corresponds to a region in which the half-wave plate 612 in the dichroic converter 61 illustrated in FIG. 11 is not formed. A light beam passing through the C region includes a red light beam having a light amount of 100% and a blue light beam having a light amount of 50%, and a polarization direction thereof is the Y direction (P-polarization). In addition, alight beam passing through the D region includes a green light beam having a light amount of 100% and a blue light beam having a light amount of 50%, and a polarization direction thereof is the Z direction (S-polarization). The polarization direction of a light beam outputted from the C region is the Y direction, and the light beam therefore reaches the second light valve 32. The polarization direction of a light beam outputted from the D region is the Z direction, and the light beam therefore reaches the first light valve 31. Thereafter, the light beams converted into orthogonal-direction polarization by the first light valve 31 and the second light valve 32 receive an action of each divided region by the region-division polarizer 62 in a pupil of the projection optical system 2A.

Figure 13:
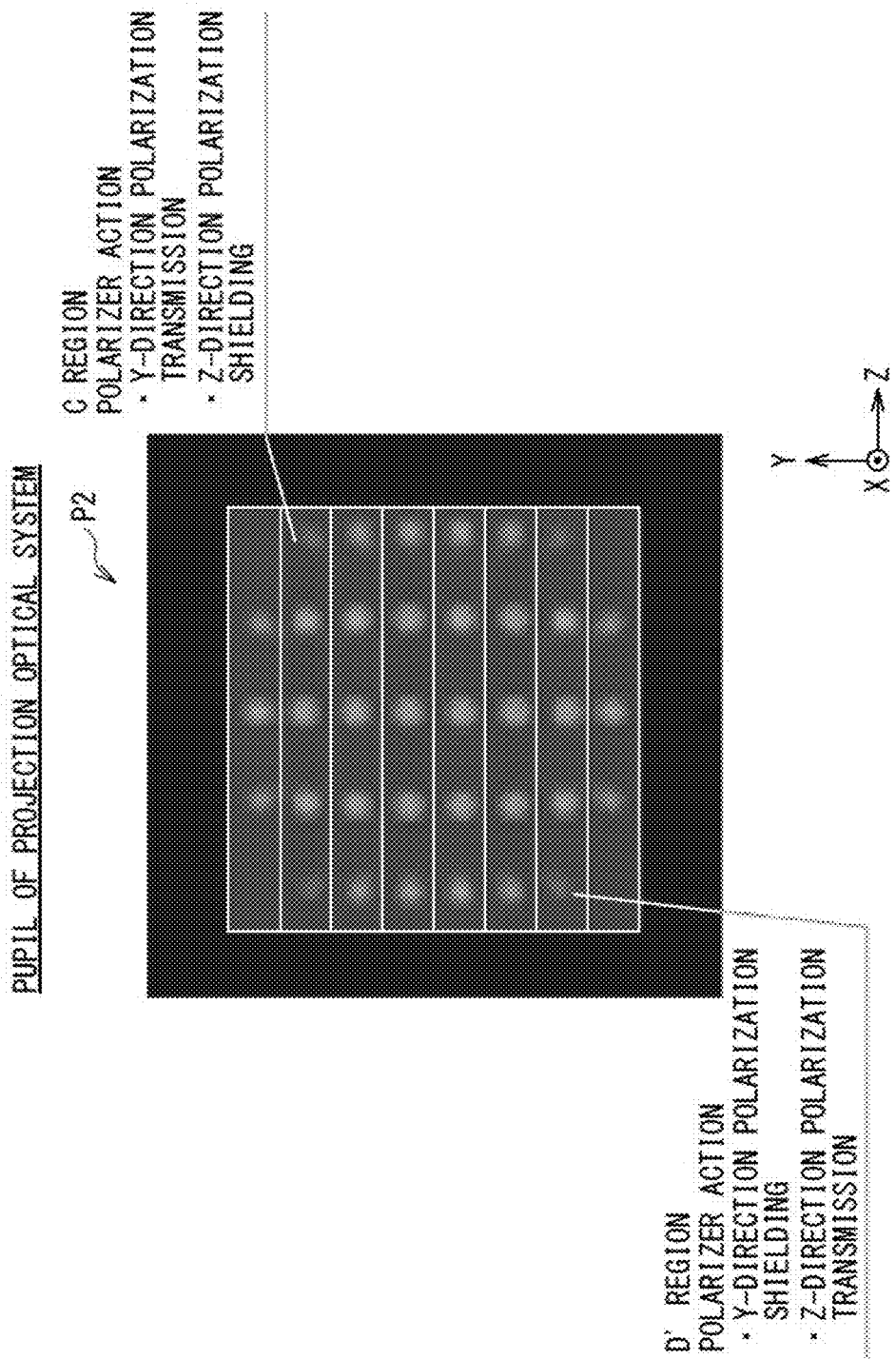
FIG. 13 is an explanatory diagram illustrating an example of a polarization state in a pupil of a projection optical system of the optical system according to the second embodiment.

FIG. 13 illustrates an example of a polarization state in the pupil of the projection optical system 2A of the optical system according to the second embodiment.

As illustrated in FIG. 13, the divided C' regions and the divided D' regions are alternately arranged in the vertical direction at the pupil position P2 of the projection optical system 2A. A portion of the C' region at the pupil position P2 of the projection optical system 2A is conjugate to the C region at the pupil position P1 of the illumination optical system 1A, and a portion of the D' region at the pupil position P2 of the projection optical system 2A is conjugate to a portion of the D region at the pupil position P1 of the illumination optical system 1A. Accordingly, only the Y direction (P-polarization) reaches the C' region without fail, and only the Z direction (S-polarization) reaches the D' region without fail. If the region-division polarizer 62 is caused to act to give a polarizer effect of transmission of Y-direction polarization and shielding of Z-direction polarization to the C' region and give a polarizer effect of transmission of Z-direction polarization and shielding of Y-direction polarization to the D' region in this state, an effect as a post polarizer for each of the first light valve 31 and the second light valve 32 is given, which makes it possible to increase contrast.

An advantage of the configuration of the optical system according to the second embodiment is that the notch filter 15 is not necessary because the first region-division wavelength selective wave plate 51 is not used. In the optical system according to the first embodiment, the post polarizer 22 that blocks a desired polarization direction of a light beam from each light valve is inherently desired to be disposed. However, as described above, according to the wavelength selectivity characteristics of the first region-division wavelength selective wave plate 51 and the second region-division wavelength selective wave plate 52, polarization in a different direction that is not able to be blocked by the post polarizer 22 is generated in the red-green switching region, and the post polarizer 22 does not function as a perfect post polarizer. In contrast, in the configuration of the optical system according to the second embodiment, similarly, conversion of reflection and transmission depending on a polarization direction is not perfect in the red-green switching region, but a direction of generated polarization is configured to be determined in the pupil of the illumination optical system 1A depending on whether guiding is performed to the C region or the D region. A light beam outputted from the C region is guided to the C' region of the pupil of the projection optical system 2A without fail, and a light beam outputted from the D region is guided to the D' region of the pupil of the projection optical system 2A without fail; therefore, it is possible to dispose a target post polarizer (the region-division polarizer 62) for each polarization without fail, and it can be seen that the notch filter 15 is not necessary to increase contrast. In other words, an advantage is a configuration in which imperfection of conversion in the red-green switching region is not imposed on polarization.

Figure 14:
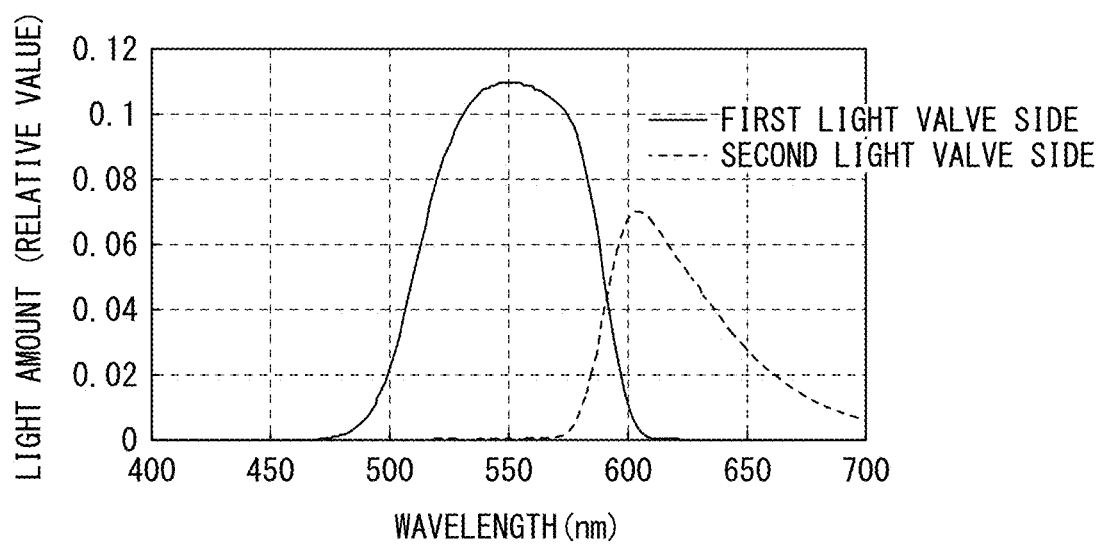
FIG. 14 is an explanatory diagram illustrating an example of spectra of light beams reaching first and second light valves in the optical system according to the second embodiment.

FIG. 14 illustrates an example of spectra of light beams reaching the first and second light valves 31 and 32 in the optical system according to the second embodiment. It can be seen that light beams in the red-green switching region are allocated to respective light valves while being mixed. In the optical system according to the second embodiment, polarization of each light valve is in one direction, and mixture of polarizations does not occur in principle. This consequently makes it possible to eliminate a light amount loss caused by the notch filter 15 used in the optical system according to the first embodiment and achieve both an improvement in contrast and measures for panel light resistance while achieving an improvement in luminance by a little less than 30%. In this configuration, contrast of 1000:1 is expected in principle similarly to the optical system according to the first embodiment.

As described above, according to the optical system according to the second embodiment, replacing the first region-division wavelength selective wave plate 51 with the dichroic converter 61 makes it possible to eliminate a conversion loss caused by the first region-division wavelength selective wave plate 51 and maintain high contrast while significantly increasing brightness.

Other configurations, actions, and effects may be substantially similar to those in the optical system according to the first embodiment described above.

3. Third Embodiment

Next, description is given of an optical system according to a third embodiment of the present disclosure. It is to be noted that in the following description, components that are substantially the same as those of the optical system according to the first or second embodiment described above are indicated by the same reference signs, and description thereof is omitted as appropriate.

Figure 15:
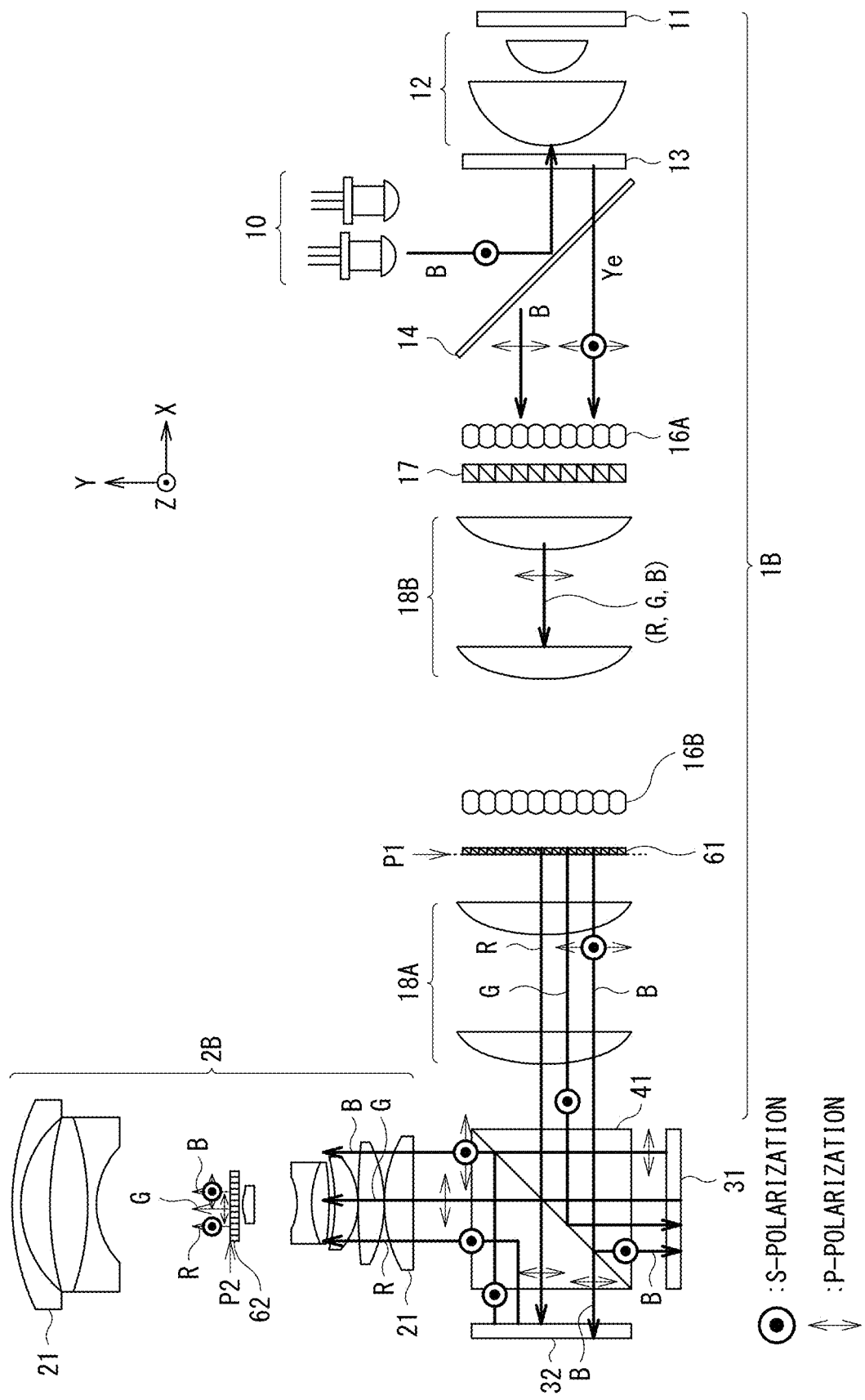
FIG. 15 is a configuration diagram schematically illustrating an entire configuration example of an optical system according to a third embodiment.

FIG. 15 schematically illustrates an entire configuration example of the optical system according to the third embodiment.

The second embodiment indicates the configuration example of the optical system that makes it possible to improve contrast while reducing a light amount loss. However, in actuality, in the dichroic converter 61 in contact with the PS converter 17, a loss of an angle component is easily increased in terms of etendue, because the PS converter 17 has the shielding region 173. To keep a certain etendue, it is necessary to increase a diameter of a light flux incident on the lens array 16; therefore, an unwanted case is present in terms of an entire size. In this case, it is possible to configure an optical system as illustrated in FIG. 15.

As illustrated in FIG. 15, the optical system according to the third embodiment includes an illumination optical system 1B and a projection optical system 2B. The illumination optical system 1B includes a first lens array 16A and a second lens array 16B in place of the lens array 16 in the configuration of the illumination optical system 1A (FIG. 10) in the second embodiment. In addition, the illumination optical system 1B includes a first relay lens 18A and a second relay lens 18B in place of the relay lens 18 in the configuration of the illumination optical system 1A in the second embodiment. In addition, the illumination optical system 1B has a configuration different from the configuration of the illumination optical system 1A in the second embodiment in that the half-wave plate 19 is omitted.

The projection optical system 2B has a configuration similar to that of the projection optical system 2A (FIG. 10) in the second embodiment.

The illumination optical system 1B corresponds to a specific example of a "first optical system" in the technology of the present disclosure. The projection optical system 2B corresponds to a specific example of a "second optical system" in the technology of the present disclosure.

The optical system according to the third embodiment is a system having a configuration different from the configuration of the optical system according to the second embodiment in that the PS converter 17 and the dichroic converter 61 are separated and are coupled to each other by the second relay lens 18B and the second lens array 16B. In this system, uniform illumination is formed once by the first lens array 16A, the PS converter 17, and the second relay lens 18B, and uniform illumination with respect to the first light valve 31 and the second light valve 32 is generated again by the second lens array 16B, the dichroic converter 61, and the first relay lens 18A. Configurations and actions subsequent to this are similar to those of the optical system according to the second embodiment, and it is possible to increase contrast with use of pupil conjugate. In the optical system according to the third embodiment, it is possible to adjust a pitch between the PS converter 17 and the dichroic converter 61, which consequently makes it possible to downsize the shielding region 173 of the PS converter 17. Accordingly, an issue of the etendue described above hardly occurs, which makes it possible to significantly increase light use efficiency while reducing the volume of the entire system.

Figure 16:
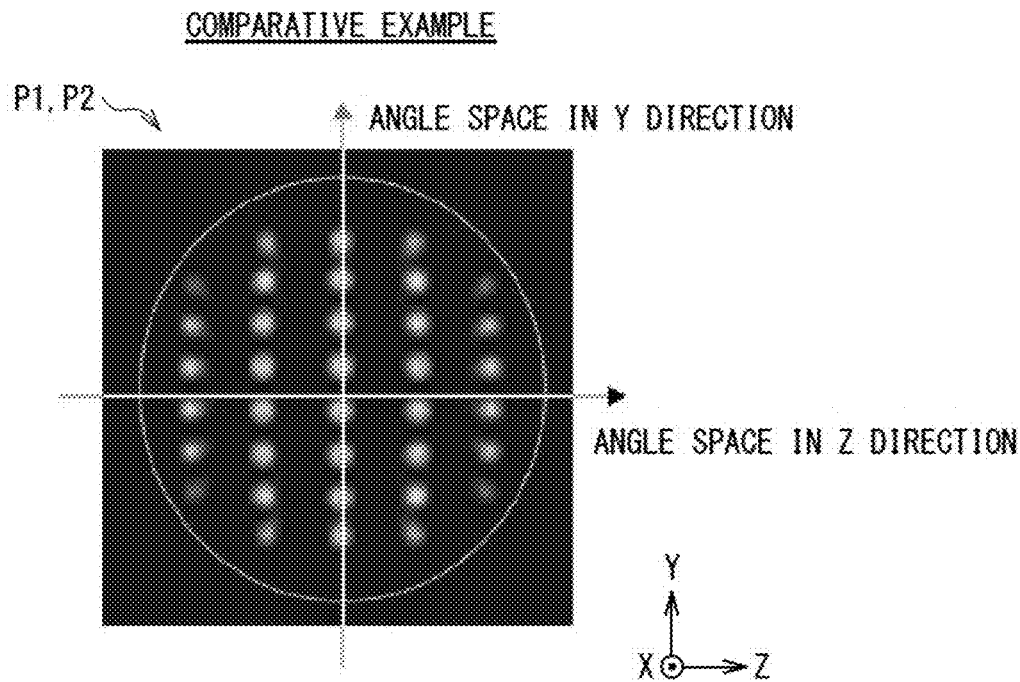
FIG. 16 is an explanatory diagram illustrating an example of a pupil shape of the illumination optical system or the projection optical system of the optical system according to the second embodiment.
Figure 17:
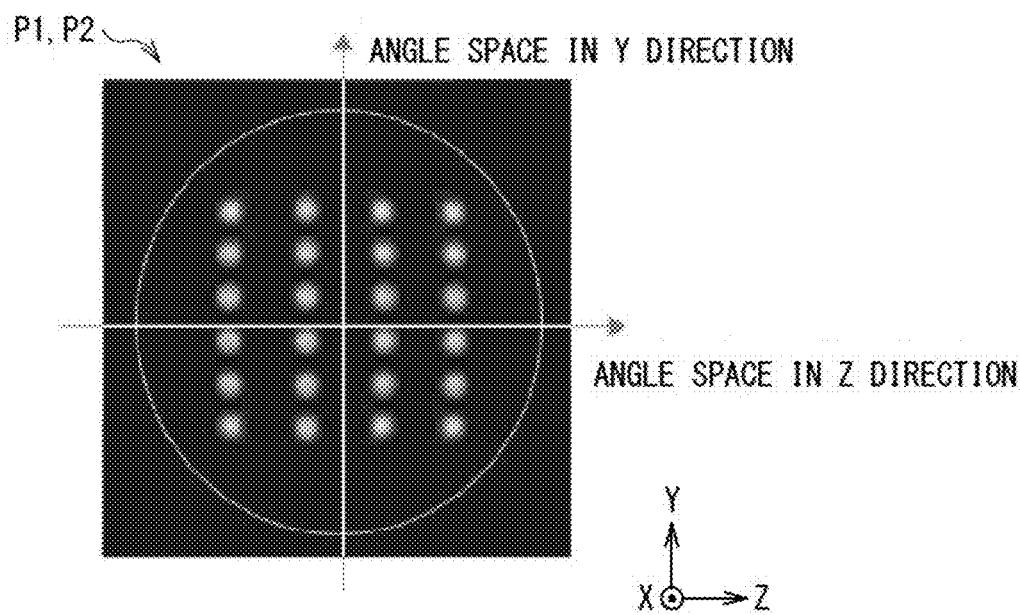
FIG. 17 is an explanatory diagram illustrating an example of a pupil shape of an illumination optical system or a projection optical system of the optical system according to the third embodiment.

FIG. 16 illustrates an example of a pupil shape of the illumination optical system 1A or the projection optical system 2A of the optical system according to the second embodiment as a comparative example with respect to the optical system according to the third embodiment. FIG. 17 illustrates an example of a pupil shape of the illumination optical system 1B or the projection optical system 2B of the optical system according to the third embodiment.

As illustrated in FIG. 16, the pupil shape in the optical system according to the second embodiment is a substantially circular shape. In contrast to this, in the optical system according to the third embodiment, an image in front of the second lens array 16B formed by the first lens array 16A becomes the pupil shape, which is substantially square. This adversely affects laser safety standards and the like in some cases. To solve this, it is more preferable to configure an optical system according to a fourth embodiment to be described later.

It is to be noted that in the optical system according to the third embodiment, even in a case where the polarization maintaining diffuser region 112 in the phosphor wheel 11 has a simple total reflection configuration, there is an advantage that it is possible to make a pupil distribution of a blue light beam the same as a pupil distribution of a yellow light beam and it is possible to achieve cost reduction and simplification of a manufacturing process.

Other configurations, actions, and effects may be substantially similar to those in the optical system according to the second embodiment described above.

4. Fourth Embodiment

Next, description is given of an optical system according to a fourth embodiment of the present disclosure. It is to be noted that in the following description, components that are substantially the same as those of the optical system according to any of the first to third embodiments described above are indicated by the same reference signs, and description thereof is omitted as appropriate.

Figure 18:
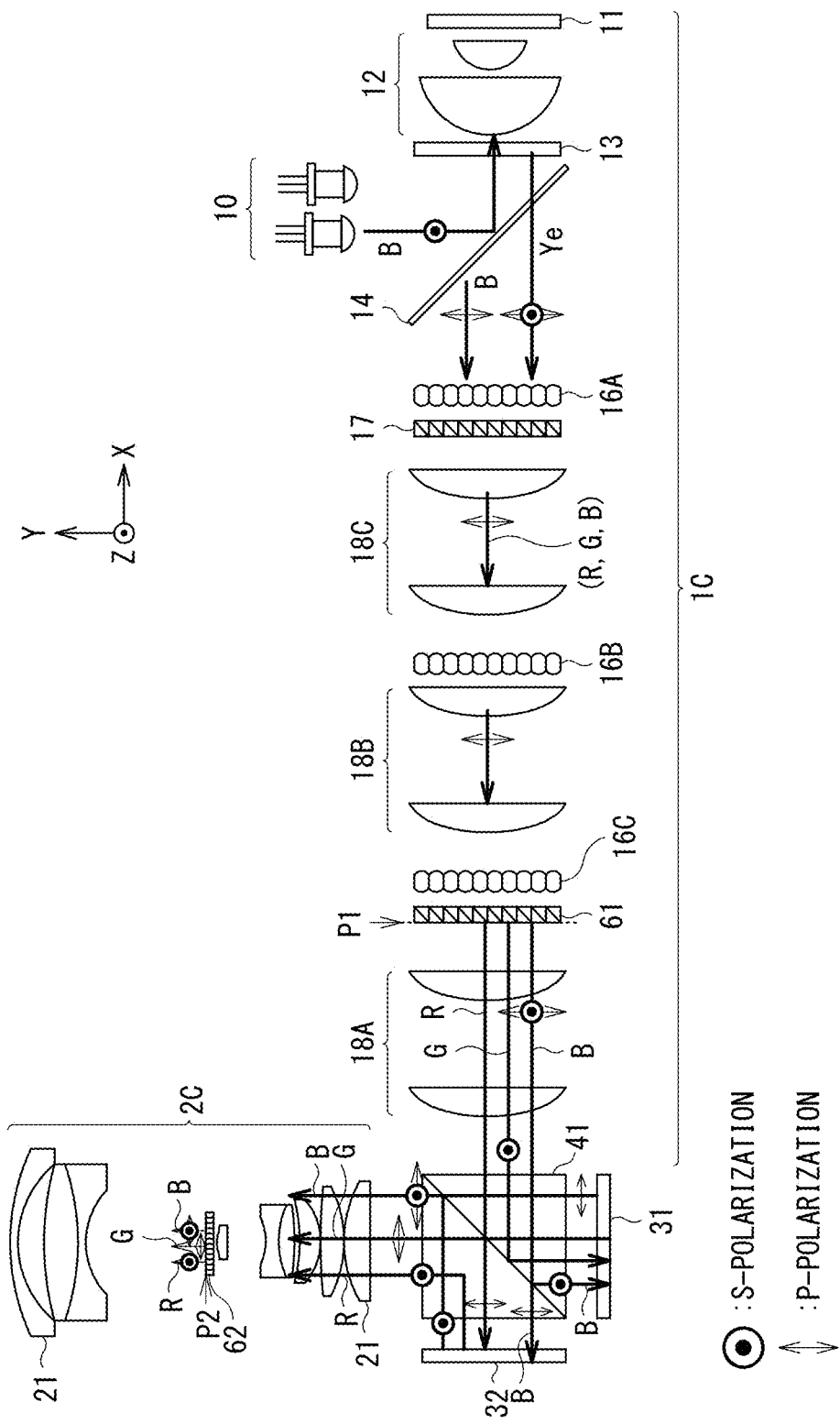
FIG. 18 is a configuration diagram schematically illustrating an entire configuration example of an optical system according to a fourth embodiment.

FIG. 18 schematically illustrates an entire configuration example of the optical system according to the fourth embodiment.

As illustrated in FIG. 18, the optical system according to the fourth embodiment includes an illumination optical system 1C and a projection optical system 2C.

The illumination optical system 1C includes a first lens array 16A, a second lens array 16B, and a third lens array 16C in place of the lens array 16 in the configuration of the illumination optical system 1A (FIG. 10) in the second embodiment. In addition, the illumination optical system 1C includes a relay lens 18A, a second relay lens 18B, and a third relay lens 18C in place of the relay lens 18 in the configuration of the illumination optical system 1A in the second embodiment. In addition, the illumination optical system 1C has a configuration different from the configuration of the illumination optical system 1A in the second embodiment in that the half-wave plate 19 is omitted.

The projection optical system 2C has a configuration similar to that of the projection optical system 2A (FIG. 10) in the second embodiment.

The illumination optical system 1C corresponds to a specific example of a "first optical system" in the technology of the present disclosure. The projection optical system 2C corresponds to a specific example of a "second optical system" in the technology of the present disclosure.

In the optical system according to the fourth embodiment, as illustrated in FIG. 18, a relay lens system of the illumination optical system 1C has three stages for measures for the pupil shape (FIG. 17) in the configuration of the optical system according to the third embodiment. In the illumination optical system 1C, the first lens array 16A is configured as a rectangular lens array, the second lens array 16B is configured as a hexagonal lens array, and the third lens array 16C is configured as a rectangular lens array. By doing so, the first lens array 16A, the PS converter 17, and the third relay lens 18C have a polarization rectification action. In addition, the second lens array 16B and the second relay lens 18B generate hexagonal illumination (which later becomes a pupil). In addition, the third lens array 16C, the dichroic converter 61, and the first relay lens 18A have a polarization conversion function for color separation and each light valve and a function of generating uniform rectangular illumination to each light valve. Configurations and actions subsequent to this are similar to those in the second embodiment, and it is possible to increase contrast with use of pupil conjugate.

Figure 19:
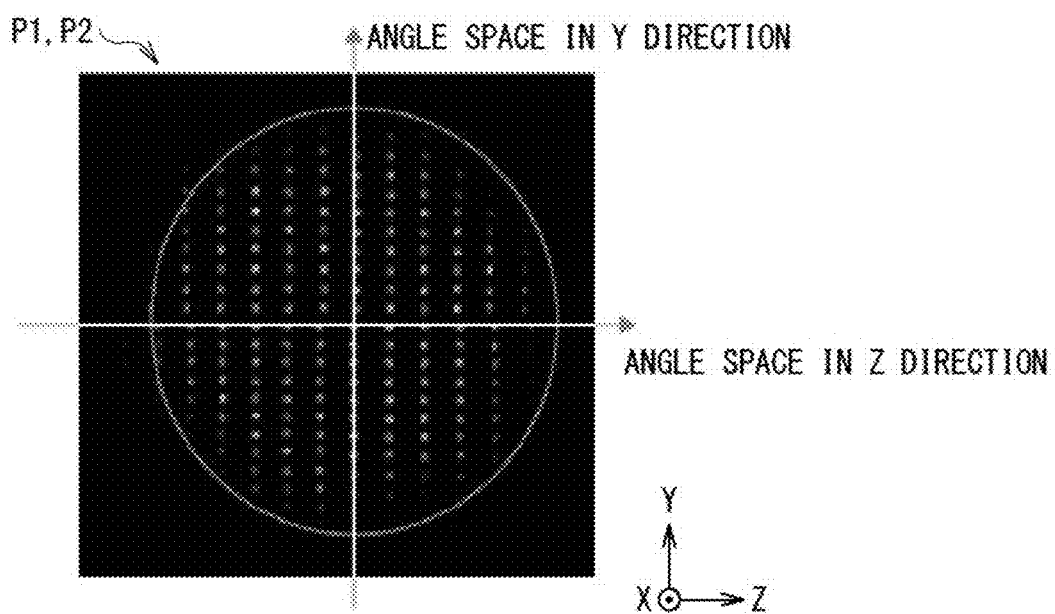
FIG. 19 is an explanatory diagram illustrating an example of a pupil shape of an illumination optical system or a projection optical system of the optical system according to the fourth embodiment.

FIG. 19 illustrates an example of a pupil shape of the illumination optical system 1C or the projection optical system 2C of the optical system according to the fourth embodiment. In the optical system according to the fourth embodiment, as illustrated in FIG. 19, it is possible to configure the pupil shape close to a hexagonal shape, and avoid a square-shaped pupil that is an issue in the third embodiment described above. In addition, the optical system according to the fourth embodiment is able to have a configuration in which the polarization maintaining diffuser region 112 on the phosphor wheel 11 is simple reflection, as with the optical system according to the third embodiment.

Other configurations, actions, and effects may be substantially similar to those in the optical system according to the second or third embodiment described above.

5. Fifth Embodiment

Next, description is given of an optical system according to a fifth embodiment of the present disclosure. It is to be noted that in the following description, components that are substantially the same as those of the optical system according to any of the first to fourth embodiments described above are indicated by the same reference signs, and description thereof is omitted as appropriate.

Figure 20:
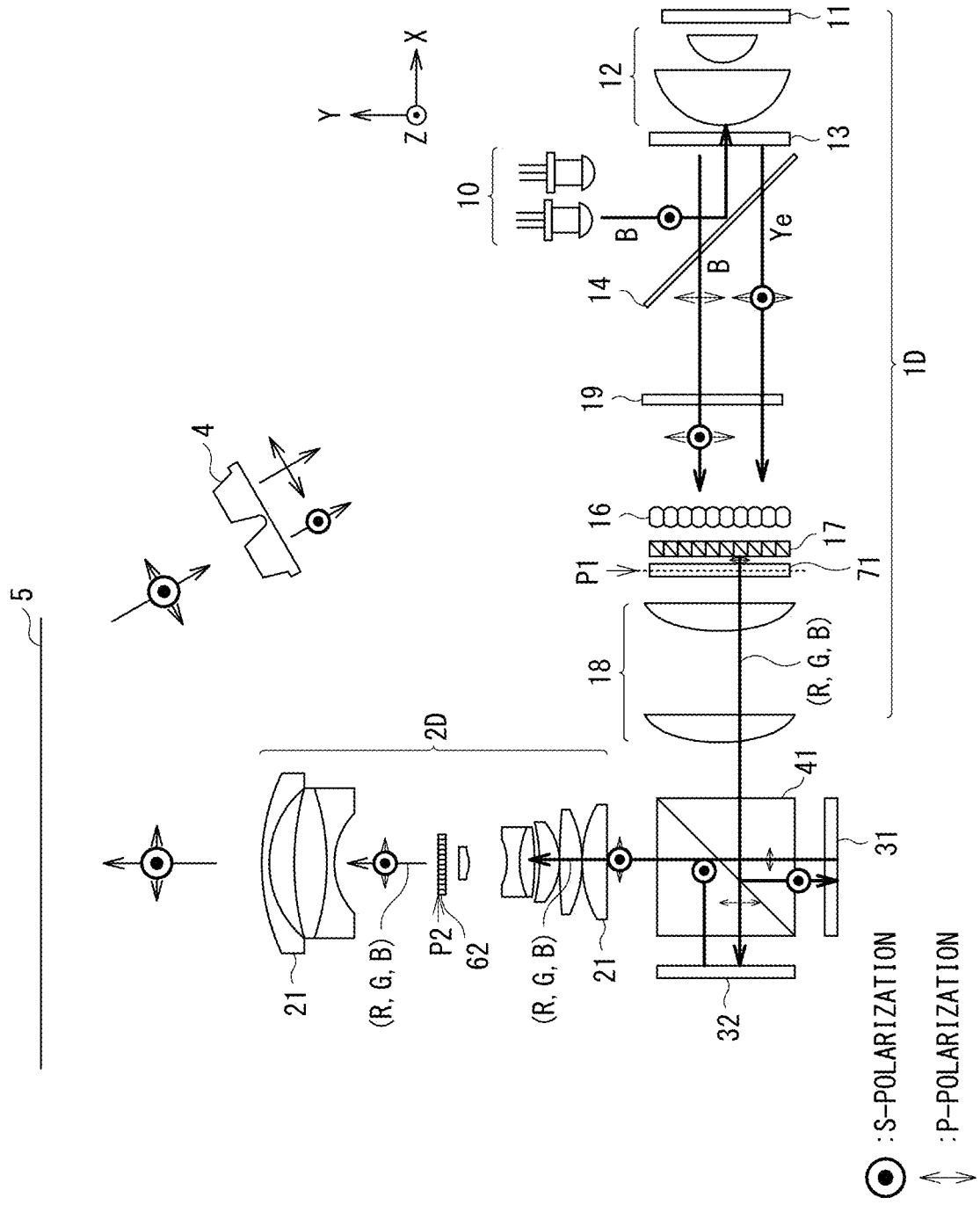
FIG. 20 is a configuration diagram schematically illustrating an entire configuration example of an optical system according to a fifth embodiment.

FIG. 20 schematically illustrates an entire configuration example of the optical system according to the fifth embodiment.

As illustrated in FIG. 20, the optical system according to the fifth embodiment includes an illumination optical system 1D and a projection optical system 2D.

The illumination optical system 1D has a configuration different from the configuration of the illumination optical system 1 (FIG. 1) in the first embodiment in that a region-division wave plate 71 is disposed at the pupil position P1 of the illumination optical system 1D in place of the first region-division wavelength selective wave plate 51. In addition, the illumination optical system 1D has a configuration different from the configuration of the illumination optical system 1 in the first embodiment in that the notch filter is omitted and the half-wave plate 19 is disposed subsequent to the wavelength selective PBS 14. The region-division wave plate 71 has a plurality of divided regions having mutually different polarization actions. The plurality of divided regions in the region-division wave plate 71 is, for example, a D region and an E region illustrated in FIG. 21 to be described later.

The projection optical system 2D has a configuration different from the configuration of the projection optical system 2 (FIG. 1) in the first embodiment in that the post polarizer 22 is omitted and the region-division polarizer 62 is disposed at the pupil position P2 of the projection optical system 2D in place of the second region-division wavelength selective wave plate 52. The region-division polarizer 62 has a plurality of divided regions having mutually different polarization actions. In the region-division polarizer 62, the plurality of divided regions has an action of allowing light beams in mutually polarization directions to pass therethrough. The plurality of divided regions in the region-division polarizer 62 is, for example, a D' region and an E' region illustrated in FIG. 22 to be described later. The region-division polarizer 62 has an action as a region-divided post polarizer.

The illumination optical system 1D corresponds to a specific example of a "first optical system" in the technology of the present disclosure. The projection optical system 2D corresponds to a specific example of a "second optical system" in the technology of the present disclosure. The region-division wave plate 71 corresponds to a specific example of a "first optical element" in the technology of the present disclosure. The region-division polarizer 62 corresponds to a specific example of a "second optical element" in the technology of the present disclosure.

The optical system according to the fifth embodiment further includes polarized glasses 4 and a polarization maintaining screen 5, which makes it possible to configure the optical system as a 3D (three-dimensional) display apparatus. A right eye image and a left-eye image are projected onto the polarization maintaining screen 5 via the projection optical system 2D.

In the optical system according to the fifth embodiment, a light beam incident on the PS converter 17 becomes a state in which Y-direction polarization (P-polarization) and Z-direction polarization (S-polarization) are equal to each other in all colors by providing the half-wave plate 19 in advance. In addition, the optical system according to the fifth embodiment has a configuration in which the wide-band region-division wave plate 71 not having wavelength selectivity is used in place of the first region-division wavelength selective wave plate 51 and split of light to each light valve is performed on all color light beams of red, green, and blue for three-dimensional display. Further, to increase contrast, the region-division polarizer 62 is configured to be disposed at the pupil position P2 of the projection optical system 2D to increase contrast while maintaining polarizations for right eye and left eye. The polarized glasses 4 are crossed polarizer glasses, and a user wearing the polarized glasses 4 is able to view a right eye image and a left-eye image projected onto the polarization maintaining screen 5 as a three-dimensional image.

Figure 21:
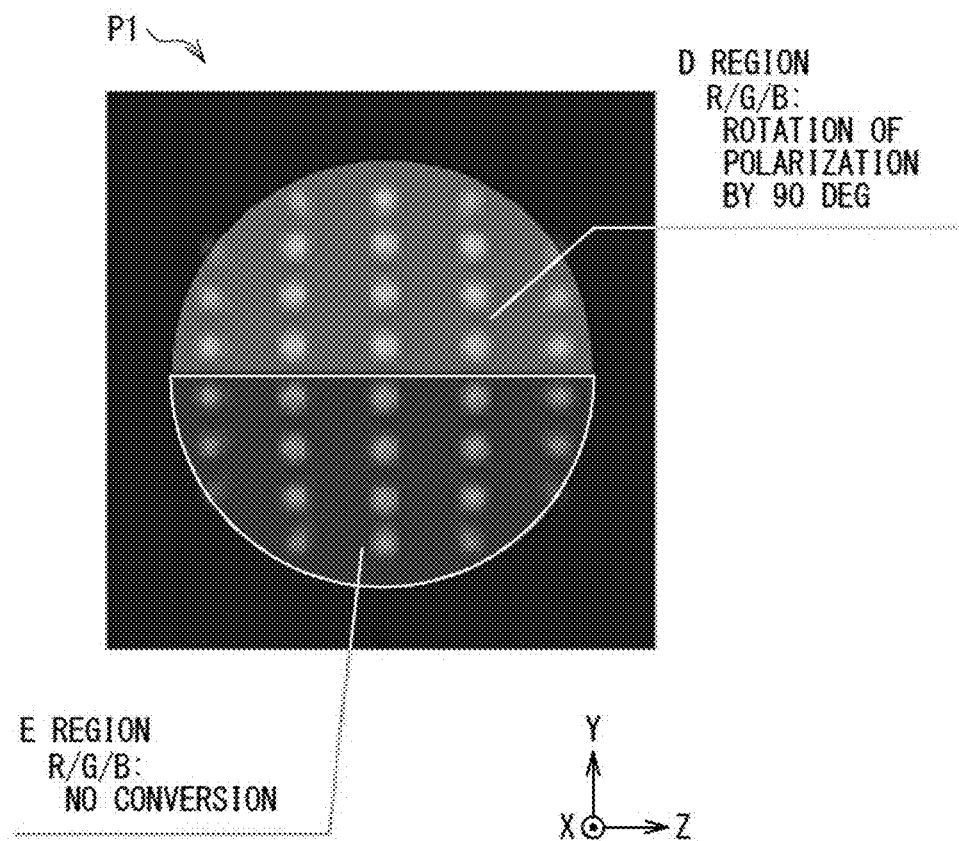
FIG. 21 is an explanatory diagram illustrating an example of a polarization state in a pupil of an illumination optical system of the optical system according to the fifth embodiment.

FIG. 21 illustrates an example of a polarization state in a pupil of the illumination optical system 1D of the optical system according to the fifth embodiment.

As illustrated in FIG. 21, the region-division wave plate 71 is vertically divided into the D region and the E region at the pupil position P1 of the illumination optical system 1D. A configuration is made in which polarizations of all color light beams are rotated by 90 deg. in the D region, and polarizations of all color light beams are not rotated in the E region. This configuration makes it possible to cause all light beams passing through the D region and all light beams passing through the E region to respectively reach the first light valve 31 and the second light valve 32, and makes it possible to respectively use the first light valve 31 and the second light valve 32 as a right eye channel and a left-eye channel, for example.

Figure 22:
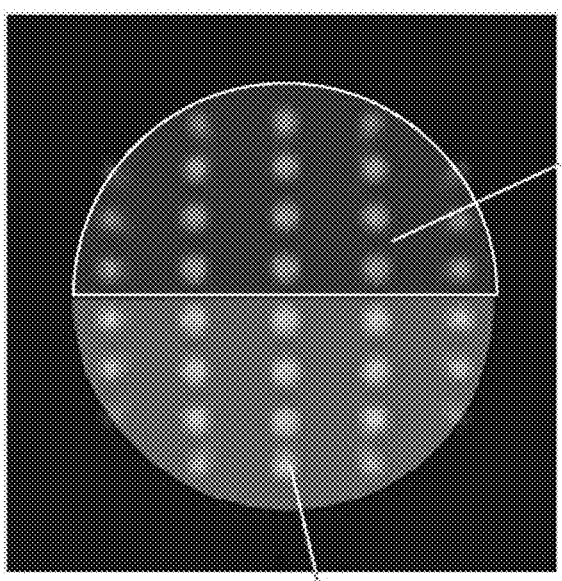
FIG. 22 is an explanatory diagram illustrating an example of a polarization state in a pupil of a projection optical system of the optical system according to the fifth embodiment.

FIG. 22 illustrates an example of a polarization state in a pupil of the projection optical system 2D of the optical system according to the fifth embodiment.

As illustrated in FIG. 22, the region-division polarizer 62 is vertically divided into the E' region and the D' region at the pupil position P2 of the projection optical system 2D. A portion of the D' region at the pupil position P2 of the projection optical system 2D is conjugate to the D region at the pupil position P1 of the illumination optical system 1D, and a portion of the E' region at the pupil position P2 of the projection optical system 2D is conjugate to a portion of the E region at the pupil position P1 of the illumination optical system 1D. All light beams from the first light valve 31 reach the D' region in the projection optical system 2D, and contrast is increased by an action of a polarizer that allows only Y-direction polarization (P-polarization) to pass therethrough. In addition, all light beams from the second light valve 32 reach the E' region, and contrast is increased by an action of a polarizer that allows only Z-direction polarization (S-polarization) to pass therethrough. The optical system according to the fifth embodiment is able to increase contrast to a practical range in spite of being a small two-plate optical system, and further enables polarization three-dimensional display, which makes it possible to achieve simplification and weight reduction of the polarized glasses 4 and make the entire system inexpensive.

It is to be noted that in the optical system according to the fifth embodiment, a boundary between green and red is not regarded as different polarizations; therefore, the notch filter 15 is not necessary.

According to the optical system according to the fifth embodiment, it is possible to increase contrast even during three-dimensional display and decrease an amount of cross-talk in right and left eyes.

Other configurations, actions, and effects may be substantially similar to those in the optical system according to the first embodiment described above.

6. Sixth Embodiment

Next, description is given of an optical system according to a sixth embodiment of the present disclosure. It is to be noted that in the following description, components that are substantially the same as those of the optical system according to any of the first to fifth embodiment described above are indicated by the same reference signs, and description thereof is omitted as appropriate.

Figure 23:
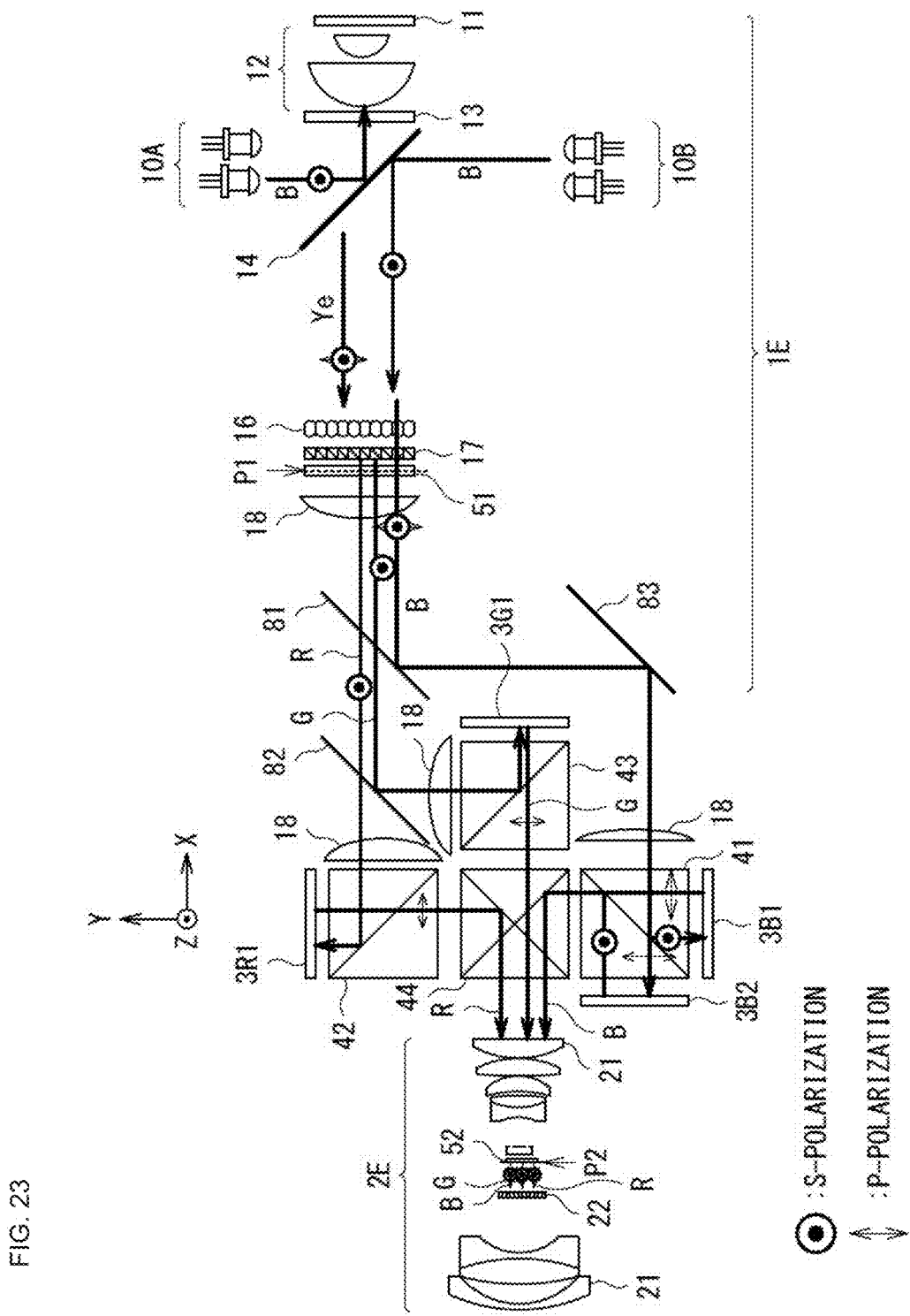
FIG. 23 is a configuration diagram schematically illustrating an entire configuration example of an optical system according to a sixth embodiment.

FIG. 23 schematically illustrates an entire configuration example of the optical system according to the sixth embodiment.

In the sixth embodiment, an example of a four-plate configuration is described as an example in which the number of light valves is increased. As illustrated in FIG. 23, the optical system according to the sixth embodiment includes an illumination optical system 1E and a projection optical system 2E. In addition, the optical system according to the sixth embodiment includes two blue light valves 3B1 and 3B2, one red light valve 3R1, one green light valve 3G1, PBSs 41, 42, and 43, and a dichroic cube 44 in an optical path between the illumination optical system 1E and the projection optical system 2E.

The illumination optical system 1E includes a first blue light source 10A, a second blue light source 10B, the phosphor wheel 11, the light-condensing lens 12, the quarter-wave plate 13, the wavelength selective PBS 14, the lens array 16, the PS converter 17, the first region-division wavelength selective wave plate 51, and the relay lens 18. In addition, the illumination optical system 1E includes a first color plate 81, a second color plate 82, and a total reflection mirror 83.

The projection optical system 2E has a configuration similar to that of the projection optical system 2 (FIG. 1) in the first embodiment.

The illumination optical system 1E corresponds to a specific example of a "first optical system" in the technology of the present disclosure. The projection optical system 2E corresponds to a specific example of a "second optical system" in the technology of the present disclosure. The first region-division wavelength selective wave plate 51 corresponds to a specific example of a "first optical element" in the technology of the present disclosure. The second region-division wavelength selective wave plate 52 corresponds to a specific example of a "second optical element" in the technology of the present disclosure. The PBS 41 corresponds to a specific example of a polarization splitter" in the technology of the present disclosure.

The PBS 41 is provided in an optical path of a blue light beam outputted from the illumination optical system 1E, and causes the blue light beam to be incident on the blue light valve 3B1 and the blue light valve 3B2 by splitting the blue light beam by a difference in polarization. The PBS 42 is provided in an optical path of a red light beam outputted from the illumination optical system 1E, and causes the red light beam to be incident on the red light valve 3R1. The PBS 43 is provided in an optical path of a green light beam outputted from the illumination optical system 1E, and causes the green light beam to be incident on the green light valve 3G1. The dichroic cube 44 combines respective color light beams modulated by the respective light valves, and outputs the combined light beams toward the projection optical system 2E.

The optical system according to the sixth embodiment has a three-plate configuration of R, G, and B as a basic configuration, and two light valves (the blue light valves 3B1 and 3B2) are disposed only in a B channel for measures for light resistance. In addition, in the optical system according to the sixth embodiment, the phosphor wheel 11 does not have the polarization maintaining diffuser region 112 (FIG. 2), and the phosphor region 111 is continuously irradiated with a blue light beam from the first blue light source 10A. This causes the phosphor wheel 11 to emit a yellow light beam not in a time-divisional manner but continuously. A blue light beam is continuously outputted from the second blue light source 10B. The blue light beam from the second blue light source 10B is reflected by the wavelength selective PBS 14 to be combined with the yellow light beam from the phosphor wheel 11. In the optical system according to the sixth embodiment, each light valve is dedicated to each color, and time division of colors is not performed.

Figure 24:
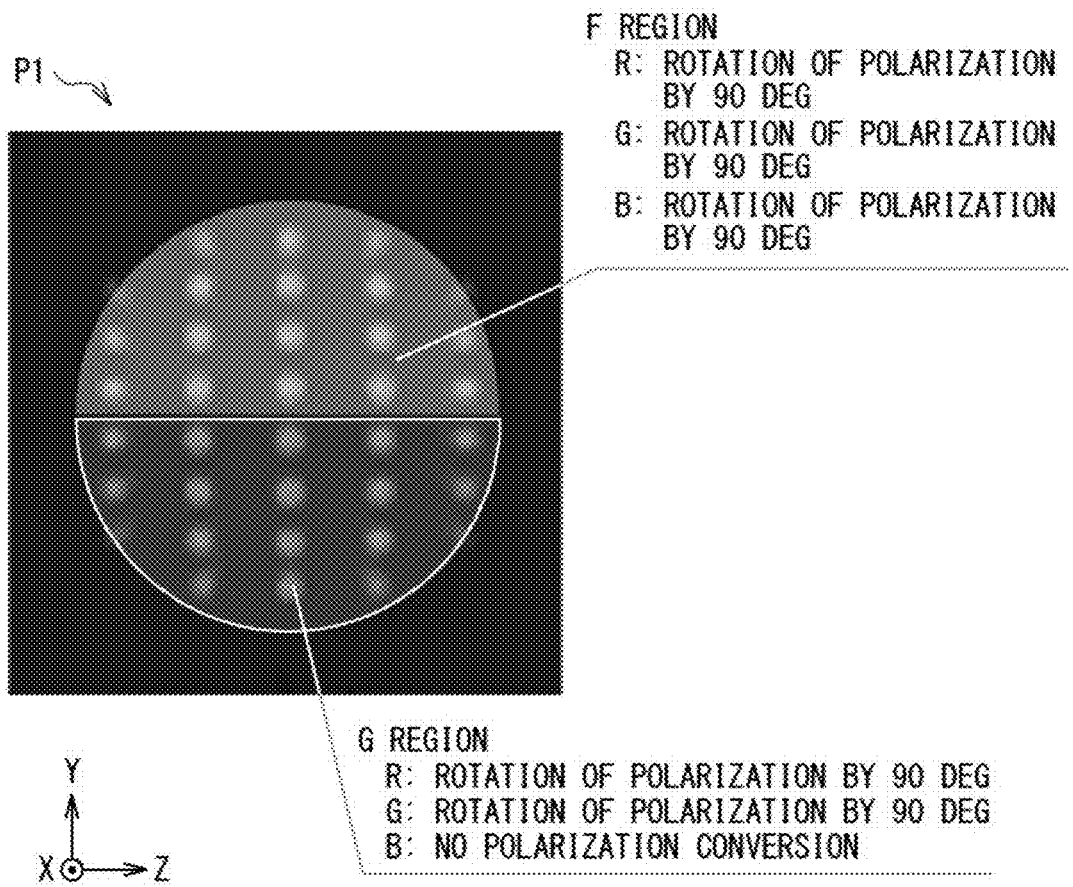
FIG. 24 is an explanatory diagram illustrating an example of a polarization state in a pupil of an illumination optical system of the optical system according to the sixth embodiment.

FIG. 24 illustrates an example of a polarization state in a pupil of the illumination optical system 1E of the optical system according to the sixth embodiment.

As illustrated in FIG. 24, the first region-division wavelength selective wave plate 51 are vertically divided into an F region and a G region at the pupil position P1 of the illumination optical system 1E. In the F region, polarization is rotated by 90 deg. irrespective of respective colors of R, G, and B, and in the G region, polarization of only a blue light beam is not converted, and polarizations of color light beams other than the blue light beam are rotated by 90 deg. Doing so makes it possible to mix two types of polarizations of the blue light beam, and makes it possible to split the blue light beam for the blue light valve 3B1 and the blue light valve 3B2. Accordingly, the blue light beam to be incident on the light valve is reduced by half to extend the life of the system. The red light beam and the green light beam are split by the first color plate 81 and the second color plate 82 to be respectively guided to the red light valve 3R1 and the green light valve 3G1. The red light beam and the green light beam are incident in an S-polarization state, and are outputted in a P-polarization state. The respective color light beams of R, G, and B outputted from the respective light valves are combined by the dichroic cube 44, and guided to the projection optical system 2E. The polarization directions at this time of the red light beam and the green light beam when being incident on the projection optical system 2E are Y-direction polarization (P-polarization), and the polarization direction at this time of blue light beam when being incident on the projection optical system 2E is in a mixed state of Y-direction polarization (P-polarization) and Z-direction polarization (S-polarization).

Figure 25:
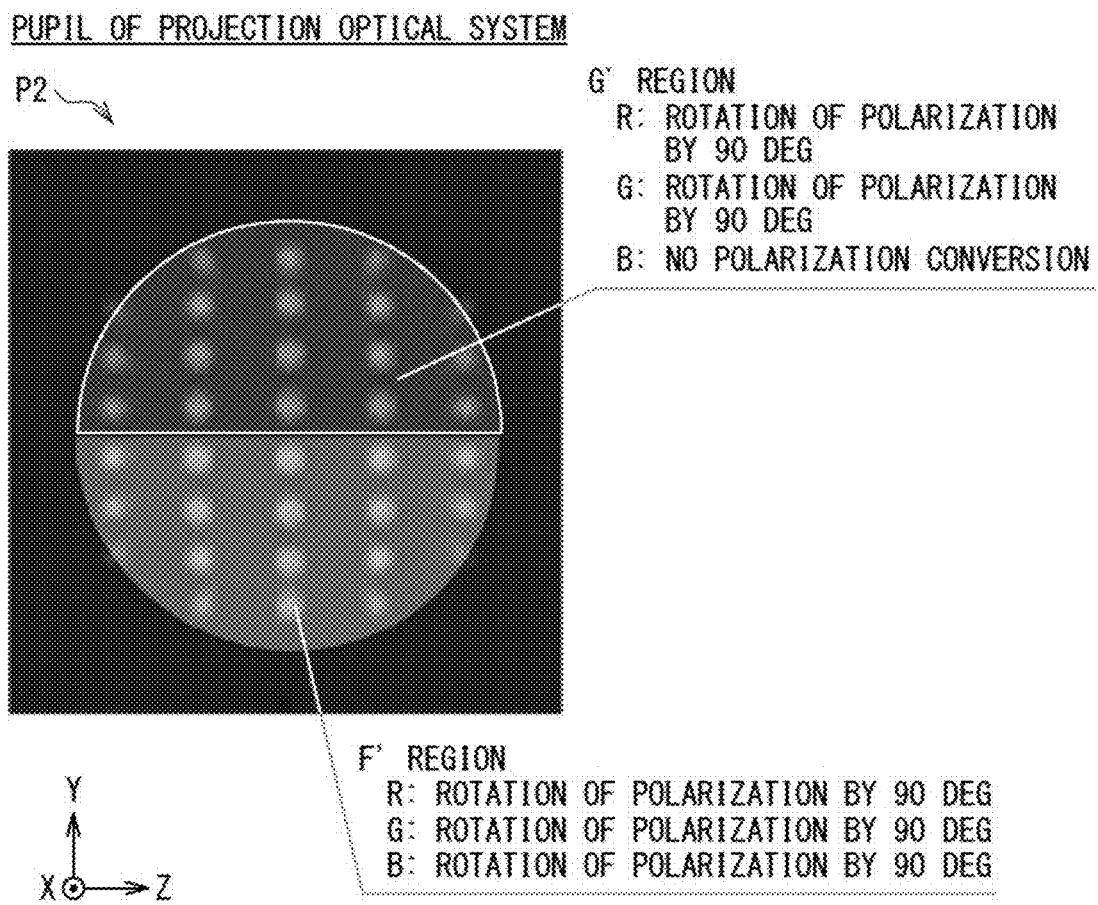
FIG. 25 is an explanatory diagram illustrating an example of a polarization state in a pupil of a projection optical system of the optical system according to the sixth embodiment.

FIG. 25 illustrates an example of a polarization state in a pupil of the projection optical system 2E of the optical system according to the sixth embodiment.

As illustrated in FIG. 25, the second region-division wavelength selective wave plate 52 is vertically divided into a G' region and an F' region at the pupil position P2 of the projection optical system 2E. A portion of the F' region at the pupil position P2 of the projection optical system 2E is conjugate to the F region at the pupil position P1 of the illumination optical system 1E, and a portion of the G' region at the pupil position P2 of the projection optical system 2E is conjugate to a portion of the G region at the pupil position P1 of the illumination optical system 1E. At the pupil position P2 of the projection optical system 2E, in the F' region conjugate to the F region, polarizations of all color light beams are rotated by 90 deg. to be converted into Z-direction polarization (S-polarization). In addition, in the G' region conjugate to the G region, polarizations of the red light beam and the green light beam are rotated by 90 deg., and polarization of the blue light beam is not converted. As a result, polarizations of all the color light beams are converted into Z-direction polarization (S-polarization), Lastly, this is rectified with use of the post polarizer 22 in the projection optical system 2E, which makes it possible to increase contrast. The optical system according to the sixth embodiment has a configuration in which a longer life is achieved while reducing the number of light valves, and has characteristics that a configuration is made at relatively low cost.

A point of the optical system according to the sixth embodiment is that contrast is increased by the post polarizer 22 while using two orthogonal polarizations with a specific wavelength, and is also applicable to a different configuration.

It is to be noted that in the optical system according to the sixth embodiment, in a red-green switching region, switching is not performed by the region-division wavelength selective wave plate; therefore, the notch filter 15 is not necessary.

Other configurations, actions, and effects may be substantially similar to those of the optical system according to the first embodiment described above.

7. Seventh Embodiment

Next, description is given of an optical system according to a seventh embodiment of the present disclosure. It is to be noted that in the following description, components that are substantially the same as those of the optical system according to any of the first to sixth embodiments described above are indicated by the same reference signs, and description thereof is omitted as appropriate.

Figure 26:
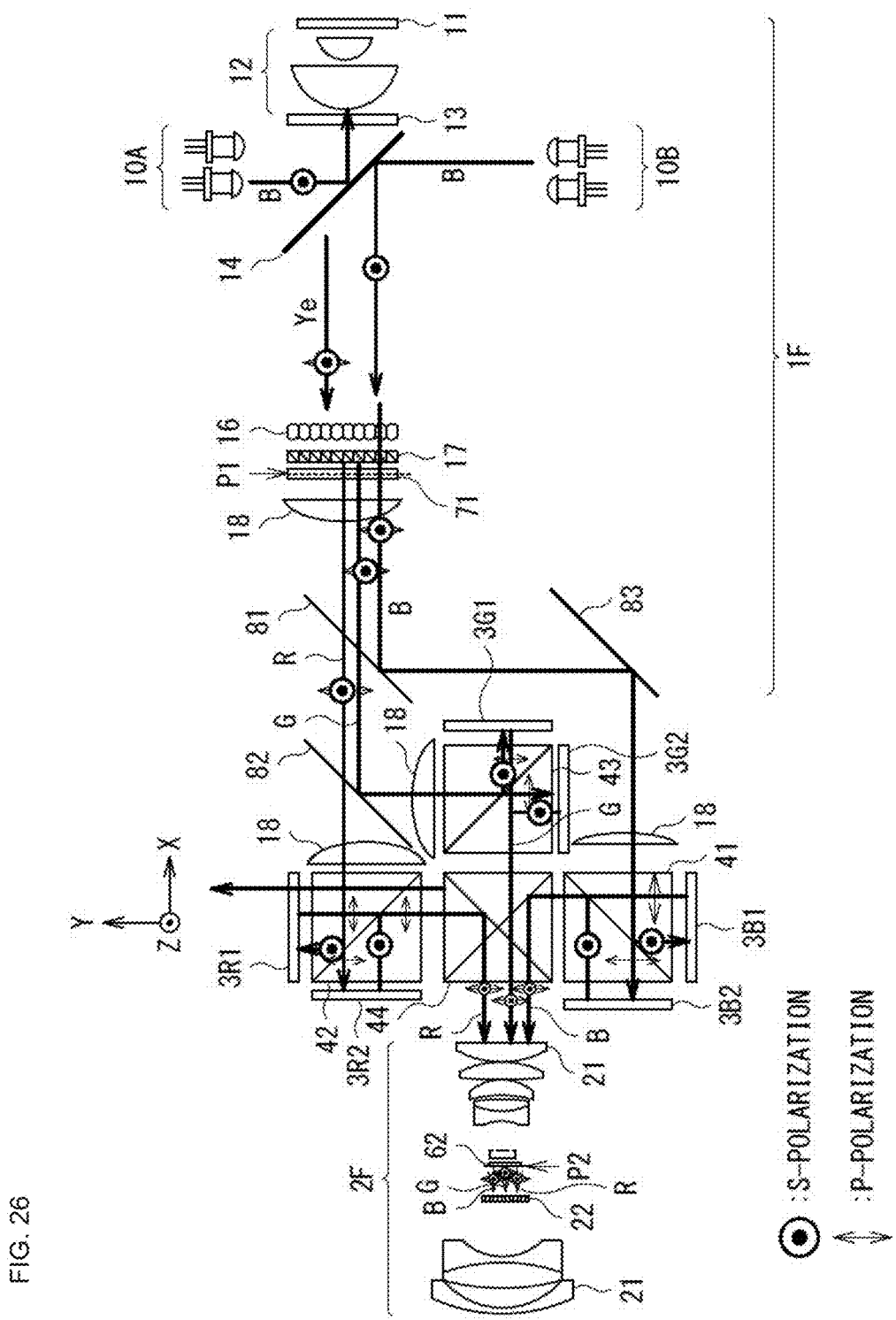
FIG. 26 is a configuration diagram schematically illustrating an entire configuration example of an optical system according to a seventh embodiment.

FIG. 26 schematically illustrates an entire configuration example of the optical system according to the seventh embodiment.

In the seventh embodiment, an example of a six-plate configuration is described as an example in which the number of light valves is increased more than that in the optical system according to the sixth embodiment. As illustrated in FIG. 26, the optical system according to the seventh embodiment includes an illumination optical system 1F and a projection optical system 2F. In addition, the optical system according to the seventh embodiment includes two blue light valves 3B1 and 3B2, two red light valves 3R1 and 3R2, two green light valves 3G1 and 3G2, the PBSs 41, 42, and 43, and the dichroic cube 44 in an optical path between the illumination optical system 1F and the projection optical system 2F.

The illumination optical system 1F includes the first blue light source 10A, the second blue light source 10B, the phosphor wheel 11, the light-condensing lens 12, the quarter-wave plate 13, the wavelength selective PBS 14, the lens array 16, the PS converter 17, the region-division wave plate 71, and the relay lens 18. In addition, the illumination optical system 1F includes the first color plate 81, the second color plate 82, and the total reflection mirror 83.

The projection optical system 2F has a configuration similar to that of the projection optical system 2D (FIG. 20) in the fifth embodiment, and the region-division polarizer 62 is disposed at the pupil position P2.

The illumination optical system 1F corresponds to a specific example of a "first optical system" in the technology of the present disclosure. The projection optical system 2F corresponds to a specific example of a "second optical system" in the technology of the present disclosure. The first region-division wavelength selective wave plate 51 corresponds to a specific example of a "first optical element" in the technology of the present disclosure. The region-division polarizer 62 corresponds to a specific example of a "second optical element" in the technology of the present disclosure. In addition, for example, the two blue light valves 3B1 and 3B2 correspond to a specific example of "first and second light valves" in the technology of the present disclosure. In addition, for example, the two red light valves 3R1 and 3R2 correspond to a specific example of "third and fourth light valves" in the technology of the present disclosure. In addition, for example, the two green light valves 3G1 and 3G2 correspond to a specific example of "fifth and sixth light valves" in the technology of the present disclosure.

The PBS 41 is provided in an optical path of a blue light beam outputted from the illumination optical system 1F, and causes the blue light beam to be incident on the blue light valve 3B1 and the blue light valve 3B2 by splitting the blue light beam by a difference in polarization. The PBS 42 is provided in an optical path of a red light beam outputted from the illumination optical system 1F, and causes the red light beam to be incident on the red light valve 3R1 and the red light valve 3R2 by splitting the red light beam by a difference in polarization. The PBS 43 is provided in an optical path of a green light beam outputted from the illumination optical system 1F, and causes the green light beam to be incident on the green light valve 3G1 and the green light valve 3G2 by splitting the green light beam by a difference in polarization. The dichroic cube 44 combines respective color light beams modulated by the respective light valves, and outputs the combined color light beams toward the projection optical system 2F.

In the optical system according to the seventh embodiment, two light valves are disposed for each of colors of R, G, and B. In addition, in the optical system according to the seventh embodiment, as with the optical system according to the sixth embodiment, the phosphor wheel 11 does not have the polarization maintaining diffuser region 112 (FIG. 2), and the phosphor region 111 is continuously irradiated with a blue light beam from the first blue light source 10A. This causes the phosphor wheel 11 to emit a yellow light beam in a time-divisional manner but continuously. A blue light beam is continuously outputted from the second blue light source 10B. The blue light beam from the second blue light source 10B is reflected by the wavelength selective PBS 14 to be combined with the yellow light beam from the phosphor wheel 11. In the optical system according to the seventh embodiment, as with the optical system according to the sixth embodiment, each light valve is dedicated to each color, and time division of colors is not performed.

The polarization state in the pupil of the illumination optical system 1F in the seventh embodiment is similar to that in the optical system according to the fifth embodiment, and the region-division wave plate 71 is vertically divided into a D region and an E region (FIG. 21) at the pupil position P1 of the illumination optical system 1F. This creates two polarization states of each color that are orthogonal at the position P1 of the illumination optical system 1F, and each color is caused to be incident on each color light valve in accordance with each polarization state.

The polarization state in the pupil of the projection optical system 2F in the seventh embodiment is also similar to that in the optical system according to the fifth embodiment, and the region-division polarizer 62 is vertically divided into an E' region and a D' region (FIG. 22) at the pupil position P2 of the projection optical system 1F. In the optical system according to the seventh embodiment, as with the optical system according to the fifth embodiment, the region-division polarizer 62 is provided at the pupil position P2 of the projection optical system 2F, and a conjugate action of the pupil is used to increase contrast by using the fact that only polarization in one direction of each color is incident on each region.

As with the optical system according to the fifth embodiment, the six-plate configuration described above is able to achieve three-dimensional display using polarization in addition to a simple increase in luminance.

It is to be noted that in the optical system according to the seventh embodiment, in a green-red switching region, switching is not performed by the region-division wavelength selective wave plate; therefore, the notch filter 15 is not necessary.

Other configurations, actions, and effects may be substantially similar to those of the optical system according to the fifth or sixth embodiment described above.

8. Eighth Embodiment

Next, description is given of an optical system according to an eighth embodiment of the present disclosure. It is to be noted that in the following description, components that are substantially the same as those of the optical system according to any of the first to seventh embodiments described above are indicated by the same reference signs, and description thereof is omitted as appropriate.

Figure 27:
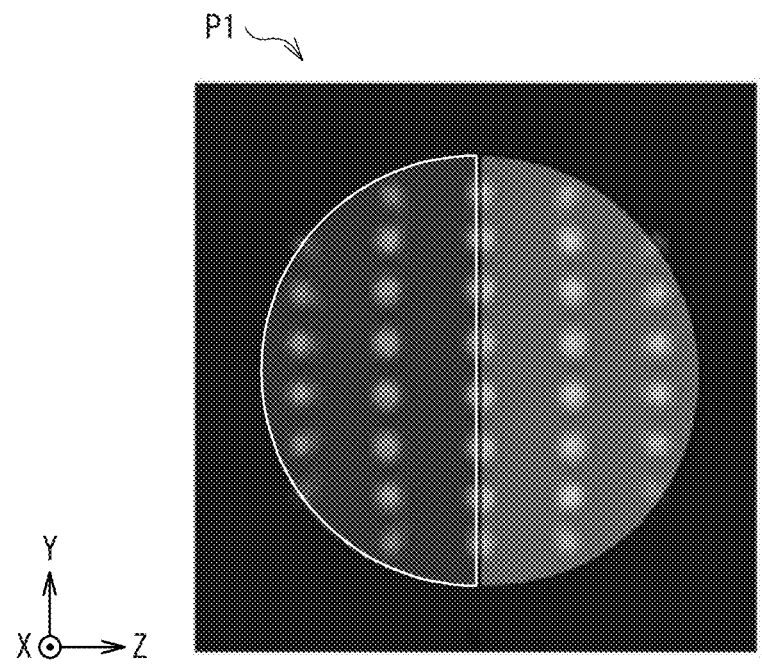
FIG. 27 is an explanatory diagram schematically illustrating a first division example of a region-division wave plate in an optical system according to an eighth embodiment.
Figure 28:
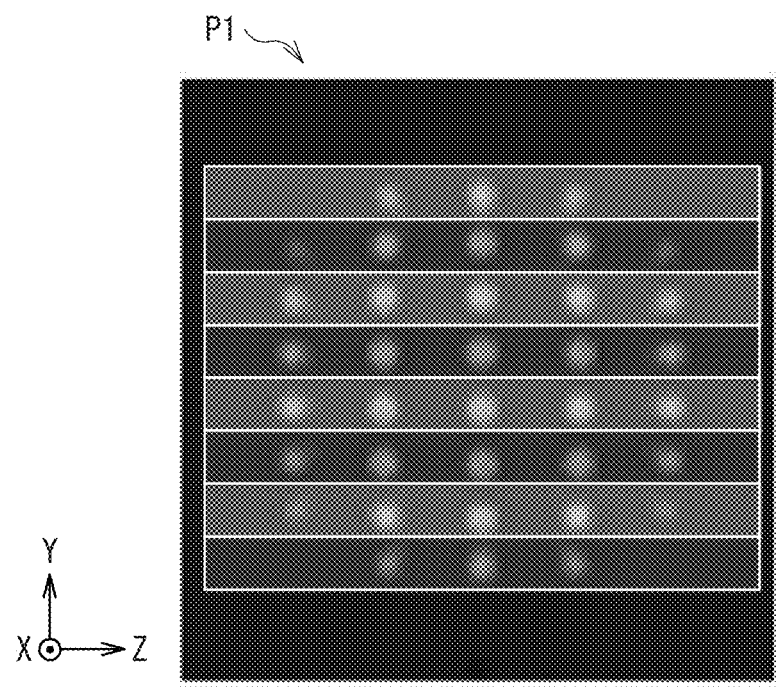
FIG. 28 is an explanatory diagram schematically illustrating a second division example of the region-division wave plate in the optical system according to the eighth embodiment.
Figure 29:
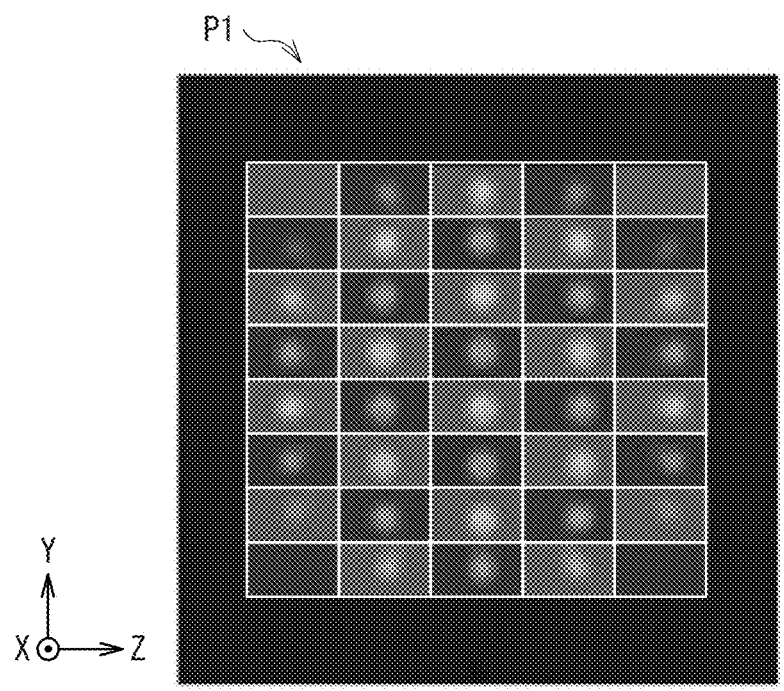
FIG. 29 is an explanatory diagram schematically illustrating a third division example of the region-division wave plate in the optical system according to the eighth embodiment.
Figure 30:
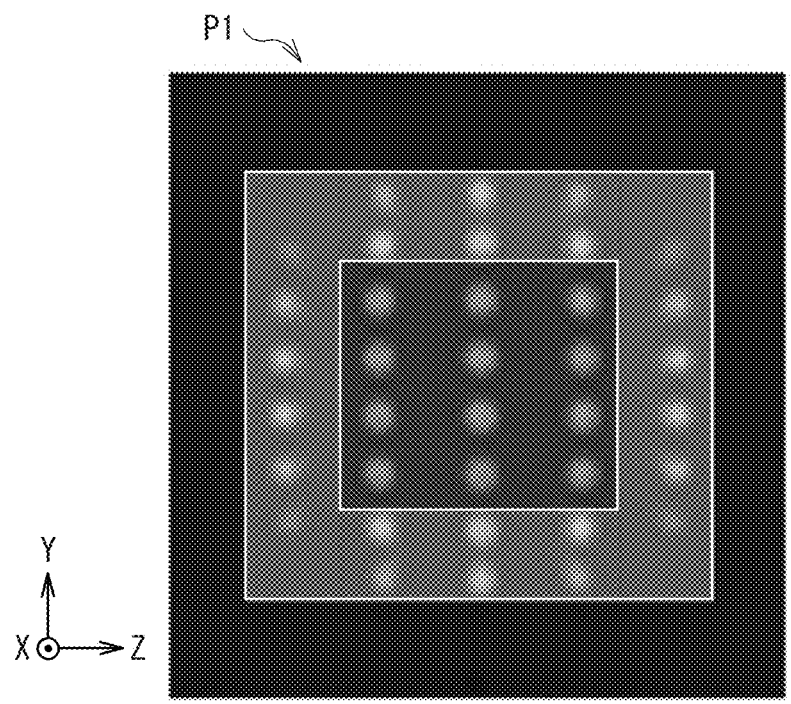
FIG. 30 is an explanatory diagram schematically illustrating a fourth division example of the region-division wave plate in the optical system according to the eighth embodiment.

FIG. 27 schematically illustrates a first division example of the region-division wave plate 71 in the optical system according to eighth embodiment. FIG. 28 schematically illustrates a second division example of the region-division wave plate 71 in the optical system according to eighth embodiment. FIG. 29 schematically illustrates a third division example of the region-division wave plate 71 in the optical system according to eighth embodiment. FIG. 30 schematically illustrates a fourth division example of the region-division wave plate 71 in the optical system according to eighth embodiment.

In the optical systems according to the fifth and seventh embodiments described above (FIGS. 20 and 26), the region-division wave plate 71 is disposed at the pupil position P1 of the illumination optical system 1D or 1F. In a configuration using such a region-division wave plate 71, a region-division method has a considerable degree of freedom. Some modification examples are illustrated in FIGS. 27 to 30, but the region-division method is not limited thereto.

For example, as illustrated in FIG. 27, a region may be configured by vertically dividing into two. Note that in this case, a central line divides a point image into two; therefore, it is assumed that manufacturing tolerance of a positional relationship between an element arrangement at the pupil position P1 of the illumination optical system 1D or 1F and an element arrangement at the pupil position P2 of the projection optical system 2D or 2F is severe. In addition, lateral division is performed with respect to the PBS 41 or the like, which may cause color shading. Accordingly, if anything, vertical division with no polarity with respect to the PBS 41 or the like is desirable.

In addition, it is possible to divide a region into strip-shaped regions as illustrated in FIG. 28, a grid-shaped regions as illustrated in FIG. 29, or a central region and an outer region as illustrated in FIG. 30. For example, in the division method in FIG. 30, a light flux of the central region of the pupil has a relatively small incident angle with respect to the light valve, which may be advantageous in design of the PBS 41 or the like. These division methods completely falls under the category of design, and are able to be freely designed from manufacturability and shading of the PBS 41 and the like, shading in the pupils of the projection optical systems 2D and 2F, a degree of color unevenness caused by projection polarization, or the like. Needless to say, even in this case, it is necessary for a conjugate pupil in the projection optical system 2D or 2F to have an operator corresponding to each part.

Other configurations, actions, and effects may be substantially similar to those in the optical system according to the fifth or seventh embodiment described above.

9. Ninth Embodiment

Next, description is given of an optical system according to a ninth embodiment of the present disclosure. It is to be noted that in the following description, components that are substantially the same as those of the optical system according to any of the first to eighth embodiments described above are indicated by the same reference signs, and description thereof is omitted as appropriate.

In the optical system according to the first embodiment described above and the like, the first region-division wavelength selective wave plate 51 and the PS converter 17 are disposed at and in proximity to the pupil position P1 of the illumination optical system 1; however, the PS converter 17 is compatible with a region-division wavelength selective wave plate, and is able to be integrated with the region-division wavelength selective wave plate.

Figure 31:
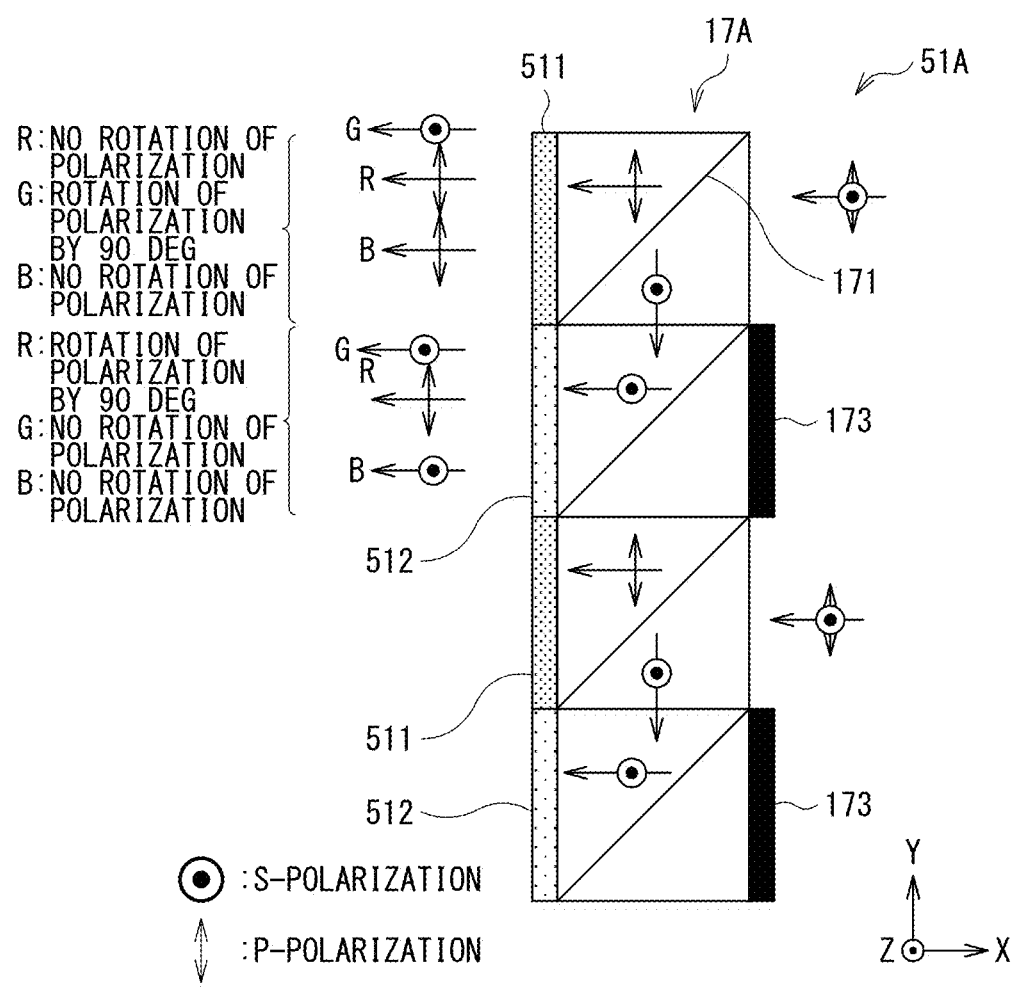
FIG. 31 is a schematic cross-sectional view of a configuration example of the first region-division wavelength selective wave plate integrated into a PS converter.

FIG. 31 schematically illustrates a configuration example of a first region-division wavelength selective wave plate 51A integrated into a PS converter 17A. In addition, FIG. 32 schematically illustrates an entire configuration example of the optical system according to the ninth embodiment that uses the first region-division wavelength selective wave plate 51A.

Figure 32:
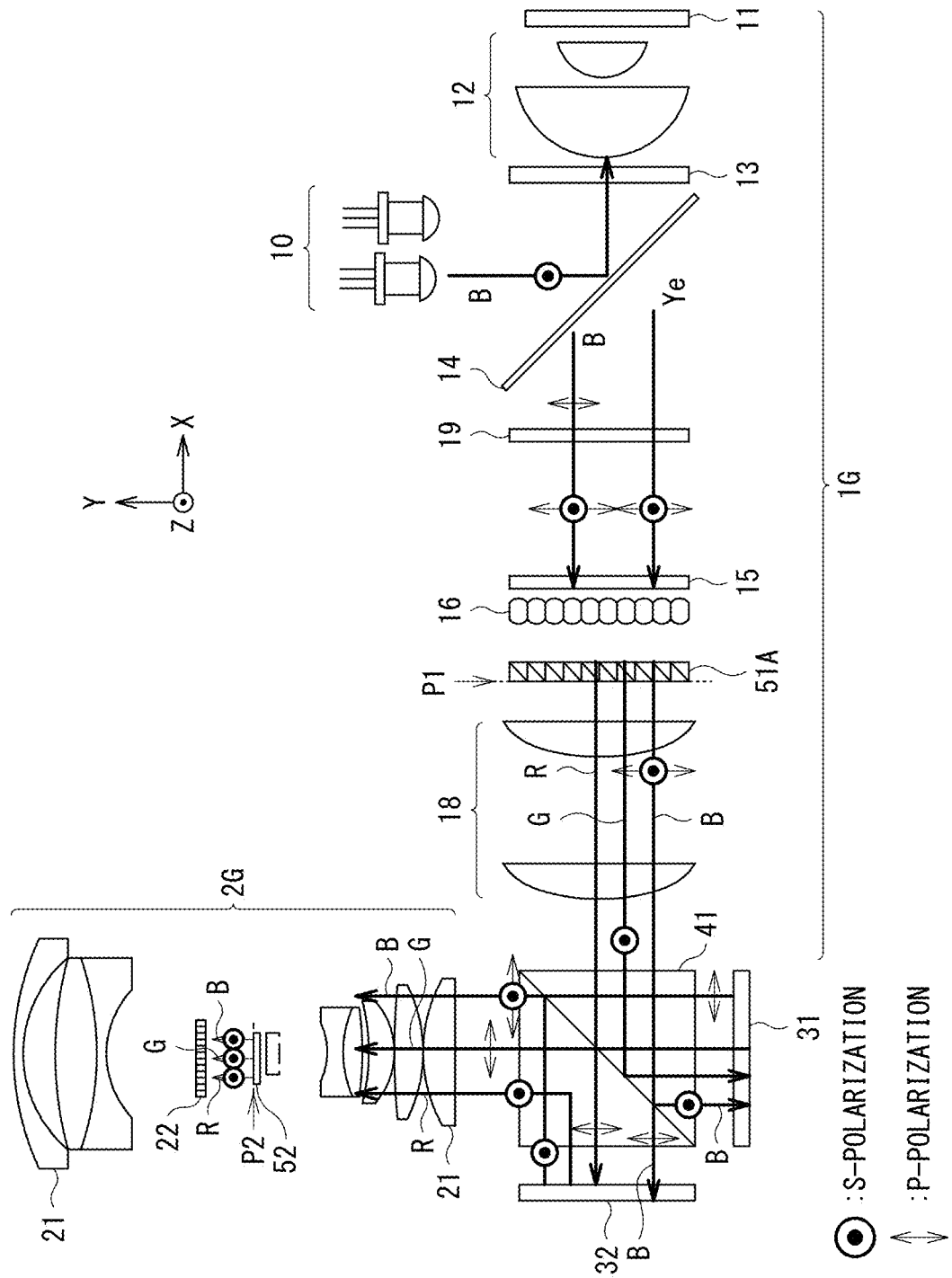
FIG. 32 is a configuration diagram schematically illustrating an entire configuration example of an optical system according to a ninth embodiment.

As illustrated in FIG. 32, the optical system according to the ninth embodiment includes an illumination optical system 1G and a projection optical system 2G.

The illumination optical system 1G has a configuration different from the configuration of the illumination optical system 1 (FIG. 1) in the first embodiment in that the first region-division wavelength selective wave plate 51A integrated into the PS converter 17A is disposed at the pupil position P1 of the illumination optical system 1G in place of the first region-division wavelength selective wave plate 51. In addition, the illumination optical system 1G has a configuration different from the configuration of the illumination optical system 1 in the first embodiment in that the half-wave plate 19 is disposed between the notch filter 15 and the wavelength selective PBS 14. The first region-division wavelength selective wave plate 51A has a plurality of divided regions having mutually different polarization actions.

The projection optical system 2G has a configuration similar to that of the projection optical system 2 (FIG. 1) in the first embodiment, and has a configuration in which the second region-division wavelength selective wave plate 52 is disposed at the pupil position P2 of the projection optical system 2G.

The illumination optical system 1G corresponds to a specific example of a "first optical system" in the technology of the present disclosure. The projection optical system 2G corresponds to a specific example of a "second optical system" in the technology of the present disclosure. The first region-division wavelength selective wave plate 51A corresponds to a specific example of a "first optical element" in the technology of the present disclosure. The second region-division wavelength selective wave plate 52 corresponds to a specific example of a "second optical element" in the technology of the present disclosure.

The PS converter 17A has a plurality of prism blocks in which the polarization film 171 is formed. On a light incident surface along the X direction of the PS converter 17A, the shielding region 173 is formed in the Y direction in every other prism block of the plurality of prism blocks.

In addition, on light output surfaces along the X direction of the plurality of prism blocks, first wavelength selective wave plates 511 and second wavelength selective wave plates 512 are alternately formed in the Y direction. The shielding region 173 and the second wavelength selective wave plate 512 are formed in the same prism blocks of the plurality of prism blocks.

In the ordinary PS converter 17, as with the configuration example in FIG. 11, the wide-band half-wave plate 172 is disposed in the Y direction on the light output side in every other prism block of the plurality of prism blocks to provide an action of aligning polarization. In contrast, in the configuration example in FIG. 31, the first wavelength selective wave plates 511 and the second wavelength selective wave plates 512 having different actions are alternately disposed on the light output side of the plurality of prism blocks. This makes it possible to omit the half-wave plate 172 and achieve region division as illustrated in FIG. 28. This technique has an advantage that the first wavelength selective wave plate 511 and the second wavelength selective wave plate 512 are able to act before increasing the size of an image forming point of the pupil, and it is therefore possible to relax manufacturing tolerance and improve manufacturability. In addition, it is possible to achieve region division similar to that in the first region-division wavelength selective wave plate 51 in the optical system according to the first embodiment or the like. In this case, it is sufficient if a configuration may be made in which a wide-band half-wave plate is disposed in one region of two divided regions without alternately arranging the first wavelength selective wave plates 511 and the second wavelength selective wave plates 512.

In a case where the PS converter 17A and the region-division wavelength selective wave plate are integrated, in incident polarization of any color, Y-direction polarization (P-polarization) and Z-direction polarization (S-polarization) have to be equal to each other; therefore, some contrivance is necessary, such as creating polarization in a 45-deg. inclined direction of a blue light beam by disposing the half-wave plate 19 in front of incidence of the PS converter 17A as illustrated in FIG. 32. Alternatively, circular polarization of a blue light beam may be created by disposing a quarter-wave plate in front of incidence of the PS converter 17A.

In addition, for example, it is conceivable that color separation is performed by using a Kester type dichroic prism, a triangular prism array, a diffraction element, a diffraction lens, a polarization-dependent lens (Pancharatnam phase lens, color separation corresponding to polarization after polarization separation), or the like in place of the dichroic converter 61 in the illumination optical system 1A in the optical system according to the second embodiment described above.

Other configurations, actions, and effects may be substantially similar to those in the optical system according to the first embodiment described above.

10. Tenth Embodiment

Next, description is given of an optical system according to a tenth embodiment of the present disclosure. It is to be noted that in the following description, components that are substantially the same as those of the optical system according to any of the first to ninth embodiments described above are indicated by the same reference signs, and description thereof is omitted as appropriate.

A most important point of the technology of the present disclosure is that a light beam in a certain wavelength band is split into two orthogonal polarized component, and a polarization action is selectively provided in the projection optical system. Application of this point makes it possible to increase contrast while expanding a color gamut with brightness kept to a certain level.

Figure 33:
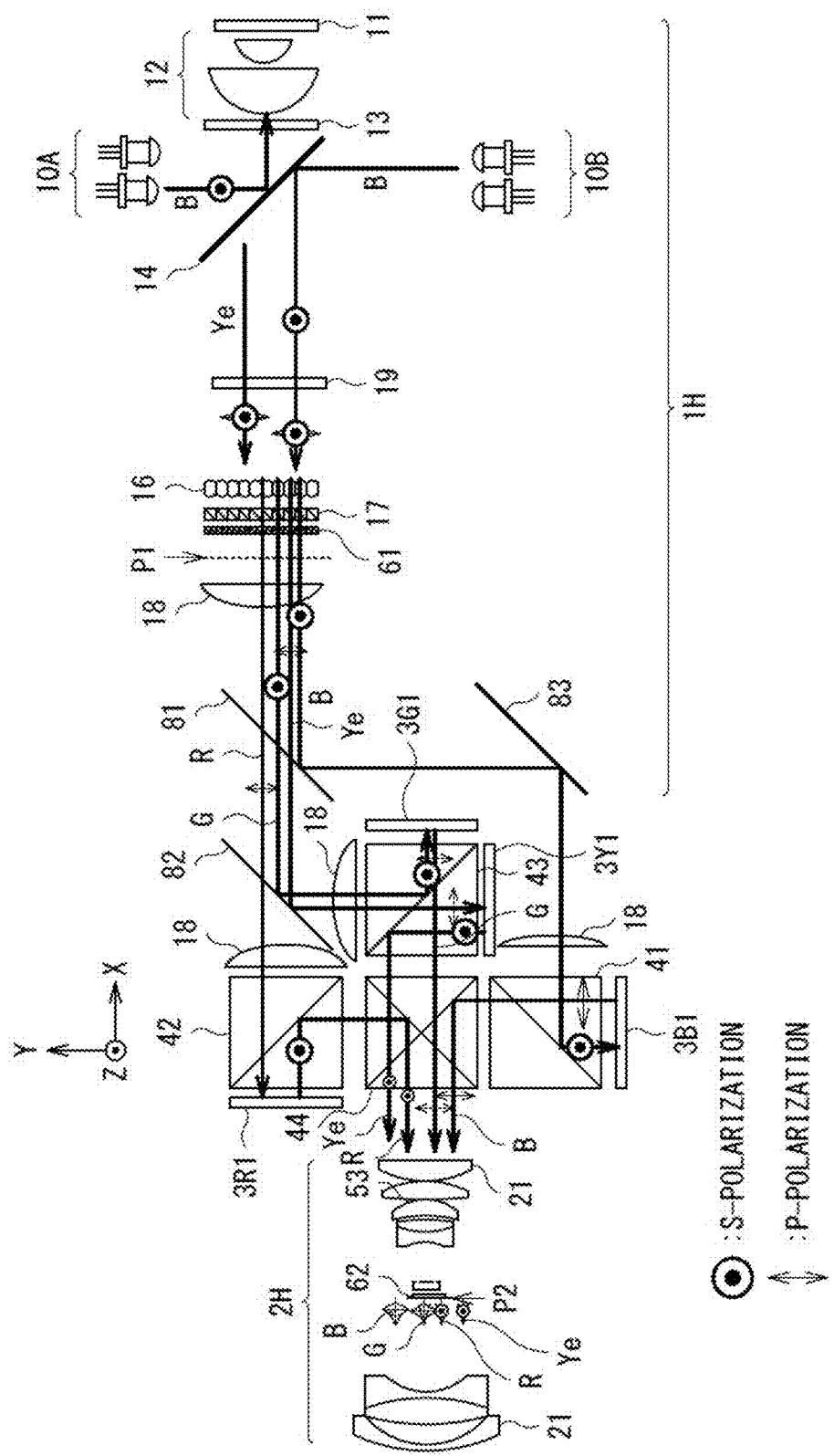
FIG. 33 is a configuration diagram schematically illustrating an entire configuration example of an optical system according to a tenth embodiment.

FIG. 33 schematically illustrates an entire configuration example of the optical system according to the tenth embodiment.

In the tenth embodiment, a configuration example in which a color gamut is expanded by adding another color to R, G, and B is described. FIG. 33 illustrates an example in which a yellow light beam is added as another color. As illustrated in FIG. 33, the optical system according to the tenth embodiment includes an illumination optical system 1H and a projection optical system 2H. In addition, the optical system according to the tenth embodiment includes the blue light valve 3B1, the red light valve 3R1, the green light valve 3G1, a yellow light valve 3Y1, the PBSs 41, 42, and 43, and the dichroic cube 44 in an optical path between the illumination optical system 1H and the projection optical system 2H.

The illumination optical system 1H includes the first blue light source 10A, the second blue light source 10B, the phosphor wheel 11, the light-condensing lens 12, the quarter-wave plate 13, the wavelength selective PBS 14, the half-wave plate 19, the lens array 16, the PS converter 17, the dichroic converter 61, and the relay lens 18. In addition, the illumination optical system 1H includes the first color plate 81, the second color plate 82, and the total reflection mirror 83.

The projection optical system 2H has a configuration similar to that of the projection optical system 2D (FIG. 20) in the fifth embodiment, and the region-division polarizer 62 is disposed at the pupil position P2 of the projection optical system 2H.

The illumination optical system 1H corresponds to a specific example of a "first optical system" in the technology of the present disclosure. The projection optical system 2H corresponds to a specific example of a "second optical system" in the technology of the present disclosure. The dichroic converter 61 corresponds to a specific example of a "first optical element" in the technology of the present disclosure. The region-division polarizer 62 corresponds to a specific example of a "second optical element" in the technology of the present disclosure.

The PBS 41 is provided in an optical path of a blue light beam outputted from the illumination optical system 1H, and causes the blue light beam to be incident on the blue light valve 3B1. The PBS 42 is provided in an optical path of a red light beam outputted from the illumination optical system 1H, and causes the red light beam to be incident on the red light valve 3R1. The PBS 43 is provided in an optical path of a green light beam and a yellow light beam outputted from the illumination optical system 1F, and causes the green light beam and the yellow light beam to be respectively incident on the green light valve 3G1 and the yellow light valve 3Y1 by splitting the green light beam and the yellow light beam by a difference in polarization. The dichroic cube 44 combines respective color light beams modulated by the respective light valves, and outputs the combined color light beams toward the projection optical system 2H.

Figure 34:
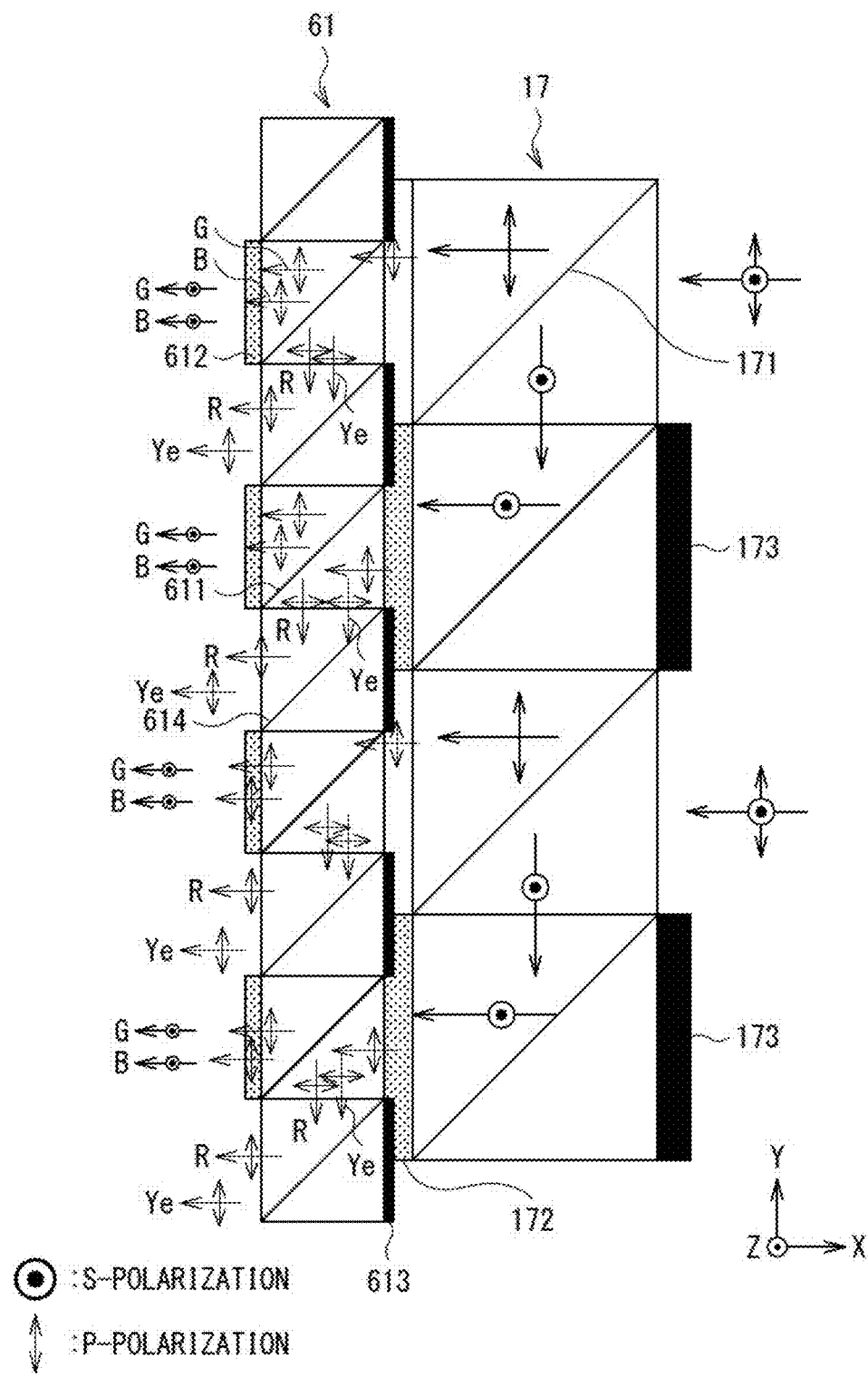
FIG. 34 is a schematic cross-sectional view of configuration examples of a PS converter and a dichroic converter in the optical system according to the tenth embodiment.

FIG. 34 schematically illustrates a configuration example of the PS converter 17 and the dichroic converter 61 in the optical system according to the tenth embodiment.

The configuration of the PS converter 17 illustrated in FIG. 34 is similar to the configuration of the PS converter 17 illustrated in FIG. 11. In addition, the configuration of the dichroic converter 61 illustrated in FIG. 34 is similar to the configuration of the dichroic converter 61 illustrated in FIG. 11, except that the characteristics of the dichroic film 611 are different.

Figure 35:
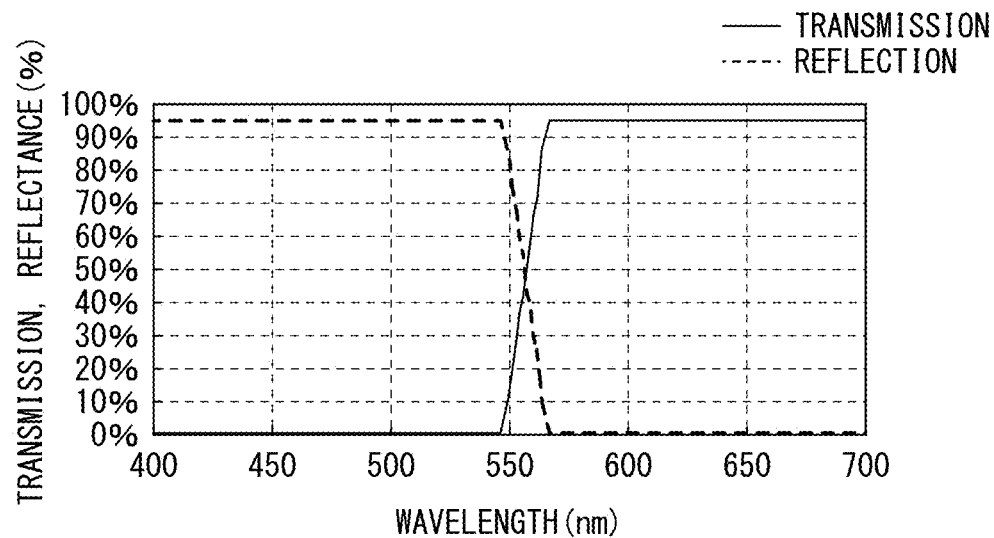
FIG. 35 is an explanatory diagram illustrating an example of film characteristics of the dichroic converter in the optical system according to the tenth embodiment.
Figure 36:
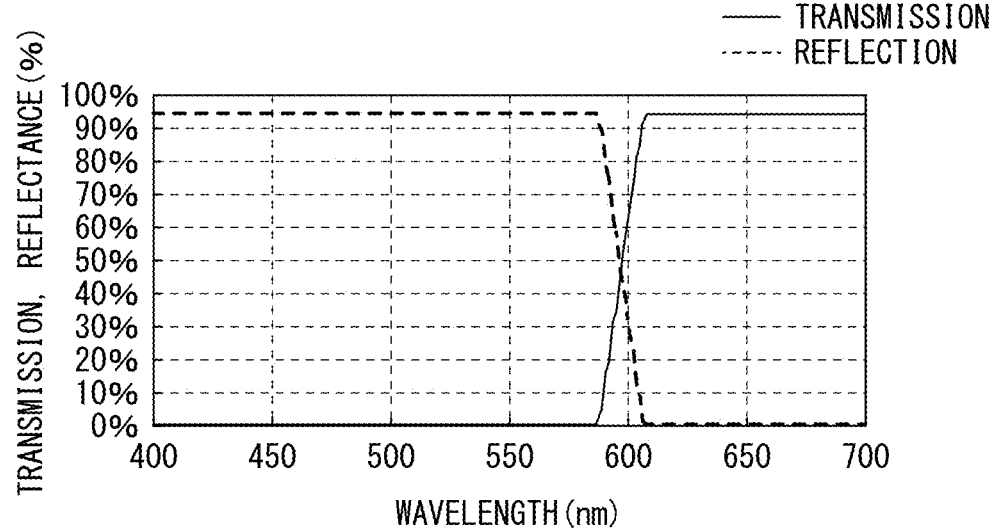
FIG. 36 is an explanatory diagram illustrating an example of film characteristics of a second color plate in the optical system according to the tenth embodiment.
Figure 37:
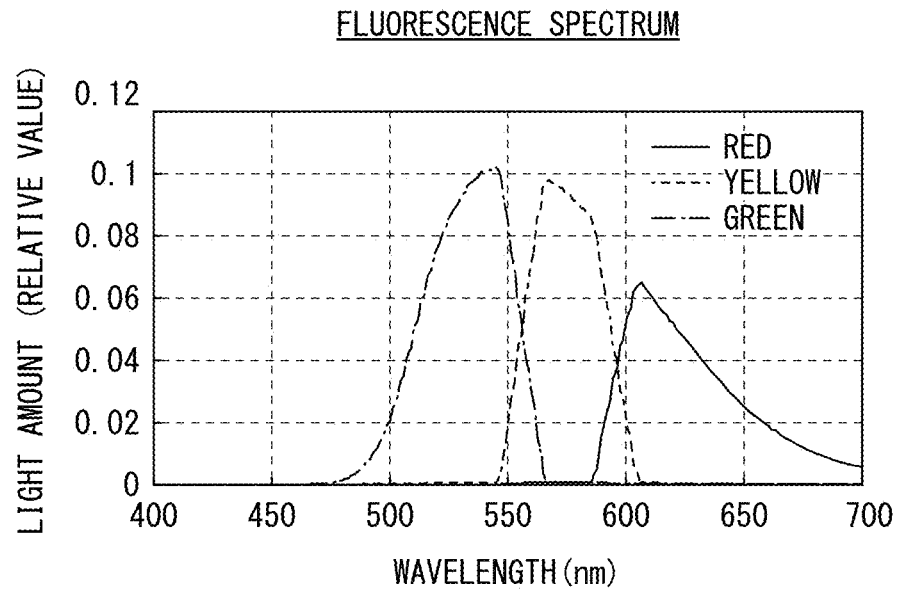
FIG. 37 is an explanatory diagram illustrating an example of a final fluorescence spectrum in an illumination optical system of the optical system according to the tenth embodiment.
Figure 38:
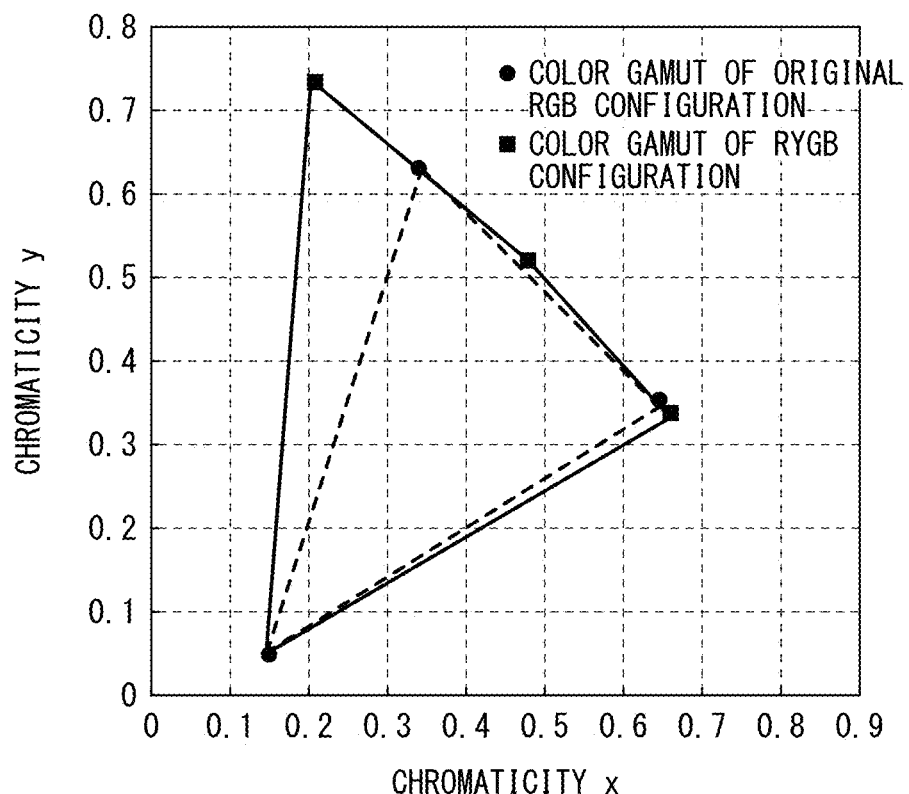
FIG. 38 is an explanatory diagram illustrating an example of a color gamut of the optical system according to the tenth embodiment.

FIG. 35 illustrates an example of film characteristics of the dichroic converter 61 in the optical system according to the tenth embodiment. FIG. 36 illustrates an example of film characteristics of the second color plate 82 in the optical system according to the tenth embodiment. FIG. 37 illustrates an example of a final fluorescence spectrum in the illumination optical system 1H of the optical system according to the tenth embodiment. FIG. 38 illustrates an example of a color gamut of the optical system according to the tenth embodiment.

In the optical system according to the tenth embodiment, the dichroic converter 61 is used to separate the yellow light beam as polarization different from the green light beam, and guides the yellow light beam to the yellow light valve 3Y1. The dichroic converter 61 has a configuration illustrated in FIG. 34, and the dichroic film 611 has separation characteristics as illustrated in FIG. 35. In addition, the second color plate 82 has separation characteristics as illustrated in FIG. 36. Consequently, the final fluorescence spectrum in the illumination optical system 1H is as illustrated in FIG. 37. The color gamut in this case is illustrated in FIG. 38. It can be seen that the color gamut is significantly expanded as compared with an original RGB configuration. In addition, as with the second embodiment (FIG. 13), the region-division polarizer 62 in which divided regions are vertically alternately arranged is disposed at the pupil position P2 of the projection optical system 2H to provide alternate post polarizer actions conjugate to alternate polarizations generated by the dichroic converter 61. This makes it possible to significantly improve contrast.

It is to be noted that in the optical system according to the tenth embodiment, a blue light beam incident on the lens array 16 needs both polarization directions of Y-direction polarization (P-polarization) and Z-direction polarization (S-polarization), which is achieved by causing the blue light beam to pass through the half-wave plate 19.

The configuration of the optical system according to the tenth embodiment is advantageous specifically in that an increase in contrast is possible while both the green light valve green 3G1 and the yellow light valve 3Y1 are used in one PBS 43. Generally, contrast is significantly decreased by providing two light valves for one PBS. For example, a configuration described in PTL 4 (Japanese Unexamined Patent Application Publication No. 2006-343721), a decrease in contrast is not avoidable. In contrast, the configuration of the optical system according to the tenth embodiment is able to recover contrast, and has a room for 1000:1 or more. Use of both light valves for one PBS is possible, which contributes to downsizing of the entire system. In particular, in a case where the light valve is a reflective liquid crystal (LCOS; Liquid Crystal On Silicon), it is necessary to dispose a PBS in front of the light valve. Accordingly, in a case where four colors are combined, at least five prisms are necessary. In addition, in a method of sequentially combine a plurality of colors, more prisms are necessary, which makes the entire system extremely large.

It is to be noted that in the optical system according to the tenth embodiment, the dichroic converter 61 and a color plate are able to be configured to expand not only yellow but also a cyan range. In this case, it is conceivable that it is sufficient if cyan is mixed in an optical path of the blue light beam in FIG. 33 and the fifth light valve is disposed. In addition, it is possible to support a projector with more colors.

According to the optical system according to the tenth embodiment, it is possible to significantly expand a color gamut while mixing yellow or any other color with contrast kept high.

Other configurations, actions, and effects may be substantially similar to those in the optical system according to the second or fifth embodiment described above and the like.

11. Eleventh Embodiment

Next, description is given of an optical system according to an eleventh embodiment of the present disclosure. It is to be noted that in the following description, components that are substantially the same as those of the optical system according to any of the first to tenth embodiments described above are indicated by the same reference signs, and description thereof is omitted as appropriate.

Figure 39:
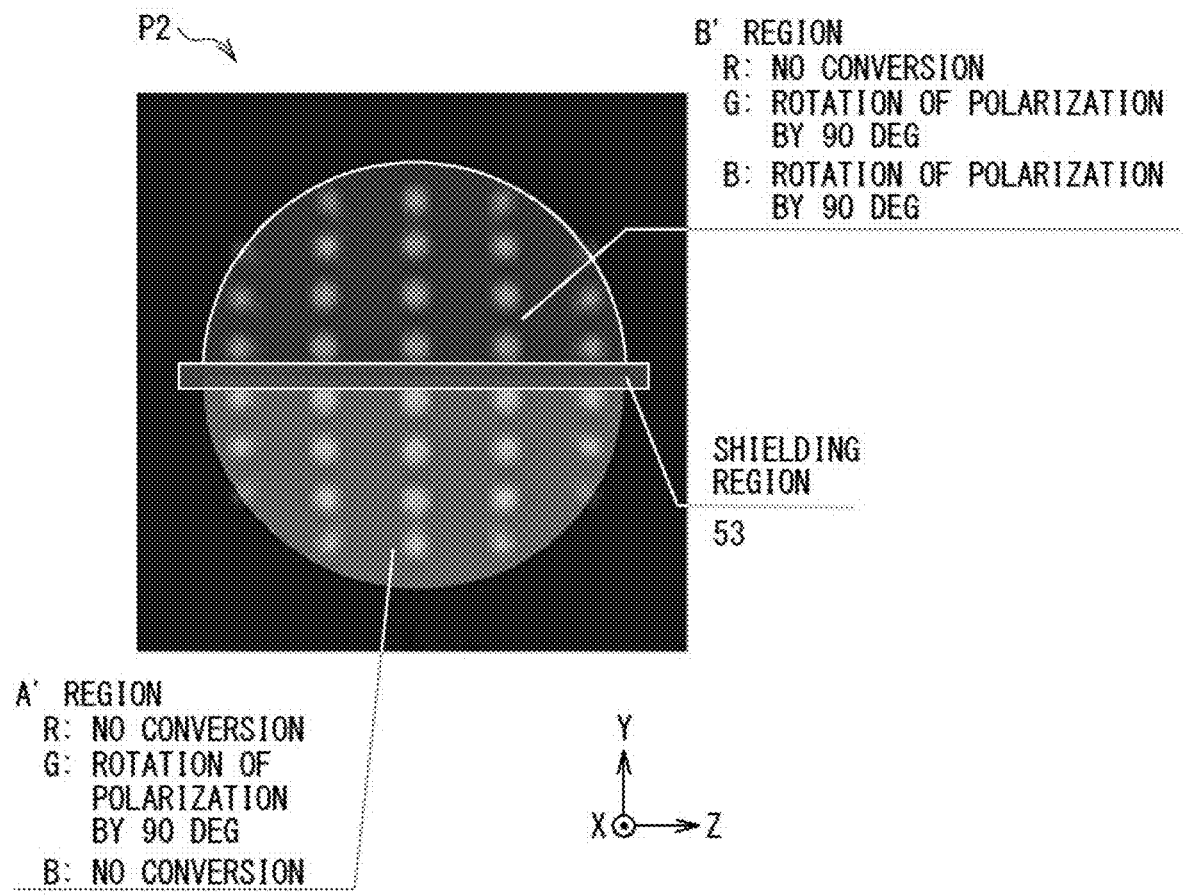
FIG. 39 is a configuration diagram schematically illustrating a configuration example of a region-division wavelength selective wave plate in an optical system according to an eleventh embodiment.

FIG. 39 schematically illustrates a configuration example of the second region-division wavelength selective wave plate 52 in the optical system according to the eleventh embodiment.

In the configuration of the optical system according to the first embodiment or the like, for example, a shielding region 53 may be provided in the second region-division wavelength selective wave plate 52 as illustrated in FIG. 39. Setting of the shielding region 53 is specifically effective in a case where a bonding section between two divided regions is restricted by a burr and an effective range. That is, in a case where the action of a wave plate in proximity to the bonding section is different from the original action, an unnecessary light beam passing through this region may decrease contrast. The unnecessary light beam does not pass through the proximity of a bonding range in any case by providing the shielding region 53, which makes it possible to prevent a decrease in contrast. As illustrated in FIG. 39, the shielding region 53 hardly shields a necessary light beam, and only shields an unnecessary portion, which causes only a slight decrease in a light amount.

The shielding region 53 may be provided also in the first region-division wavelength selective wave plate 51 on the illumination optical system 1 side in some cases. In addition, the shielding region 53 may be provided also in a boundary section of each of divided regions in various region-division wave plates 71 (FIGS. 27 to 30) described in the eighth embodiment.

Other configurations, actions, and effects may be substantially similar to those in the optical system according to any of the first to tenth embodiments described above.

12. Twelfth Embodiment

Next, description is given of an optical system according to a twelfth embodiment of the present disclosure. It is to be noted that in the following description, components that are substantially the same as those of the optical system according to any of the first to eleventh embodiments described above are indicated by the same reference signs, and description thereof is omitted as appropriate.

Figure 40:
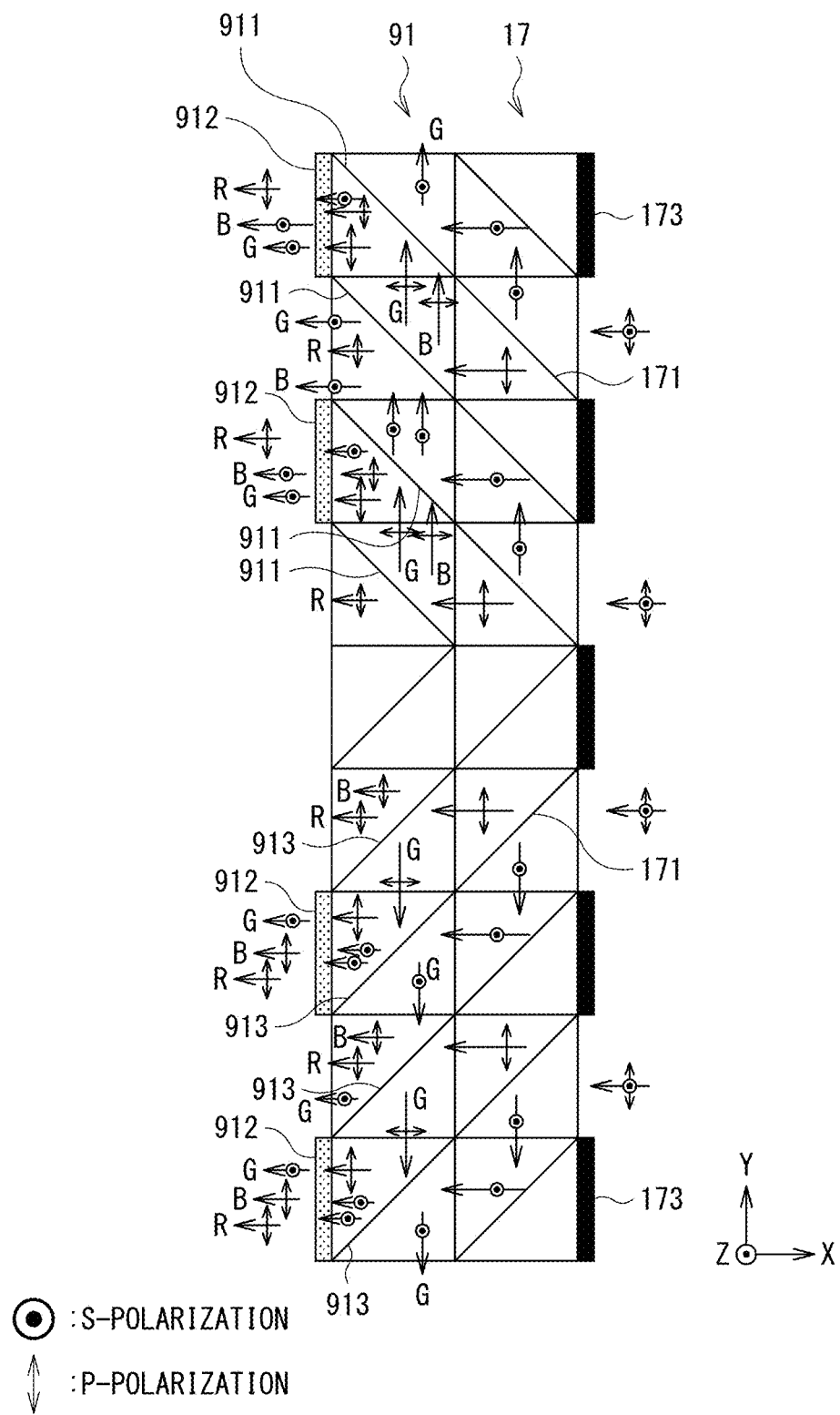
FIG. 40 is a schematic cross-sectional view of configuration examples of a PS converter and a dichroic prism array in an optical system according to a twelfth embodiment.

FIG. 40 schematically illustrates configuration examples of the PS converter 17 and a dichroic prism array 91 in the optical system according to the twelfth embodiment.

In the configuration of the optical system according to the first embodiment described above or the like, the dichroic prism array 91 as illustrated in FIG. 40 may be disposed in place of the first region-division wavelength selective wave plate 51.

Figure 41:
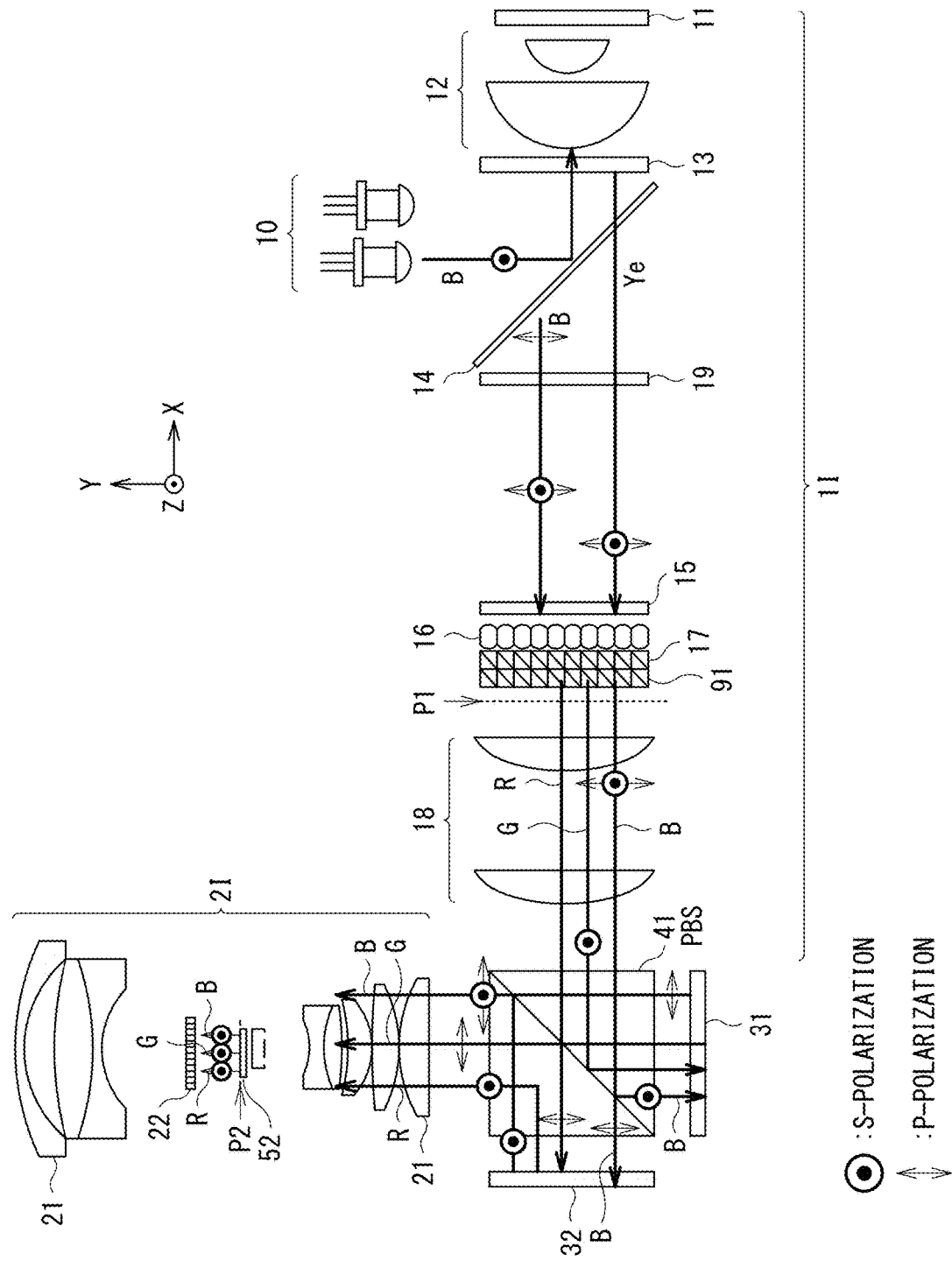
FIG. 41 is a configuration diagram schematically illustrating a first entire configuration example of an optical system according to a twelfth embodiment.

FIG. 41 schematically illustrates a first entire configuration example of the optical system according to the twelfth embodiment using the dichroic prism array 91.

The optical system illustrated in FIG. 41 includes an illumination optical system 1I and a projection optical system 2I.

The illumination optical system 1I has a configuration different from the configuration of the illumination optical system 1 (FIG. 1) in the first embodiment in that the dichroic prism array 91 disposed adjacent to the PS converter 17 is disposed at the pupil position P1 of the illumination optical system 1I in place of the first region-division wavelength selective wave plate 51. In addition, the illumination optical system 1I has a configuration different from the configuration of the illumination optical system 1 in the first embodiment in that the half-wave plate 19 is disposed between the notch filter 15 and the wavelength selective PBS 14. The dichroic prism array 91 has a plurality of divided regions having mutually different polarization actions.

The projection optical system 2I has a configuration similar to the projection optical system 2 (FIG. 1) in the first embodiment, and has a configuration in which the second region-division wavelength selective wave plate 52 is disposed at the pupil position P2 of the projection optical system 2I.

In the optical system illustrated in FIG. 41, the illumination optical system 1I corresponds to a specific example of a "first optical system" in the technology of the present disclosure. The projection optical system 2I corresponds to a specific example of a "second optical system" in the technology of the present disclosure. The dichroic prism array 91 corresponds to a specific example of a "first optical element" in the technology of the present disclosure. The second region-division wavelength selective wave plate 52 corresponds to a specific example of a "second optical element" in the technology of the present disclosure.

The PS converter 17 illustrated in FIG. 40 includes a plurality of prism blocks in which the polarization film 171 is formed. On a light incident surface along the X direction of the PS converter 17, the shielding region 173 is formed in the Y direction in every other prism block of the plurality of prism blocks.

The dichroic prism array 91 includes a plurality of dichroic prisms. The plurality of dichroic prisms includes a first dichroic prism in which a first dichroic prism 911 is formed and a second dichroic prism in which a second dichroic film 913 is formed. The first dichroic film 911 is a film that reflects light in green and blue regions. The second dichroic film 913 is a film that reflects light in the green region.

A plurality of first dichroic prisms in which the first dichroic film 911 is formed is disposed in, for example, a substantially upper half region of the dichroic prism array 91. On a light output surface along the X direction of the dichroic prism array 91, a wide-band half-wave plate 912 is formed in the Y direction in every other first dichroic prism of the plurality of first dichroic prisms. The wide-band half-wave plate 912 is formed at a position corresponding to the shielding region 173 of the PS converter 17.

A plurality of second dichroic prisms in which the second dichroic film 913 is formed is disposed in, for example, a substantially lower half region of the dichroic prism array 91. On the light output surface along the X direction of the dichroic prism array 91, the wide-band half-wave plate 912 is formed in the Y direction in every other second dichroic prism of the plurality of second dichroic prisms. The wide-band half-wave plate 912 is formed at a position corresponding to the shielding region 173 of the PS converter 17.

A middle portion (a boundary portion between the first dichroic prism and the second dichroic prism) in the Y direction in the dichroic prism array 91 may be the shielding region.

As illustrated in FIG. 40, polarization of a green light beam becomes Z-direction polarization (S-polarization) in, for example, the substantially lower half region by combining the PS converter 17 and the dichroic prism array 91. In addition, polarizations of a green light beam and a blue light beam become Z-direction polarization (S-polarization) in, for example, the substantially upper half region. This is substantially the same as a polarization division action by the first region-division wavelength selective wave plate 51 illustrated in FIG. 3. This makes it possible to provide an action equivalent to the optical system according to the first embodiment without using the wavelength selective wave plate. An advantage of use of the wide-band half-wave plate 912 is polarization conversion efficiency. Typically, the wavelength selective wave plate includes a large number of stacked layers, and accumulation of angle shifts in a paper surface causes a deterioration in conversion efficiency, and unnecessary polarization is generated at about 0.5% to about 1%. This unnecessary polarization deteriorates black contrast; therefore, it is desirable to reduce the unnecessary polarization as much as possible. If the number of stacked layers in the wide-band wave plate is reduced more than that in the wavelength selective wave plate, it is possible increase conversion efficiency and improve contrast accordingly.

In a configuration using the dichroic prism array 91, it is desirable to separate the polarization direction of a blue light beam equally into the Z direction and the Y direction by providing the half-wave plate 19 in front of the PS converter 17 as illustrated in FIG. 41, or the like.

Figure 42:
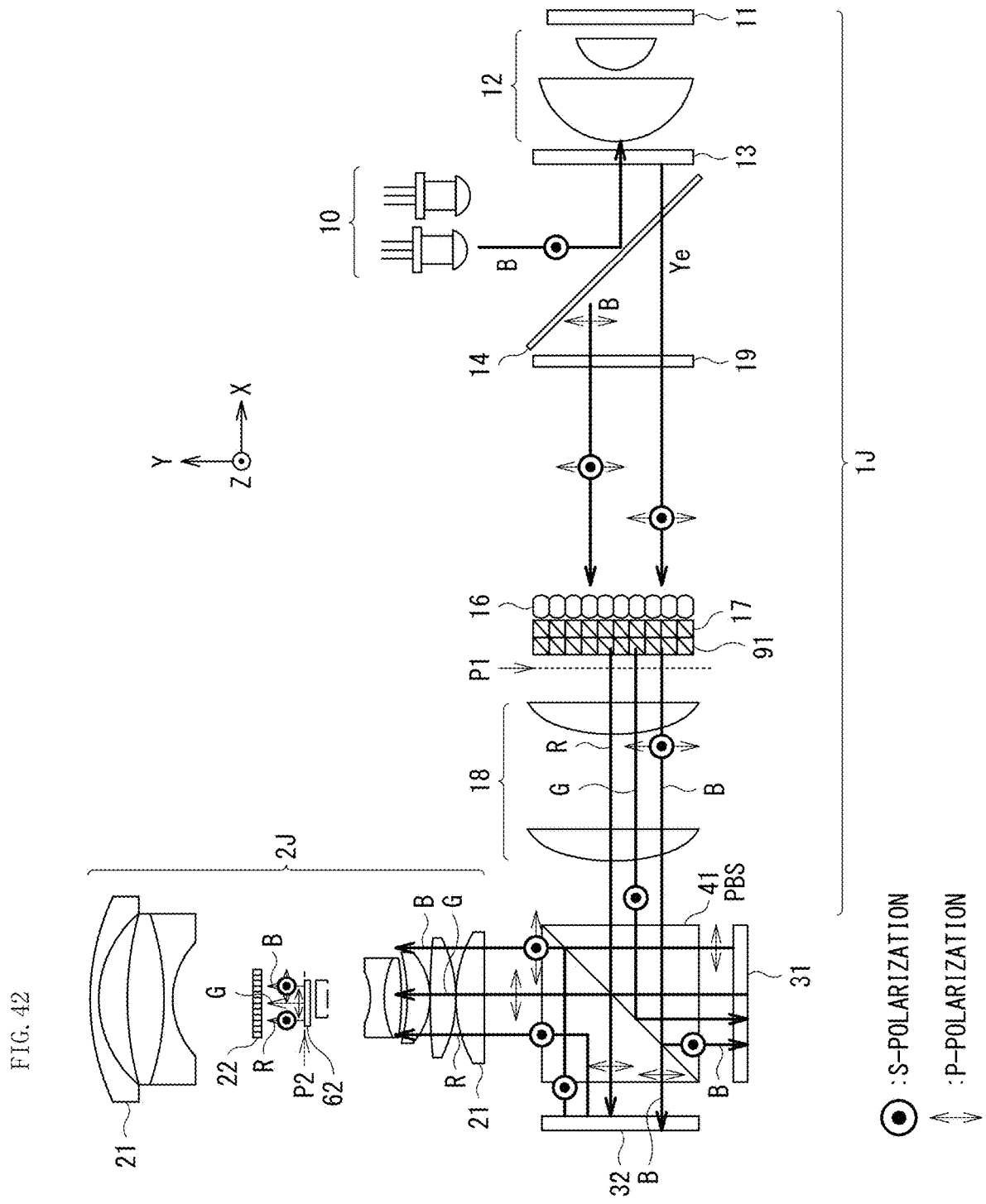
FIG. 42 is a configuration diagram schematically illustrating a second entire configuration example of the optical system according to the twelfth embodiment.

FIG. 42 schematically illustrates a second entire configuration example of the optical system according to the twelfth embodiment using the dichroic prism array 91.

The optical system illustrated in FIG. 42 includes an illumination optical system 1J and a projection optical system 2J.

The illumination optical system 1J has a configuration different from the configuration of the illumination optical system 1I (FIG. 1) illustrated in FIG. 41 in that the notch filter 15 is omitted.

The projection optical system 2J has a configuration similar to that of the projection optical system 2A (FIG. 10) in the second embodiment, and has a configuration different from the configuration of the projection optical system 2I illustrated in FIG. 41 in that the post polarizer 22 is omitted and the region-division polarizer 62 is disposed at the pupil position P2 of the projection optical system 2J in place of the second region-division wavelength selective wave plate 52.

In the optical system illustrated in FIG. 42, the illumination optical system 1J corresponds to a specific example of a "first optical system" in the technology of the present disclosure. The projection optical system 2J corresponds to a specific example of a "second optical system" in the technology of the present disclosure. The dichroic prism array 91 corresponds to a specific example of a "first optical element" in the technology of the present disclosure. The region-division polarizer 62 corresponds to a specific example of a "second optical element" in the technology of the present disclosure.

As illustrated in FIG. 42, in a case where the region-division polarizer 62 is disposed in the projection optical system 2J, the optical system falls in a state similar to the optical system according to the second embodiment, and it is possible to omit the notch filter 15 in the illumination optical system 1J and increase a light amount.

Other configurations, actions, and effects may be substantially similar to those in the optical system according to the first or second embodiment described above.

13. Thirteenth Embodiment

Next, description is given of an optical system according to a thirteenth embodiment of the present disclosure. It is to be noted that in the following description, components that are substantially the same as those of the optical system according to any of the first to twelfth embodiments described above are indicated by the same reference signs, and description thereof is omitted as appropriate.

Various modification examples of the optical system according to any of the first to twelfth embodiments described above are all described here as the thirteenth embodiment.

Modification Example 1

Figure 43:
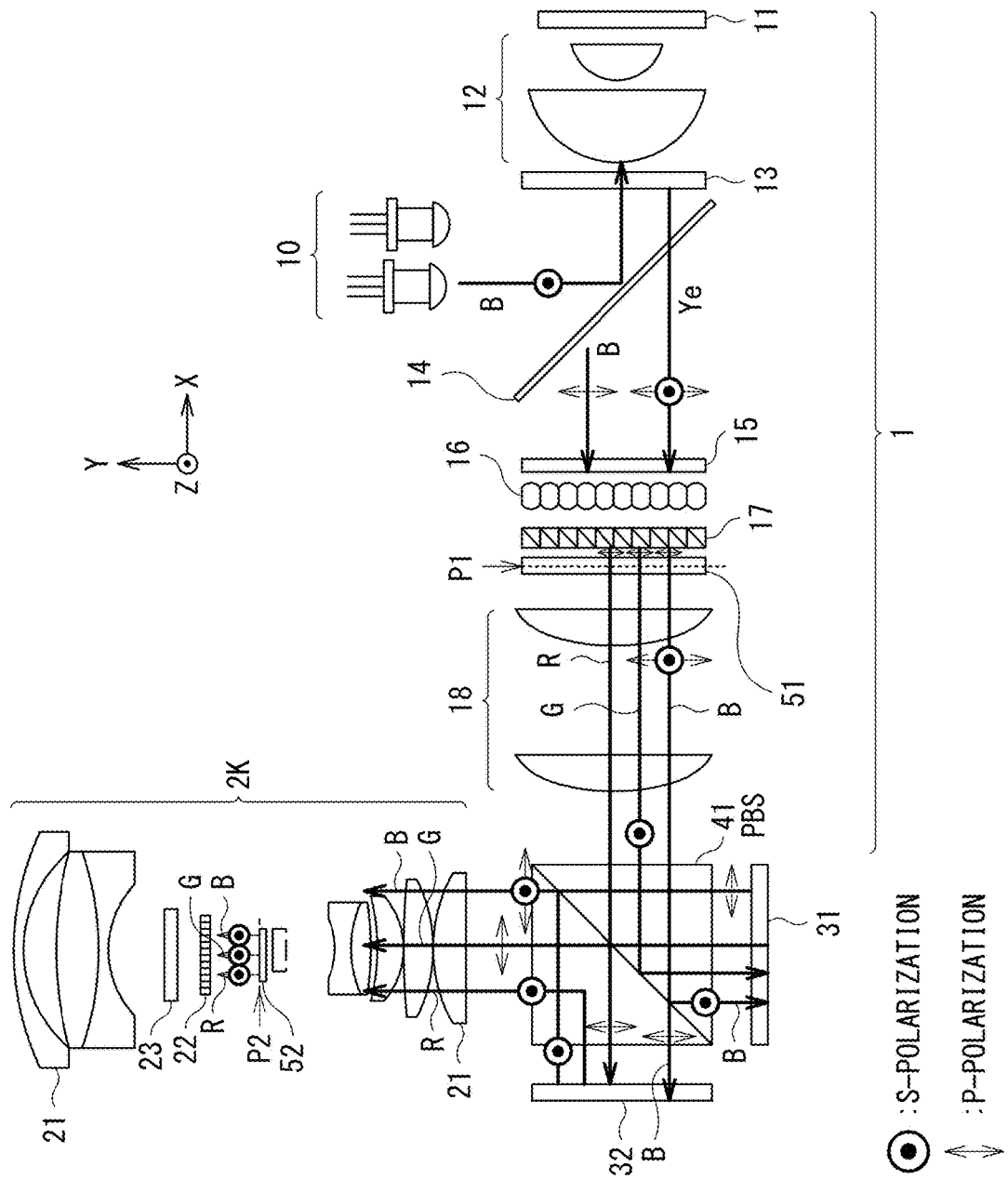
FIG. 43 is a configuration diagram schematically illustrating an entire configuration example of an optical system according to a thirteenth embodiment.

FIG. 43 schematically illustrates an entire configuration example of the optical system according to the thirteenth embodiment.

The optical system illustrated in FIG. 43 includes the illumination optical system 1 and a projection optical system 2K.

The projection optical system 2K further includes a quarter-wave plate 23 disposed in an output light path subsequent to the pupil position P2 of the projection optical system 2K in the configuration of the projection optical system 2 (FIG. 1) in the first embodiment.

In the optical system illustrated in FIG. 43, the illumination optical system 1 corresponds to a specific example of a "first optical system" in the technology of the present disclosure. The projection optical system 2K corresponds to a specific example of a "second optical system" in the technology of the present disclosure.

Other configurations are substantially similar to those of the optical system according to the first embodiment described above.

In the optical systems according to the first to twelfth embodiments described above, in a case of a configuration in which the post polarizer 22 is disposed, as with the optical system illustrated in FIG. 43, the quarter-wave plate 23 may be disposed behind the post polarizer 22. In addition, in the optical systems according to the first to twelfth embodiments described above, even in a case where the region-division polarizer 62 corresponding to the post polarizer 22 is disposed, the quarter-wave plate 23 may be disposed behind the region-division polarizer 62. With such a configuration, light having passed through the quarter-wave plate 23 is converted into circular polarization. If light reflected by any component in the projection optical system is to be returned to a light valve side, the light passes through the quarter-wave plate 23 twice, and is converted into polarization orthogonal to a polarizer such as the post polarizer 22, which makes it possible to shield the light by the polarizer such as the post polarizer 22. This consequently prevents return of a ghost portion in a case where white is displayed on a black ground, which makes it possible to increase ANSI contrast.

In addition, in a case where the quarter-wave plate 23 is disposed subsequent to a polarizer such as the post polarizer 22, projection light is converted into circular polarization, which makes it possible reduce polarization dependence on a projection surface such as a screen to reduce color unevenness caused by projection polarization. In particular, in a case where the region-division polarizer 62 is orthogonally arranged in the projection optical system in the optical system according to the second embodiment or the like, an output polarization state differs depending on color light beams, which causes polarization dependence on the screen to be easily observed. Accordingly, it is desirable to dispose the quarter-wave plate 23 behind the region-division polarizer 62. The quarter-wave plate 23 in this case may not be divided into regions. The reason for this is that there is only a difference between clockwise circular polarization and counterclockwise circular polarization. For this purpose, the region-division polarizer 62 of an absorption type is more desirable.

Modification Example 2

In the optical systems according to the first to twelfth embodiments described above, to prevent color unevenness on the projection surface, a polarization scrambler may be disposed behind a polarizer such as the post polarizer 22. The polarization scrambler typically includes a crystal plate or a birefringent material, and gives a random polarization action to output polarization with use of birefringence. This makes it possible to reduce color unevenness having polarization dependence on the projection surface.

Modification Example 3

In the optical systems according to the first to twelfth embodiments described above, description has been given of a case where the light valve is, for example, a reflective liquid crystal such as LCOS as an example; however, the light valve may be, for example, a transmissive liquid crystal. For example, in principle, it is possible to use a DMD (Digital Micro Mirror). In this case, polarization does not affect contrast, but in a configuration of a three-dimensional display apparatus using polarization such as the optical system (FIG. 20) according to the fifth embodiment, it is possible to suppress crosstalk in left and right polarizations in three-dimensional display.

Modification Example 4

In addition, a phosphor in the phosphor wheel 11 may use LuAG or the like in place of YAG. In particular, in a case where a loss in the light amount caused by the notch filter 15 is large as with the optical system according to the first embodiment or the like, use of LuAG plays a role of reducing a loss in the light amount by bringing the entire spectrum close to green. Further, LDs or the like of respective colors may be used as light sources in place of the phosphor wheel 11, and respective color light beams from the LDs of the respective colors may be combined. Alternatively, even if a lamp is used as a light source, it is possible to adopt a similar configuration. In this case, field sequential drive efficiency is not favorable; therefore, a four-plate or six-plate configuration is more desirable.

Modification Example 5

In the optical systems according to the first to twelfth embodiments described above, an increase in contrast is a main purpose; however, the essential value of the technology of the present disclosure is that it is possible to give different actions to light beams from different light valves. Accordingly, for example, in the optical system according to the first embodiment, disposing a region-divided wave plate in the projection optical system 2 without disposing the post polarizer 22 makes it possible to reduce color unevenness on a screen by converting output polarization into linear polarization.

Modification Example 6

Various wavelength selective wave plates used in the optical systems according to the first to twelfth embodiments described above are conceivable. Laminated wave plates of polyolefin and polycarbonate may be adopted, and it is possible to increase durability and flatness by interposing these wave plates by polished glass. In particular, necessary reflection wavefront accuracy in the projection optical system is three or less newton rings (a wavelength of 630 nm), and strict accuracy reaches 1.5 newton rings. In simple lamination of polyolefin and polycarbonate plates, it is difficult to support reflection wavefront accuracy of 1.5 newton rings; however, wave plates that are interposed by polished glass to increase flatness are able to support such reflection wavefront accuracy. Further, the wavelength selective wave plate may be configured by stacking crystal, and in particular, in a case where the light amount is increased, light resistance of polycarbonate and polyolefin is not sufficient, but a crystal laminated plate is able to support such accuracy without any issue.

Other configurations, actions, and effects may be substantially similar to those in the optical system according to any of the first to twelfth embodiments described above.

14. Other Embodiments

The technology according to the present disclosure is not limited to the descriptions of the embodiments above, and may be modified in a variety of ways.

The present technology may have the following configurations, for example.

According to the present technology having the following configuration, in a first optical system, a first optical element that has a plurality of divided regions having mutually different polarization actions is disposed at a first pupil position, and in a second optical system, a second optical element that has a plurality of divided regions having mutually different polarization actions is disposed at a second pupil position conjugate to the first pupil position, which makes it possible to achieve an improvement in contrast.

(1)

An optical system including:

a first optical system that includes a first optical element having a plurality of divided regions having mutually different polarization actions, the first optical element being disposed at a first pupil position in the optical system, and that generates illumination light including a plurality of color light beams in mutually different wavelength bands;

a plurality of light valves that each modulates at least one color light beam of the plurality of color light beams included in the illumination light; and a second optical system that includes a second optical element having a plurality of divided regions having mutually different polarization actions, the second optical element being disposed at a second pupil position conjugate to the first pupil position, and on which the plurality of color light beams modulated by the plurality of light valves is incident.

(2)
The optical system according to (1), in which each of the plurality of divided regions in the first optical element and each of the plurality of divided regions in the second optical element are conjugate to each other.

(3)
The optical system according to (1) or (2), in which at least one color light beam of the plurality of color light beams is incident on two light valves of the plurality of light valves.

(4)
The optical system according to (3), in which the at least one color light beam is split by a difference in polarization to be incident on the two light valves.

(5)
The optical system according to (3) or (4), in which the plurality of light valves is configured by the two light valves.

(6)
The optical system according to (5), in which
the plurality of color light beams includes first to third color light beams,
the first color light beam is incident on the two light valves,
the second color light beam is incident on one of the two light valve, and
the third color light beam is incident on the other of the two light valves.

(7)
The optical system according to any one of (3) to (6), in which a wavelength band of the at least one color light beam is shorter than 500 nm.

(8)
The optical system according to any one of (1) to (7), in which the second optical system further includes a polarizer that is disposed in an output optical path of the second optical element.

(9)
The optical system according to any one of (1) to (7), in which t the second optical element includes a region-division polarizer.

(10)
The optical system according to any one of (1) to (9), in which the first optical system has a wavelength separation action of separating light in at least one wavelength band into the plurality of color light beams.

(11)
The optical system according to any one of (1) to (10), in which wavelength distributions in the plurality of divided regions at the first pupil position are different from each other.

(12)
The optical system according to (11), in which the second optical element includes a region-division polarizer in which the plurality of the divided regions each has an action of allowing light beams in mutually different polarization directions to pass therethrough.

(13)
The optical system according to (11) or (12), in which color light beams in mutually different polarization directions are incident on the plurality of light valves.

(14)
The optical system according to (1) or (2), in which
the plurality of color light beams includes a blue light beam,
the plurality of light valves is configured by four light valves, and
the blue light beam is incident on two light valves of the four light valves.

(15)
The optical system according to (14), further including a polarization splitter that is provided in an optical path of the blue light beam outputted from the first optical system, and splits the blue light beam toward the two light valves.

(16)
The optical system according to (1) or (2), in which
the plurality of color light beams includes first to third color light beams,
the plurality of light valves is configured by first to sixth light valves,
the first color light beams in mutually different polarization directions are incident on the first and second light valves,
the second color light beams in mutually different polarization directions are incident on the third and fourth light valves, and
the third color light beams in mutually different polarization directions are incident on the fifth and sixth light valves.

(17)
The optical system according to any one of (1) to (16), further including a quarter-wave plate that is disposed in an output optical path subsequent to the second pupil position in the second optical system.

(18)
The optical system according to any one of (1) to (17), in which the first optical element includes a dichroic prism array.

(19)
The optical system according to any one of (1) to (18), in which the second optical system includes a projection optical system that projects an image generated by the plurality of light valves onto a projection surface.

This application claims the benefits of Japanese Priority Patent Application JP2019-20864 filed with the Japan Patent Office on Feb. 7, 2019, the entire contents of which are incorporated herein by reference.

It should be understood that those skilled in the art could conceive various modifications, combinations, sub-combinations, and alterations depending on design requirements and other factors, insofar as they are within the scope of the appended claims or the equivalents thereof.

What is claimed is:
1. An optical system, comprising:
a first optical system that includes a first optical element having a plurality of divided regions having mutually different polarization actions, the first optical element being disposed at a first pupil position in the optical system, wherein the first optical element generates illumination light including a plurality of color light beams in mutually different wavelength bands;
a plurality of light valves that each modulates at least one color light beam of the plurality of color light beams included in the illumination light; and
a second optical system that includes a second optical element having a plurality of divided regions having mutually different polarization actions, the second optical element being disposed at a second pupil position conjugate to the first pupil position, and on which the plurality of color light beams modulated by the plurality of light valves is incident,
wherein each of the plurality of divided regions in the first optical element and each of the plurality of divided regions in the second optical element are conjugate to each other.

2. The optical system according to claim 1, wherein at least one color light beam of the plurality of color light beams is incident on two light valves of the plurality of light valves.

3. An optical system, comprising:
a first optical system that includes a first optical element having a plurality of divided regions having mutually different polarization actions, the first optical element being disposed at a first pupil position in the optical system, wherein the first optical element generates illumination light including a plurality of color light beams in mutually different wavelength bands;
a plurality of light valves that each modulates at least one color light beam of the plurality of color light beams included in the illumination light; and
a second optical system that includes a second optical element having a plurality of divided regions having mutually different polarization actions, the second optical element being disposed at a second pupil position conjugate to the first pupil position, and on which the plurality of color light beams modulated by the plurality of light valves is incident,
wherein at least one color light beam of the plurality of color light beams is incident on two light valves of the plurality of light valves, and
wherein the at least one color light beam is split by a difference in polarization to be incident on the two light valves.

4. An optical system, comprising:
a first optical system that includes a first optical element having a plurality of divided regions having mutually different polarization actions, the first optical element being disposed at a first pupil position in the optical system, wherein the first optical element generates illumination light including a plurality of color light beams in mutually different wavelength bands;
a plurality of light valves that each modulates at least one color light beam of the plurality of color light beams included in the illumination light; and
a second optical system that includes a second optical element having a plurality of divided regions having mutually different polarization actions, the second optical element being disposed at a second pupil position conjugate to the first pupil position, and on which the plurality of color light beams modulated by the plurality of light valves is incident,
wherein at least one color light beam of the plurality of color light beams is incident on two light valves of the plurality of light valves, and
wherein the plurality of light valves is configured by the two light valves.

5. The optical system according to claim 4, wherein the plurality of color light beams includes first to third color light beams,
the first color light beam is incident on the two light valves,
the second color light beam is incident on one of the two light valves, and
the third color light beam is incident on the other of the two light valves.

6. An optical system, comprising:
a first optical system that includes a first optical element having a plurality of divided regions having mutually different polarization actions, the first optical element being disposed at a first pupil position in the optical system, wherein the first optical element generates illumination light including a plurality of color light beams in mutually different wavelength bands;
a plurality of light valves that each modulates at least one color light beam of the plurality of color light beams included in the illumination light; and
a second optical system that includes a second optical element having a plurality of divided regions having mutually different polarization actions, the second optical element being disposed at a second pupil position conjugate to the first pupil position, and on which the plurality of color light beams modulated by the plurality of light valves is incident,
wherein at least one color light beam of the plurality of color light beams is incident on two light valves of the plurality of light valves, and
wherein a wavelength band of the at least one color light beam is shorter than 500 nm.

7. The optical system according to claim 1, wherein the second optical system further includes a polarizer that is disposed in an output optical path of the second optical element.

8. The optical system according to claim 1, wherein the second optical element comprises a region-division polarizer.

9. The optical system according to claim 1, wherein the first optical system has a wavelength separation action of separating light in at least one wavelength band into the plurality of color light beams.

10. An optical system, comprising:
a first optical system that includes a first optical element having a plurality of divided regions having mutually different polarization actions, the first optical element being disposed at a first pupil position in the optical system, wherein the first optical element generates illumination light including a plurality of color light beams in mutually different wavelength bands;
a plurality of light valves that each modulates at least one color light beam of the plurality of color light beams included in the illumination light; and
a second optical system that includes a second optical element having a plurality of divided regions having mutually different polarization actions, the second optical element being disposed at a second pupil position conjugate to the first pupil position, and on which the plurality of color light beams modulated by the plurality of light valves is incident,
wherein wavelength distributions in the plurality of divided regions at the first pupil position are different from each other.

11. The optical system according to claim 10, wherein the second optical element comprises a region-division polarizer in which the plurality of the divided regions each has an action of allowing light beams in mutually different polarization directions to pass therethrough.

12. The optical system according to claim 10, wherein color light beams in mutually different polarization directions are incident on the plurality of light valves.

13. An optical system, comprising:
a first optical system that includes a first optical element having a plurality of divided regions having mutually different polarization actions, the first optical element being disposed at a first pupil position in the optical system, wherein the first optical element generates illumination light including a plurality of color light beams in mutually different wavelength bands;
a plurality of light valves that each modulates at least one color light beam of the plurality of color light beams included in the illumination light; and
a second optical system that includes a second optical element having a plurality of divided regions having mutually different polarization actions, the second optical element being disposed at a second pupil position conjugate to the first pupil position, and on which the plurality of color light beams modulated by the plurality of light valves is incident, wherein
the plurality of color light beams includes a blue light beam,
the plurality of light valves is configured by four light valves, and
the blue light beam is incident on two light valves of the four light valves.

14. The optical system according to claim 13, further comprising a polarization splitter that is provided in an optical path of the blue light beam outputted from the first optical system, and splits the blue light beam toward the two light valves.

15. An optical system, comprising:
a first optical system that includes a first optical element having a plurality of divided regions having mutually different polarization actions, the first optical element being disposed at a first pupil position in the optical system, wherein the first optical element generates illumination light including a plurality of color light beams in mutually different wavelength bands;
a plurality of light valves that each modulates at least one color light beam of the plurality of color light beams included in the illumination light; and
a second optical system that includes a second optical element having a plurality of divided regions having mutually different polarization actions, the second optical element being disposed at a second pupil position conjugate to the first pupil position, and on which the plurality of color light beams modulated by the plurality of light valves is incident, wherein
the plurality of color light beams includes first to third color light beams,
the plurality of light valves is configured by first to sixth light valves,
the first color light beams in mutually different polarization directions are incident on the first and second light valves,
the second color light beams in mutually different polarization directions are incident on the third and fourth light valves, and
the third color light beams in mutually different polarization directions are incident on the fifth and sixth light valves.

16. An optical system, comprising:
a first optical system that includes a first optical element having a plurality of divided regions having mutually different polarization actions, the first optical element being disposed at a first pupil position in the optical system, wherein the first optical element generates illumination light including a plurality of color light beams in mutually different wavelength bands;
a plurality of light valves that each modulates at least one color light beam of the plurality of color light beams included in the illumination; light
a second optical system that includes a second optical element having a plurality of divided regions having mutually different polarization actions, the second optical element being disposed at a second pupil position conjugate to the first pupil position, and on which the plurality of color light beams modulated by the plurality of light valves is incident; and
a quarter-wave plate that is disposed in an output optical path subsequent to the second pupil position in the second optical system.

17. An optical system, comprising:
a first optical system that includes a first optical element having a plurality of divided regions having mutually different polarization actions, the first optical element being disposed at a first pupil position in the optical system, wherein the first optical element generates illumination light including a plurality of color light beams in mutually different wavelength bands;
a plurality of light valves that each modulates at least one color light beam of the plurality of color light beams included in the illumination light; and
a second optical system that includes a second optical element having a plurality of divided regions having mutually different polarization actions, the second optical element being disposed at a second pupil position conjugate to the first pupil position, and on which the plurality of color light beams modulated by the plurality of light valves is incident, wherein the first optical element includes a dichroic prism array.

18. The optical system according to claim 1, wherein the second optical system comprises a projection optical system that projects an image generated by the plurality of light valves onto a projection surface.

19. The optical system according to claim 7, wherein at least one color light beam of the plurality of color light beams is incident on two light valves of the plurality of light valves.

20. The optical system according to claim 8, wherein at least one color light beam of the plurality of color light beams is incident on two light valves of the plurality of light valves.

* * * * *